United States Patent
Ensworth et al.

(10) Patent No.: US 10,285,342 B2
(45) Date of Patent: May 14, 2019

(54) ELASTOMERIC EMITTER AND METHODS RELATING TO SAME

(71) Applicant: Rain Bird Corporation, Azusa, CA (US)

(72) Inventors: Mark M. Ensworth, Orange, CA (US); Jae Yung Kim, Los Angeles, CA (US); Mark Richard Edris, Glendora, CA (US); Joseph Nazari, La Crescenta, CA (US); Samir Shah, Chino Hills, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 13/964,903

(22) Filed: Aug. 12, 2013

(65) Prior Publication Data
US 2015/0041563 A1    Feb. 12, 2015

(51) Int. Cl.
*A01G 25/02*    (2006.01)
*A01G 25/06*    (2006.01)
*A01G 25/00*    (2006.01)

(52) U.S. Cl.
CPC ............ *A01G 25/023* (2013.01); *A01G 25/02* (2013.01); *A01G 25/06* (2013.01); *A01G 2025/006* (2013.01); *Y10T 29/4943* (2015.01)

(58) Field of Classification Search
CPC .. A01G 2025/006; A01G 25/02; A01G 25/06; A01G 25/023
(Continued)

(56) References Cited

U.S. PATENT DOCUMENTS

| 2,174,515 A | 10/1939 | Hughes |
| 2,449,731 A | 9/1948 | Therrien |

(Continued)

FOREIGN PATENT DOCUMENTS

| AU | 511876 | 10/1978 |
| AU | 2004208646 | 3/2006 |

(Continued)

OTHER PUBLICATIONS

Patent Cooperation Treaty, International Searching Authority, Notification of Transmittal of the International Search Report and the Written Opinion of the International Searching Authority, or the Declaration, issued in International Application No. PCTUS2013033866, dated Jun. 19, 2013, 7 pp.

(Continued)

*Primary Examiner* — Alexander M Valvis
*Assistant Examiner* — Joseph A Greenlund
(74) *Attorney, Agent, or Firm* — Fitch, Even, Tabin & Flannery, LLP

(57) ABSTRACT

An irrigation drip emitter, and methods relating to same, are provided for delivering irrigation water from a supply tube to an emitter outlet at a reduced and relatively constant flow rate. The emitter having at least one moveable member for compensating for fluctuations in supply line fluid pressure. In one form the emitter further includes a root growth inhibiting member for hindering roots from obstructing fluid flow through the emitter. In another form, the emitter includes an inlet protrusion so that fluid entering the emitter comes from a position closer to the central or center portion of the conduit in order to avoid larger obstructions that may be located near the periphery of the conduit. In another form, the emitter includes a carrier for assisting in mounting the emitter into conduit. In another form, more than one of the above features are present.

28 Claims, 40 Drawing Sheets

(58) Field of Classification Search
USPC .......................................... 239/11, 542, 547
See application file for complete search history.

(56) References Cited

U.S. PATENT DOCUMENTS

| | | |
|---|---|---|
| 2,508,403 A | 5/1950 | Knauss |
| 2,625,429 A | 1/1953 | Coles |
| 2,639,194 A | 5/1953 | Wahlin |
| 2,683,061 A | 7/1954 | Tuttle, Jr. |
| 2,762,397 A | 9/1956 | Miller |
| 2,794,321 A | 6/1957 | Warner |
| 2,873,030 A | 2/1959 | Ashton |
| 2,970,923 A | 2/1961 | Sparman |
| 3,004,330 A | 10/1961 | Wilkins |
| 3,155,612 A | 11/1964 | Weber |
| 3,182,916 A | 5/1965 | Schulz |
| 3,199,901 A | 8/1965 | Jeppsson |
| 3,302,450 A | 2/1967 | Wakar |
| 3,323,550 A | 6/1967 | Lee |
| 3,361,359 A | 1/1968 | Chapin |
| 3,420,064 A | 1/1969 | Blass et al. |
| 3,426,544 A | 2/1969 | Curtis |
| 3,434,500 A | 3/1969 | Burrows |
| 3,467,142 A | 9/1969 | Boyle et al. |
| 3,586,291 A | 6/1971 | Malec |
| 3,672,571 A | 6/1972 | Goodricke |
| 3,693,888 A | 9/1972 | Rondas et al. |
| 3,697,002 A | 10/1972 | Parkison |
| 3,698,195 A | 10/1972 | Chapin |
| 3,719,327 A | 3/1973 | McMahan |
| 3,727,635 A | 4/1973 | Todd |
| 3,729,142 A | 4/1973 | Rangel-Garza et al. |
| 3,753,527 A | 8/1973 | Galbraith et al. |
| 3,777,980 A | 12/1973 | Allport |
| 3,777,987 A | 12/1973 | Allport |
| 3,779,468 A | 12/1973 | Spencer |
| 3,780,946 A | 12/1973 | Smith et al. |
| 3,791,587 A | 2/1974 | Drori |
| 3,797,741 A | 3/1974 | Spencer |
| 3,804,334 A | 4/1974 | Curry |
| 3,807,430 A | 4/1974 | Keller |
| 3,814,377 A | 6/1974 | Todd |
| 3,815,636 A | 6/1974 | Menzel |
| RE28,095 E | 7/1974 | Chapin |
| 3,833,019 A | 9/1974 | Diggs |
| 3,851,896 A | 12/1974 | Olson |
| 3,856,333 A | 12/1974 | Cox |
| 3,863,845 A | 2/1975 | Bumpstead |
| 3,866,833 A | 2/1975 | Susumu |
| 3,870,236 A | 3/1975 | Sahagun-Barragan |
| 3,873,030 A | 3/1975 | Barragan |
| 3,874,598 A | 4/1975 | Havens |
| 3,882,892 A | 5/1975 | Menzel |
| 3,885,743 A | 5/1975 | Wake |
| 3,895,085 A | 7/1975 | Suzuki et al. |
| 3,896,999 A | 7/1975 | Barragan |
| 3,903,929 A | 9/1975 | Mock |
| 3,940,066 A | 2/1976 | Hunter |
| 3,948,285 A | 4/1976 | Flynn |
| 3,954,223 A | 5/1976 | Wichman et al. |
| 3,957,292 A | 5/1976 | Diggs |
| 3,966,233 A | 6/1976 | Diggs |
| 3,970,251 A | 7/1976 | Harmony |
| 3,973,732 A | 8/1976 | Diggs |
| 3,981,452 A | 9/1976 | Eckstein |
| 3,993,248 A | 11/1976 | Harmony |
| 3,995,436 A | 12/1976 | Diggs |
| 3,998,244 A | 12/1976 | Bentley |
| 3,998,391 A | 12/1976 | Lemelshtich |
| 3,998,427 A | 12/1976 | Bentley |
| 4,008,853 A | 2/1977 | Tregillus |
| 4,017,958 A | 4/1977 | Diggs |
| 4,022,384 A | 5/1977 | Hoyle |
| 4,036,435 A | 7/1977 | Pecaro |
| 4,037,791 A | 7/1977 | Mullett et al. |
| 4,047,995 A | 9/1977 | Leal-Diaz |
| 4,054,152 A | 10/1977 | Ito |
| 4,058,257 A | 11/1977 | Spencer |
| 4,059,228 A | 11/1977 | Werner |
| 4,077,570 A | 3/1978 | Harmony |
| 4,077,571 A | 3/1978 | Harmony |
| 4,084,749 A | 4/1978 | Drori |
| 4,092,002 A | 5/1978 | Grosse et al. |
| 4,095,750 A | 6/1978 | Gilead |
| 4,105,162 A | 8/1978 | Drori |
| 4,121,771 A | 10/1978 | Hendrickson |
| 4,122,590 A | 10/1978 | Spencer |
| 4,132,364 A | 1/1979 | Harmony |
| 4,134,550 A | 1/1979 | Bright |
| 4,143,820 A | 3/1979 | Bright, Sr. |
| 4,160,323 A | 7/1979 | Tracy |
| 4,161,291 A | 7/1979 | Bentley |
| 4,177,946 A | 12/1979 | Sahagun-Barragan |
| 4,177,947 A | 12/1979 | Menzel |
| 4,196,753 A | 4/1980 | Hammarstedt |
| 4,196,853 A | 4/1980 | Delmer |
| 4,209,133 A | 6/1980 | Mehoudar |
| 4,210,287 A | 7/1980 | Mehoudar |
| 4,223,838 A | 9/1980 | Maria-Vittorio-Torrisi |
| 4,225,307 A | 9/1980 | Magera |
| 4,226,368 A | 10/1980 | Hunter |
| 4,235,380 A | 11/1980 | Delmer |
| 4,247,051 A | 1/1981 | Allport |
| 4,250,915 A | 2/1981 | Rikuta |
| 4,273,286 A | 6/1981 | Menzel |
| 4,274,597 A | 6/1981 | Dobos |
| 4,281,798 A | 8/1981 | Lemelstrich |
| 4,307,841 A | 12/1981 | Mehoudar et al. |
| 4,331,293 A | 5/1982 | Rangel-Garza |
| 4,344,576 A | 8/1982 | Smith |
| 4,354,639 A | 10/1982 | Delmer |
| 4,366,926 A | 1/1983 | Mehoudar et al. |
| 4,369,923 A | 1/1983 | Bron |
| 4,384,680 A | 5/1983 | Mehoudar |
| 4,385,727 A | 5/1983 | Spencer |
| 4,385,757 A | 5/1983 | Muller |
| 4,392,616 A | 7/1983 | Olson |
| 4,413,786 A | 11/1983 | Mehoudar |
| 4,413,787 A | 11/1983 | Gilead |
| 4,423,838 A | 1/1984 | Dinur |
| 4,424,936 A | 1/1984 | Marc |
| 4,430,020 A | 2/1984 | Robbins |
| 4,460,129 A | 7/1984 | Olson |
| 4,473,191 A | 9/1984 | Chapin |
| 4,473,525 A | 9/1984 | Drori |
| 4,502,631 A | 3/1985 | Christen |
| 4,508,140 A | 4/1985 | Harrison |
| 4,513,777 A | 4/1985 | Wright |
| 4,519,546 A | 5/1985 | Gorney |
| 4,522,339 A | 6/1985 | Costa |
| 4,533,083 A | 8/1985 | Tucker |
| 4,534,515 A | 8/1985 | Chapin |
| 4,545,784 A | 10/1985 | Sanderson |
| 4,550,878 A | 11/1985 | Rosenberg |
| 4,572,756 A | 2/1986 | Chapin |
| 4,573,640 A | 3/1986 | Mehoudar |
| 4,593,857 A | 6/1986 | Raz |
| 4,613,080 A | 9/1986 | Benson |
| 4,626,130 A | 12/1986 | Chapin |
| 4,627,903 A | 12/1986 | Chapman |
| 4,642,152 A | 2/1987 | Chapin |
| 4,653,695 A | 3/1987 | Eckstein |
| 4,687,143 A | 8/1987 | Gorney et al. |
| 4,702,787 A | 10/1987 | Ruskin |
| 4,718,608 A | 1/1988 | Mehoudar |
| 4,722,481 A | 2/1988 | Lemkin |
| 4,722,759 A | 2/1988 | Roberts |
| 4,726,520 A | 2/1988 | Brown et al. |
| 4,726,527 A | 2/1988 | Mendenhall |
| 4,728,042 A | 3/1988 | Gorney et al. |
| 4,735,363 A | 4/1988 | Shfaram et al. |
| 4,749,130 A | 6/1988 | Utzinger |
| 4,753,394 A | 6/1988 | Goodman |
| 4,756,339 A | 7/1988 | Buluschek |

(56) References Cited

U.S. PATENT DOCUMENTS

| | | |
|---|---|---|
| 4,765,541 A | 8/1988 | Mangels |
| 4,775,046 A | 10/1988 | Gramarossa |
| 4,781,217 A | 11/1988 | Rosenberg |
| 4,789,005 A | 12/1988 | Griffiths |
| 4,796,660 A | 1/1989 | Bron |
| 4,807,668 A | 2/1989 | Roberts |
| 4,817,875 A | 4/1989 | Karmeli et al. |
| 4,824,019 A | 4/1989 | Lew |
| 4,824,025 A | 4/1989 | Miller |
| 4,850,531 A | 7/1989 | Littleton |
| 4,854,158 A | 8/1989 | Gates |
| 4,856,552 A | 8/1989 | Hiemstra |
| 4,859,264 A | 8/1989 | Buluschek |
| 4,862,731 A | 9/1989 | Gates |
| 4,874,132 A | 10/1989 | Gilead |
| 4,880,167 A | 11/1989 | Langa et al. |
| 4,900,437 A | 2/1990 | Savall |
| 4,909,411 A | 3/1990 | Uchida |
| 4,948,295 A | 8/1990 | Pramsoler |
| 4,984,739 A | 1/1991 | Allport |
| 5,022,940 A | 6/1991 | Mehoudar |
| 5,031,837 A | 7/1991 | Hanish |
| 5,040,770 A | 8/1991 | Rajster |
| 5,052,625 A | 10/1991 | Ruskin |
| 5,096,206 A | 3/1992 | Andre |
| 5,111,995 A | 5/1992 | Dumitrascu et al. |
| 5,111,996 A | 5/1992 | Eckstein |
| 5,116,414 A | 5/1992 | Burton |
| 5,118,042 A | 6/1992 | Delmer et al. |
| 5,122,044 A | 6/1992 | Mehoudar |
| 5,123,984 A | 6/1992 | Allport |
| 5,137,216 A | 8/1992 | Hanish |
| 5,141,360 A | 8/1992 | Zeman |
| 5,163,622 A | 11/1992 | Cohen |
| 5,181,952 A | 1/1993 | Burton |
| 5,183,208 A | 2/1993 | Cohen |
| 5,192,027 A | 3/1993 | Delmer |
| 5,200,132 A | 4/1993 | Shfaram |
| 5,203,503 A | 4/1993 | Cohen |
| 5,207,386 A | 5/1993 | Mehoudar |
| 5,232,159 A | 8/1993 | Abbate, Sr. |
| 5,232,160 A | 8/1993 | Hendrickson |
| 5,236,130 A | 8/1993 | Hadar |
| 5,246,171 A | 9/1993 | Roberts |
| 5,252,162 A | 10/1993 | Delmer |
| 5,253,807 A | 10/1993 | Newbegin |
| 5,271,786 A | 12/1993 | Gorney et al. |
| 5,279,462 A | 1/1994 | Mehoudar |
| 5,282,578 A | 2/1994 | DeFrank |
| 5,282,916 A | 2/1994 | Bloom |
| 5,283,916 A | 2/1994 | Haro |
| 5,294,058 A | 3/1994 | Einav |
| 5,310,438 A | 5/1994 | Ruskin |
| 5,314,116 A | 5/1994 | Krauth |
| 5,316,220 A | 5/1994 | Dinur |
| 5,318,657 A | 6/1994 | Roberts |
| 5,324,371 A | 6/1994 | Mehoudar |
| 5,324,379 A | 6/1994 | Eckstein |
| 5,327,941 A | 7/1994 | Bitsakis |
| 5,330,107 A * | 7/1994 | Karathanos .......... A01G 25/023 138/43 |
| 5,332,160 A | 7/1994 | Ruskin |
| 5,333,793 A | 8/1994 | DeFrank |
| 5,337,597 A | 8/1994 | Peake |
| 5,353,993 A | 10/1994 | Rosenberg |
| 5,364,032 A | 11/1994 | DeFrank |
| 5,399,160 A | 3/1995 | Dunberger |
| 5,400,973 A | 3/1995 | Cohen |
| 5,413,282 A | 5/1995 | Boswell |
| 5,441,203 A | 8/1995 | Swan |
| 5,442,001 A | 8/1995 | Jones |
| 5,443,212 A | 8/1995 | Dinur |
| 5,449,250 A | 9/1995 | Burton |
| 5,465,905 A | 11/1995 | Elder |
| 5,522,551 A | 6/1996 | DeFrank |
| 5,531,381 A | 7/1996 | Ruttenberg |
| 5,535,778 A | 7/1996 | Zakai |
| 5,584,952 A | 12/1996 | Rubenstein |
| 5,586,727 A | 12/1996 | Shekalim |
| 5,591,293 A | 1/1997 | Miller |
| 5,601,381 A | 2/1997 | Hadar |
| 5,609,303 A | 3/1997 | Cohen |
| 5,615,833 A | 4/1997 | Robillard et al. |
| 5,615,838 A * | 4/1997 | Eckstein .............. A01G 25/023 239/533.1 |
| 5,620,143 A | 4/1997 | Delmer et al. |
| 5,628,462 A | 5/1997 | Miller |
| 5,634,594 A * | 6/1997 | Cohen .................. G05D 7/0113 239/533.13 |
| 5,636,797 A | 6/1997 | Cohen |
| 5,641,113 A | 6/1997 | Somaki |
| 5,651,999 A | 7/1997 | Armentrout |
| 5,673,852 A | 10/1997 | Roberts |
| 5,676,897 A | 10/1997 | Dermitzakis |
| 5,695,127 A | 12/1997 | Delmer et al. |
| 5,711,482 A | 1/1998 | Yu |
| 5,722,601 A | 3/1998 | DeFrank |
| 5,727,733 A | 3/1998 | Ruttenberg |
| 5,732,887 A | 3/1998 | Roberts |
| 5,744,423 A | 4/1998 | Voris |
| 5,744,779 A | 4/1998 | Buluschek |
| 5,785,785 A | 7/1998 | Delmer et al. |
| 5,813,603 A | 9/1998 | Kurtz |
| 5,820,028 A | 10/1998 | Dinur |
| 5,820,029 A | 10/1998 | Marans |
| 5,829,685 A * | 11/1998 | Cohen .................. A01G 25/023 239/533.1 |
| 5,829,686 A * | 11/1998 | Cohen .................. A01G 25/023 239/533.1 |
| 5,855,324 A | 1/1999 | DeFrank et al. |
| 5,865,377 A | 2/1999 | DeFrank |
| 5,871,325 A | 2/1999 | Schmidt |
| 5,875,815 A | 3/1999 | Ungerecht |
| 5,898,019 A | 4/1999 | VanVoris |
| 5,944,260 A | 8/1999 | Wang |
| 5,957,391 A | 9/1999 | DeFrank et al. |
| 5,972,375 A | 10/1999 | Truter |
| 5,988,211 A | 11/1999 | Cornell |
| 6,015,102 A | 2/2000 | Daigle et al. |
| 6,026,850 A | 2/2000 | Newton |
| 6,027,048 A * | 2/2000 | Mehoudar ............ A01G 25/023 138/42 |
| 6,039,270 A | 3/2000 | Detmitzakis |
| 6,062,245 A | 5/2000 | Berglind |
| 6,085,986 A | 7/2000 | Yu |
| 6,095,185 A | 8/2000 | Rosenberg |
| 6,109,296 A | 8/2000 | Austin |
| 6,116,523 A | 9/2000 | Cabahug et al. |
| 6,120,634 A | 9/2000 | Harrold et al. |
| 6,179,949 B1 | 1/2001 | Buluschek |
| 6,180,162 B1 | 1/2001 | Shigeru |
| 6,206,305 B1 | 3/2001 | Mehoudar |
| 6,213,408 B1 | 4/2001 | Shekalim |
| 6,238,081 B1 | 5/2001 | Sand |
| 6,250,571 B1 | 6/2001 | Cohen |
| 6,280,554 B1 | 8/2001 | Lambert et al. |
| 6,302,338 B1 | 10/2001 | Cohen |
| 6,305,617 B1 | 10/2001 | Yu |
| 6,308,902 B1 | 10/2001 | Huntley |
| 6,334,958 B1 | 1/2002 | Ruskin |
| 6,343,616 B1 | 2/2002 | Houtchens |
| D455,055 S | 4/2002 | Roberts |
| 6,371,390 B1 | 4/2002 | Cohen |
| 6,382,530 B1 * | 5/2002 | Perkins ................ A01G 25/023 239/533.1 |
| 6,394,412 B2 | 5/2002 | Zakai et al. |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz et al. |
| 6,464,152 B1 | 10/2002 | Bolinis et al. |
| 6,499,687 B2 | 12/2002 | Bryant |
| 6,499,872 B2 | 12/2002 | Sand |

(56) References Cited

U.S. PATENT DOCUMENTS

| | | | |
|---|---|---|---|
| 6,513,734 B2 | 2/2003 | Bertolotti et al. | |
| 6,543,509 B1 | 4/2003 | Harrold | |
| 6,557,819 B2 | 5/2003 | Austin | |
| 6,561,443 B2 | 5/2003 | Delmer | |
| 6,568,607 B2 * | 5/2003 | Boswell | A01G 25/023 239/542 |
| 6,581,262 B1 | 6/2003 | Myers | |
| 6,581,854 B2 * | 6/2003 | Eckstein | A01G 25/026 239/1 |
| 6,581,902 B2 | 6/2003 | Michau | |
| 6,620,278 B1 | 9/2003 | Harrold | |
| 6,622,427 B2 | 9/2003 | Breitner | |
| 6,622,946 B2 | 9/2003 | Held | |
| 6,691,739 B2 | 2/2004 | Rosenberg | |
| 6,736,337 B2 | 5/2004 | Vildibill et al. | |
| 6,750,760 B2 | 6/2004 | Albrtitton et al. | |
| 6,764,029 B2 | 7/2004 | Rosenberg | |
| 6,817,548 B2 * | 11/2004 | Krauth | A01G 25/023 239/533.1 |
| 6,821,928 B2 | 11/2004 | Ruskin | |
| 6,827,298 B2 | 12/2004 | Sacks | |
| 6,830,203 B2 | 12/2004 | Neyestani | |
| 6,875,491 B2 | 4/2005 | Miyamoto | |
| 6,886,761 B2 | 5/2005 | Cohen | |
| 6,894,250 B2 | 5/2005 | Kertscher | |
| 6,896,758 B1 | 5/2005 | Giuffre | |
| 6,920,907 B2 | 7/2005 | Harrold | |
| 6,933,337 B2 | 8/2005 | Lang | |
| 6,936,126 B2 | 8/2005 | DeFrank | |
| 6,945,476 B2 | 9/2005 | Giuffre | |
| 6,996,932 B2 | 2/2006 | Kruer | |
| 6,997,402 B2 | 2/2006 | Kruer | |
| 7,007,916 B2 | 3/2006 | Lee | |
| 7,048,010 B2 | 5/2006 | Golan | |
| 7,108,205 B1 | 9/2006 | Hashimshony et al. | |
| 7,175,113 B2 | 2/2007 | Cohen | |
| 7,241,825 B2 | 7/2007 | Koga | |
| 7,270,280 B2 | 9/2007 | Belford | |
| 7,300,004 B2 | 11/2007 | Sinden | |
| 7,363,938 B1 | 4/2008 | Newton | |
| 7,392,614 B2 | 7/2008 | Kruer | |
| 7,410,108 B2 | 8/2008 | Rabinowitz | |
| 7,445,021 B2 | 11/2008 | Newton | |
| 7,445,168 B2 | 11/2008 | Ruskin | |
| 7,455,094 B2 | 11/2008 | Lee | |
| 7,530,382 B2 | 5/2009 | Kertscher et al. | |
| 7,648,085 B2 * | 1/2010 | Mavrakis | A01G 25/023 138/40 |
| 7,681,805 B2 | 3/2010 | Belford et al. | |
| 7,681,810 B2 | 3/2010 | Keren | |
| 7,695,587 B2 | 4/2010 | Kertscher | |
| 7,735,758 B2 * | 6/2010 | Cohen | A01G 25/023 239/533.1 |
| 7,775,237 B2 | 8/2010 | Keren | |
| 7,802,592 B2 | 9/2010 | McCarty | |
| 7,887,664 B1 | 2/2011 | Mata et al. | |
| 7,954,732 B2 | 6/2011 | Shekalim | |
| 7,988,076 B2 * | 8/2011 | Mamo | A01G 25/023 239/533.1 |
| 8,002,496 B2 | 8/2011 | Giuffré | |
| 8,033,300 B2 | 10/2011 | McCarty | |
| D648,191 S | 11/2011 | Thayer | |
| 8,079,385 B2 | 12/2011 | Hatton | |
| 8,091,800 B2 | 1/2012 | Retter | |
| 8,096,491 B2 | 1/2012 | Lutzki et al. | |
| 8,136,246 B2 | 3/2012 | So | |
| 8,141,589 B2 * | 3/2012 | Socolsky | A01G 25/023 138/37 |
| D657,638 S | 4/2012 | Einav | |
| 8,267,115 B2 | 9/2012 | Giuffre' | |
| 8,286,667 B2 | 10/2012 | Ruskin | |
| 8,302,887 B2 * | 11/2012 | Park | A01G 25/023 239/542 |
| 8,317,111 B2 * | 11/2012 | Cohen | A01G 25/023 239/542 |
| 8,372,326 B2 | 2/2013 | Mamo | |
| 8,381,437 B2 | 2/2013 | Ciudaj | |
| 8,439,282 B2 | 5/2013 | Allen | |
| 8,454,786 B2 | 6/2013 | Guichard | |
| 8,469,294 B2 | 6/2013 | Mata et al. | |
| 8,475,617 B2 | 7/2013 | Kertscher | |
| 8,496,193 B2 | 7/2013 | Rosenberg | |
| 8,511,586 B2 | 8/2013 | Einav | |
| 8,579,215 B2 | 11/2013 | Zavoli | |
| 8,628,032 B2 | 1/2014 | Feith | |
| 8,663,525 B2 | 3/2014 | Mamo | |
| 8,689,484 B2 | 4/2014 | Ruskin | |
| 8,714,205 B2 | 5/2014 | Loebinger | |
| 8,763,934 B2 | 7/2014 | Patel | |
| 8,870,098 B2 | 10/2014 | Lutzki | |
| 8,882,004 B2 | 11/2014 | Gorney | |
| 8,998,112 B2 | 4/2015 | Cohen | |
| 8,998,113 B2 | 4/2015 | Keren | |
| 9,022,059 B2 | 5/2015 | Cohen | |
| 9,022,764 B2 | 5/2015 | Wisler | |
| 9,027,856 B2 | 5/2015 | DeFrank et al. | |
| D740,940 S | 10/2015 | Fregoso | |
| 9,192,108 B2 | 11/2015 | Kertscher | |
| 9,253,950 B1 | 2/2016 | Clark | |
| 9,258,949 B2 | 2/2016 | Nourian | |
| 9,258,950 B2 | 2/2016 | Kidachi | |
| 9,291,276 B2 | 3/2016 | Keren | |
| 9,307,705 B2 | 4/2016 | Akritanakis | |
| 9,345,205 B2 | 5/2016 | Kidachi | |
| 9,380,749 B2 | 7/2016 | Akritanakis | |
| 9,386,752 B2 | 7/2016 | Einav | |
| 9,433,157 B2 | 9/2016 | Dermitzakis | |
| 9,439,366 B2 | 9/2016 | Kidachi | |
| 9,485,923 B2 | 11/2016 | Ensworth | |
| D781,115 S | 3/2017 | Einav | |
| 9,695,965 B2 | 7/2017 | Hadas | |
| 9,814,189 B1 | 11/2017 | Clark | |
| 9,872,444 B2 | 1/2018 | Turk | |
| 9,877,440 B2 | 1/2018 | Ensworth | |
| 9,877,441 B2 | 1/2018 | Ensworth | |
| 9,877,442 B2 | 1/2018 | Kim | |
| D811,179 S | 2/2018 | Ensworth | |
| 9,894,851 B2 | 2/2018 | Desarzens | |
| 9,949,448 B2 | 4/2018 | Cohen | |
| D816,439 S | 5/2018 | Crook | |
| 10,010,030 B2 | 7/2018 | Motha | |
| 10,070,595 B2 | 9/2018 | Loebinger | |
| 10,107,707 B2 | 10/2018 | Defrank | |
| 2002/0064935 A1 | 5/2002 | Honda | |
| 2002/0070297 A1 | 6/2002 | Bolinis et al. | |
| 2002/0074434 A1 | 6/2002 | Delmer | |
| 2002/0088877 A1 * | 7/2002 | Bertolotti | A01G 25/023 239/542 |
| 2002/0104902 A1 | 8/2002 | Eckstein et al. | |
| 2002/0104903 A1 | 8/2002 | Eckstein et al. | |
| 2002/0113147 A1 | 8/2002 | Huntley | |
| 2003/0029937 A1 | 2/2003 | Dermitzakis | |
| 2003/0042335 A1 | 3/2003 | Krauth | |
| 2003/0050372 A1 | 3/2003 | Stanhope | |
| 2003/0057301 A1 | 3/2003 | Cohen | |
| 2003/0089409 A1 | 5/2003 | Morimoto | |
| 2003/0090369 A1 | 5/2003 | Albritton et al. | |
| 2003/0092808 A1 | 5/2003 | Stanhope | |
| 2003/0140977 A1 | 7/2003 | Berton | |
| 2003/0150940 A1 | 8/2003 | Vildibill et al. | |
| 2003/0226913 A1 * | 12/2003 | Brunnengraeber | A01G 25/023 239/542 |
| 2004/0018263 A1 | 1/2004 | Hashimshony | |
| 2004/0164185 A1 | 8/2004 | Giuffre | |
| 2005/0029231 A1 | 2/2005 | Kertscher | |
| 2005/0077396 A1 | 4/2005 | Rabinowitz | |
| 2005/0103409 A1 | 5/2005 | Weber | |
| 2005/0133613 A1 | 6/2005 | Mayer | |
| 2005/0224607 A1 | 10/2005 | Dinur et al. | |
| 2005/0224962 A1 | 10/2005 | Akamatsu | |
| 2005/0258278 A1 | 11/2005 | Cohen | |
| 2005/0258279 A1 | 11/2005 | Harrold | |

(56) References Cited

U.S. PATENT DOCUMENTS

| | | | |
|---|---|---|---|
| 2005/0279866 A1 | 12/2005 | Belford | |
| 2005/0284966 A1* | 12/2005 | DeFrank | A01G 25/023 239/542 |
| 2006/0032949 A1 | 2/2006 | Lo | |
| 2006/0043219 A1 | 3/2006 | Raanan | |
| 2006/0144965 A1 | 7/2006 | Keren | |
| 2006/0163388 A1 | 7/2006 | Mari | |
| 2006/0169805 A1 | 8/2006 | Dabir | |
| 2006/0186228 A1 | 8/2006 | Belford | |
| 2006/0202381 A1 | 9/2006 | Bach et al. | |
| 2006/0237561 A1 | 10/2006 | Park et al. | |
| 2006/0255186 A1 | 11/2006 | Ruskin | |
| 2007/0095950 A1 | 5/2007 | Kim | |
| 2007/0108318 A1 | 5/2007 | Mamo et al. | |
| 2007/0138323 A1 | 6/2007 | Lee | |
| 2007/0187031 A1 | 8/2007 | Kertscher | |
| 2007/0194149 A1 | 8/2007 | Mavrakis et al. | |
| 2008/0041978 A1 | 2/2008 | Keren | |
| 2008/0067266 A1 | 3/2008 | Cohen | |
| 2008/0099584 A1 | 5/2008 | Raanan | |
| 2008/0105768 A1 | 5/2008 | Kertscher | |
| 2008/0190256 A1 | 8/2008 | So | |
| 2008/0237374 A1 | 10/2008 | Belford et al. | |
| 2008/0257991 A1 | 10/2008 | Einav et al. | |
| 2008/0265064 A1 | 10/2008 | Keren | |
| 2009/0020634 A1 | 1/2009 | Schweitzer | |
| 2009/0145985 A1 | 6/2009 | Mayer | |
| 2009/0159726 A1 | 6/2009 | Thompson et al. | |
| 2009/0165879 A1 | 7/2009 | Socolsky | |
| 2009/0173811 A1 | 7/2009 | Gorney et al. | |
| 2009/0243146 A1 | 10/2009 | Retter | |
| 2009/0261183 A1 | 10/2009 | Mavrakis et al. | |
| 2009/0266919 A1 | 10/2009 | Mavrakis et al. | |
| 2009/0283613 A1 | 11/2009 | Barkai | |
| 2009/0302127 A1* | 12/2009 | Lutzki | A01G 25/023 239/11 |
| 2009/0314377 A1 | 12/2009 | Giuffre | |
| 2009/0320932 A1 | 12/2009 | Giuffre | |
| 2010/0023717 A1 | 1/2010 | Jinno | |
| 2010/0096478 A1 | 4/2010 | Mamo | |
| 2010/0096479 A1 | 4/2010 | Mamo | |
| 2010/0108785 A1 | 5/2010 | Lee | |
| 2010/0126974 A1 | 5/2010 | Kertscher | |
| 2010/0155508 A1 | 6/2010 | Keren | |
| 2010/0163651 A1 | 7/2010 | Feith | |
| 2010/0175408 A1 | 7/2010 | Korda | |
| 2010/0219265 A1 | 9/2010 | Feld | |
| 2010/0237170 A1 | 9/2010 | Rosenberg | |
| 2010/0244315 A1 | 9/2010 | Mamo | |
| 2010/0252126 A1 | 10/2010 | Roes | |
| 2010/0252127 A1 | 10/2010 | Gross | |
| 2010/0282873 A1* | 11/2010 | Mattlin | A01G 25/023 239/542 |
| 2011/0186652 A1 | 8/2011 | Cohen | |
| 2011/0226354 A1 | 9/2011 | Thordarson | |
| 2012/0012678 A1 | 1/2012 | Gregory | |
| 2012/0012682 A1 | 1/2012 | Einav | |
| 2012/0074345 A1 | 3/2012 | Hatton | |
| 2012/0097196 A1 | 4/2012 | Cohen | |
| 2012/0097254 A1 | 4/2012 | Cohen | |
| 2012/0097769 A1 | 4/2012 | Zavoli | |
| 2012/0104648 A1 | 5/2012 | Yiflach | |
| 2012/0126036 A1 | 5/2012 | Patel | |
| 2012/0199673 A1 | 8/2012 | Cohen | |
| 2012/0267454 A1 | 10/2012 | Einav | |
| 2012/0305676 A1 | 12/2012 | Keren | |
| 2013/0181066 A1* | 7/2013 | Dermitzakis | A01G 25/023 239/266 |
| 2013/0248616 A1* | 9/2013 | Ensworth et al. | 239/11 |
| 2013/0248622 A1* | 9/2013 | Kim | B29C 47/0038 239/542 |
| 2013/0341431 A1 | 12/2013 | Ensworth | |
| 2014/0027539 A1* | 1/2014 | Kim | A01G 25/026 239/288.3 |
| 2014/0034753 A1 | 2/2014 | Mavrakis | |
| 2014/0110506 A1 | 4/2014 | Mavrakis | |
| 2014/0246520 A1 | 9/2014 | Einav | |
| 2014/0263758 A1 | 9/2014 | Turk | |
| 2015/0014446 A1 | 1/2015 | Cohen | |
| 2015/0041563 A1* | 2/2015 | Ensworth | A01G 25/023 239/542 |
| 2015/0041564 A1* | 2/2015 | Ensworth | A01G 25/023 239/542 |
| 2015/0090815 A1 | 4/2015 | Akritanakis | |
| 2015/0090816 A1 | 4/2015 | Akritanakis | |
| 2015/0107777 A1 | 4/2015 | Zakarian | |
| 2015/0144717 A1 | 5/2015 | Turk | |
| 2015/0181816 A1 | 7/2015 | Desarzens | |
| 2015/0181820 A1 | 7/2015 | Crook | |
| 2015/0201568 A1 | 7/2015 | Einav | |
| 2015/0223414 A1 | 8/2015 | Kidachi | |
| 2015/0250111 A1 | 9/2015 | Kidachi | |
| 2015/0296723 A1 | 10/2015 | Jain | |
| 2015/0319940 A1 | 11/2015 | Kidachi | |
| 2015/0351333 A1 | 12/2015 | Eberle | |
| 2016/0057947 A1 | 3/2016 | Ensworth | |
| 2016/0075070 A1 | 3/2016 | Verelis | |
| 2016/0076965 A1 | 3/2016 | Edris | |
| 2016/0088806 A1 | 3/2016 | Haub | |
| 2016/0095285 A1 | 4/2016 | Loebinger | |
| 2016/0143231 A2 | 5/2016 | Motha | |
| 2016/0146388 A1 | 5/2016 | Smith | |
| 2016/0198643 A1 | 7/2016 | Cohen | |
| 2016/0219802 A1 | 8/2016 | Ensworth | |
| 2016/0219803 A1 | 8/2016 | Keren | |
| 2016/0223092 A1 | 8/2016 | Hadas | |
| 2016/0278311 A1 | 9/2016 | Kidachi | |
| 2016/0286741 A1 | 10/2016 | Kidachi | |
| 2016/0286743 A1 | 10/2016 | Einav | |
| 2016/0309669 A1 | 10/2016 | Kidachi | |
| 2016/0330917 A1 | 11/2016 | Kidachi | |
| 2017/0035005 A1 | 2/2017 | Kidachi | |
| 2017/0035006 A1 | 2/2017 | Kim | |
| 2017/0112078 A1 | 4/2017 | Ensworth | |
| 2017/0118927 A1 | 5/2017 | Loebinger | |
| 2017/0142916 A1 | 5/2017 | Shamshery | |
| 2017/0205013 A1 | 7/2017 | Smith | |
| 2017/0292646 A1 | 10/2017 | Hadas | |
| 2018/0027756 A1 | 2/2018 | Kidachi | |
| 2018/0098514 A1 | 4/2018 | Socolsky | |
| 2018/0110191 A1 | 4/2018 | Keren | |
| 2018/0116134 A1 | 5/2018 | Ensworth | |
| 2018/0168116 A1 | 6/2018 | Morikoshi | |
| 2018/0168117 A1 | 6/2018 | Noguchi | |
| 2018/0177145 A1 | 6/2018 | Morikoshi | |
| 2018/0199524 A1 | 7/2018 | Socolsky | |
| 2018/0228097 A1 | 8/2018 | Alkalay | |
| 2018/0266576 A1 | 9/2018 | Balet | |
| 2018/0317406 A1 | 11/2018 | Tsouri | |
| 2018/0328498 A1 | 11/2018 | Rulli | |
| 2018/0338434 A1 | 11/2018 | Wlassich | |

FOREIGN PATENT DOCUMENTS

| | | |
|---|---|---|
| CA | 1053726 | 5/1979 |
| CN | 1627994 | 6/2005 |
| CN | 102057823 | 5/2011 |
| CN | 201821716 | 5/2011 |
| CN | 201871438 | 6/2011 |
| CN | 202617872 | 12/2012 |
| CN | 102933071 | 2/2013 |
| DE | 112706 | 5/1975 |
| DE | 3525591 | 1/1986 |
| EP | 0160299 A2 | 11/1985 |
| EP | 0344605 A2 | 12/1989 |
| EP | 0353982 | 2/1990 |
| EP | 0444425 | 9/1991 |
| EP | 0480632 A2 | 4/1992 |
| EP | 0491115 A1 | 6/1992 |
| EP | 0549515 A1 | 6/1993 |
| EP | 636309 A1 | 2/1995 |
| EP | 0709020 A1 | 5/1996 |
| EP | 0730822 A2 | 9/1996 |

(56) References Cited

FOREIGN PATENT DOCUMENTS

| | | |
|---|---|---|
| EP | 493299 | 5/1997 |
| EP | 0872172 A1 | 10/1998 |
| EP | 1701147 | 9/2006 |
| EP | 2952091 A1 | 12/2015 |
| FR | 2366790 | 5/1978 |
| GB | 1498545 | 1/1978 |
| GB | 2057960 A | 4/1991 |
| IL | 42705 A | 3/1976 |
| IL | 53463 | 3/1983 |
| IL | 97564 A | 7/1996 |
| IT | 1255120 | 10/1995 |
| JP | 2000228417 | 8/2000 |
| RU | 2240682 | 1/2005 |
| RU | 2275791 | 3/2006 |
| RU | 2415565 | 4/2011 |
| WO | 9205689 A1 | 4/1992 |
| WO | 9221228 | 12/1992 |
| WO | 9427728 | 12/1994 |
| WO | 1995029761 | 11/1995 |
| WO | 9614939 | 5/1996 |
| WO | 9810635 | 3/1998 |
| WO | 9902273 | 1/1999 |
| WO | 9902273 A1 | 1/1999 |
| WO | 9918771 A1 | 4/1999 |
| WO | 9955141 A1 | 11/1999 |
| WO | 0001219 | 1/2000 |
| WO | 0010378 A1 | 3/2000 |
| WO | 0030760 | 6/2000 |
| WO | 0136106 | 5/2001 |
| WO | 0156768 A1 | 8/2001 |
| WO | 2001064019 | 9/2001 |
| WO | 0204130 | 1/2002 |
| WO | 2002015670 | 2/2002 |
| WO | 03045577 | 6/2003 |
| WO | 03066228 | 8/2003 |
| WO | 2004028778 A1 | 4/2004 |
| WO | 2007046105 | 10/2005 |
| WO | 2006030419 | 3/2006 |
| WO | 2006038246 | 4/2006 |
| WO | 2007068523 | 6/2007 |
| WO | 2010022471 | 3/2010 |
| WO | 2010048063 | 4/2010 |
| WO | 2011092557 | 8/2011 |
| WO | 2012015655 A1 | 2/2012 |
| WO | 2012160121 | 11/2012 |
| WO | 2013148672 | 10/2013 |
| WO | 2013155173 A1 | 10/2013 |
| WO | 2013192321 | 12/2013 |
| WO | 2014064452 | 5/2014 |
| WO | 2015023624 | 2/2015 |
| WO | 2015098412 | 7/2015 |
| WO | 2016156814 | 10/2016 |

OTHER PUBLICATIONS http:www.aasystems.euproducts11.html; Advanced Automation Systems Ltd., Internet page illustrating a product that Applicant believes was on sale or publicly available more than one year before the filing date of the instant application (1 p., dated Jun. 20, 2013).
http:metzerplas.comen-US50845; Meterplas Cooperative Agricultural Organization Ltd., Internet page illustrating a product that Applicant believes was on sale or publicly available more than one year before the filing date of the instant application (2 pp., dated Jun. 20, 2013).
Netafim USA, Triton X Heavywall Dripperline Catalog, May 2007, 8 pages.
Rain Bird Corporation, Drip Watering System 1994 Catalog, 1993, 16 pages.
Rain Bird Corporation, Landscape Irrigation Products 1993-1994 Catalog, p. 120, Feb. 1993, 3 pages.
Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, PC Dripline Pressure Compensating Inline Emitter Tubing Catalog, Oct. 1998, 16 pages.
Rain Bird Corporation, Turf Irrigation Equipment 1985 Catalog, p. 73, 1985, 3 pages.
Alam, M. et al., 'Subsurface Drip Irrigation for Alfalfa', Kansas State University, 2009, pp. 1-8.
Arduini, I. et al., 'Influence of Copper on Root Growth and Morphology of *Pinus pinea* L. and *Pinus pinaster* Ait. Seedlings', Tree Physiology, 15, 1995, pp. 411-415.
Beverage, K., 'Drip Irrigation for Row Crops', New Mexico State University, 2001, pp. 1-43.
Coder, K., 'Tree Root Growth Control Series: Root Control Barriers', The University of Georgia, Mar. 1998, pp. 1-7.
Crawford, M., 'Copper-Coated Containers and Their Impact on the Environment', Spin Out, 2003, pp. 76-78.
Crawford, M., 'Update on Copper Root Control', Spin Out, 1997.
Diver, S. et al., 'Sustainable Small-Scale Nursery Production', ATTRA, Nov. 2001, pp. 1-31.
Duke, K. et al., 'Sewer Line Chemical Root Control with Emphasis on Foaming Methods Using Metam-Sodium and Dichiobenil', EPA United States Environmental Protection Agency, Sep. 1995.
EPO Office Action for EPO Application No. 10 160 675.4-2313 dated Mar. 27, 2012.
EPO search report, EPO Application No. 10160675.4, dated Aug. 6, 2010.
Fitch, Even, Tabin & Flannery; Letter, Apr. 23, 2008, 1 p.
Giles-Parker, C, EPA, Pesticide Fact Sheet, pp. 1-4.
Jaffe, E., Netafim, Ltd., Patent Dept.; Letter with attached invoice May 7, 2008, 2 pages.
Jaffe, E., Netafim Ltd., Patent Dept.; Letter w/attached claim charts, Feb. 4, 2008, 6 pp.
Jaffe, E., Netafim Ltd., Patent Dept.; Letter w/attachment, Feb. 4, 2008, 7 pp.
Jaffe, E., Netafim Ltd., Patent Dept.; Letter w/attachment, May 7, 2008, 2 pp.
Jaffe, E., Netafim Ltd., Patent Dept.; Letter with attached claim charts, Jul. 12, 2009, 4 pages.
Jaffe, E. Netafim Ltd., Patent Dept., Letter with attached Appendices A-B, Aug. 1, 2010, 35 pages.
Jiang, W. et al., 'Effects of Copper on Root Growth, Cell Division, and Nucleolus of *Zea mays*', Biologia Plantarum, 44(1), 2001, pp. 105-109.
Kuhns, L. et al., 'Copper Toxicity in Woody Ornamentals', Journal of Arboriculture, Apr. 1976. dd. 68-78.
Nanda K. Alapati, Letter dated Mar. 30, 2012 with appendices.
Netafim International—Netafim USA—Internet site, 2003, 5 pages.
Netafim Letter dated Mar. 30, 2012 with appendices.
Netafim Ltd., Appendix A, images of Netafim's Drip Net product, 1 page.
Netafim Ltd., Appendix A, marked-up images of Netafim's Ram product, 1 p.
Netafim Ltd., Appendix B, Invoice, Jan. 31, 1991, 1 p.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim RAM Catalog Figures.
Office Action, U.S. Appl. No. 12/495,178, dated Feb. 3, 2010.
Office Action, U.S. Appl. No. 12/347,266, dated Mar. 7, 2011.
Office Action, U.S. Appl. No. 12/347,266, dated Nov. 17, 2010.
Office Action, U.S. Appl. No. 12/347,266, dated Sep. 7, 2010.
Office Action, U.S. Appl. No. 12/367,295, dated Feb. 11, 2011.
Office Action, U.S. Appl. No. 12/367,295, dated Jul. 15, 2011.
Office Action, U.S. Appl. No. 12/495,193, dated May 11, 2011.
Office Action, U.S. Appl. No. 11/394,755, dated Feb. 7, 2008.
Office Action, U.S. Appl. No. 11/394,755, dated Mar. 31, 2009.
Office Action, U.S. Appl. No. 11/394,755, dated May 12, 2011.
Office Action, U.S. Appl. No. 11/394,755, dated Jul. 17, 2007.
Office Action, U.S. Appl. No. 11/394,755, dated Jul. 17, 2009.

(56) References Cited

OTHER PUBLICATIONS

Office Action, U.S. Appl. No. 11/394,755, dated Aug. 14, 2008.
Office Action dated Apr. 18, 2014 for U.S. Appl. No. 12/495,178.
Office Action dated Apr. 18, 2014 for U.S. Appl. No. 12/495,193.
Office Action dated Jun. 12, 2012, for U.S. Appl. No. 12/495,178, filed Jun. 30, 2009.
Patent Cooperation Treaty, International Search Report issued in International Application No. PCT/US2013/046603, dated Sep. 19, 2013, 2 pp.
Patent Cooperation Treaty, International Searching Authority, Notification of Transmittal of the International Search Report and the Written Opinion of the International Searching Authority, or the Declaration, issued in International Application No. PCT/US2013/033866, dated Jun. 17, 2013, 10 pp.
Patent Cooperation Treaty, International Searching Authority, Notification of Transmittal of the International Search Report and the Written Opinion of the International Searching Authority, or the Declaration, issued in International Application No. PCT/US2014/050623, dated Nov. 20, 2014, 17 pp.
Patent Cooperation Treaty, International Searching Authority, Written Opinion of the International Searching Authority, issued in International Application No. PCT/US2013/046603, dated Sep. 19, 2013, 4 pp.
PCT; App. No. PCT/US2013/033866; International Search Report and Written Opinion dated Jun. 19, 2013.
PCT Application No. PCT/US13/33866 dated Mar. 26, 2013.
RAM Invoice Jan. 31, 1991.
Smiley, E. T., 'Root Growth Near Vertical Root Barriers', International Society of Arboriculture, 1995, pp. 150-152.
The Clean Estuary Partnership, 'Copper Sources in Urban Runoff and Shoreline Activities', TDC Environmental, LLC, 2004, pp. 1-72.
U.S. Appl. No. 11/359,181, filed Feb. 22, 2006 and issued on Jan. 19, 2010 as U.S. Pat. No. 7,648,085, entitled 'Drip Emitter'.
U.S. Appl. No. 12/347,266, filed Dec. 31, 2008, entitled 'Low Flow Irrigation Emitter'.
U.S. Appl. No. 12/367,295, filed Feb. 6, 2009, entitled 'Low Flow Irrigation Emitter'.
U.S. Appl. No. 12/436,394, filed May 6, 2009, entitled 'Drip Emitter and Methods of Assembly and Mounting'.
U.S. Appl. No. 12/495,178, filed Jun. 30, 2009, entitled 'Drip Emitter'.
U.S. Appl. No. 13/430,249, filed Mar. 26, 2012.
U.S. Appl. No. 13/964,903, filed Aug. 12, 2013.
U.S. Appl. No. 14/139,217, filed Dec. 23, 2013.
U.S. Appl. No. 11/394,755, filed Mar. 31, 2006, entitled "Drip Emitter".
U.S. Appl. No. 12/495,193, filed Jun. 30, 2009, entitled 'Drip Emitter,' which is a continuation of U.S. Appl. No. 11/359,181.
United States Patent and Trademark Office, Non-final Office Action issued in U.S. Appl. No. 13/800,354, dated Sep. 25, 2014, 13 pp.
U.S. Appl. No. 12/495,178; Office Action dated Nov. 18, 2014.
U.S. Appl. No. 12/495,178; Office Action dated Apr. 18, 2014.
U.S. Appl. No. 12/495,193; Office Action dated Apr. 18, 2014.
USPTO Advisory Action in U.S. Appl. No. 12/495,193 dated Sep. 5, 2013.
USPTO Office Action in U.S. Appl. No. 12/495,193, dated Jan. 6, 2012.
USPTO Office Action in U.S. Appl. No. 11/394,755, dated Dec. 19, 2011.
USPTO Office Action in U.S. Appl. No. 12/367,295, dated Jun. 8, 2012.
USPTO Office Action in U.S. Appl. No. 12/495,178, dated Jun. 21, 2012.
USPTO Office Action in U.S. Appl. No. 12/495,193 dated Jun. 18, 2013.
Wagar, et al., "Effectiveness of Three Barrier Materials for Stopping Regenerating Roots of Established Trees", Journal of Arboriculture, 19(6), Nov. 1993, pp. 332-338.

Westgate, P., 'Preliminary Report on Copper Toxicity and Iron Chlorosis in Old Vegetable Fields', Florida State Horticultural Society, 1952, pp. 143-146.
Hetzler, Mark W., Fitch, Even, Tabin & Flannery; Letter, Apr. 23, 2008, 1 p.
Office Action, U.S. Appl. No. 12/495,178, dated Apr. 18, 2014.
Office Action, U.S. Appl. No. 12/495,193, dated Apr. 18, 2014.
Patent Cooperation Treaty, International Searching Authority, Notification of Transmittal of the International Search Report and the Written Opinion of the International Searching Authority, or the Declaration, issued in International Application No. PCT/US2013/033866, dated Jun. 19, 2013, 38 pages.
U.S. Appl. No. 12/495,178, filed Jun. 30, 2009, entitled 'Drip Emitter,' which is a continuation of U.S. Appl. No. 11/359,181.
Arduini, I. et al., "Influence of Copper on Root http://syncids.com/IDSgraphics/OtherDocumentGuessBackgroundOrange.gifGrowth and Morphology of *Pinus pinea* L. and *Pinus pinaster* Ait. Seedlings", Tree Physiology, 15, 1995, pp. 411-415.
Bernard, H., et al., Assessment of herbicide leaching risk in two tropical soils of Reunion Island (France), J Environ Qual 34:534-543, (2005).
Borkow, G., et al., "A Novel Anti-Influenza Copper Oxide Containing Respiratory Face Mask", PLoS One, www.plosone.org, Jun. 2010, vol. 5, Issue 6, pp. 1-8.
Borkow, G., et al., "Copper as a Biocidal Tool", Current Medicinal Chemistry, 2005, 12, 2163-2175.
Borkow, G., et al., "Endowing Textiles with Permanent Potent Biocidal Properties by Impregnating Them with Copper Oxide", ResearchGate, Jan. 2006.
Borkow, G., et al., "Putting copper into action:copperimpregnated products with potent biocidal activities", FASEB J, 18:1728-1730, (2004).
Eason, Audra, et al., "Integrated modeling environment for statewide assessment of groundwater vulnerability from pesticide use in agriculture", Pest Manag Sci, 60:739-745 (online:2004).
Mastin, BJ, et al., "Toxicity and bioavailability of copper herbicides (Clearigate, Cutrine-Plus, and copper sulfate) to freshwater animals", Arch Environ Contam Toxicol, 39:445-451, (2000).
Murray-Gulde, CL, et al., "Algicidal effectiveness of Clearigate, Cutrine-Plus, and copper sulfate and margins of safety associated with their use", Arch Environ Contam Toxicol 42:19-27, (2002).
Netafim Ltd., Inhibition of root penetration in subsurface driplines by impregnating the drippers with copper oxide particles.
Spera, G., et al., Subsurface drip irrigation with micro-encapsulated trifluralin. Trifluralin residues in soils and cultivations. Commun Agric Appl Biol Sci 71:161-170, (2006).
U.S. Appl. No. 12/495,178; Office Action dated Mar. 11, 2015.
U.S. Appl. No. 12/495,193; Office Action dated Jan. 15, 2015.
U.S. Appl. No. 14/139,217; Office Action dated Apr. 8, 2015.
U.S. Appl. No. 12/495,178; Office Action dated Oct. 6, 2015.
U.S. Appl. No. 13/430,249; Office Action dated Oct. 26, 2015.
U.S. Appl. No. 14/047,489; Office Action dated Jun. 29, 2015.
U.S. Appl. No. 14/047,489; Office Action dated Oct. 7, 2015.
U.S. Appl. No. 14/139,217; Office Action dated Sep. 18, 2015.
U.S. Appl. No. 12/495,193; Office Action dated Oct. 1, 2015.
State Intellectual Property Office, First Office Action issued in Chinese Application No. 201380016629.9, dated Nov. 4, 2015, 16 pp.
European Patent Office, Extended European Search Report issued in Application No. 13770084.5, dated Feb. 11, 2016, 7 pp.
U.S. Appl. No. 13/430,249; Office Action dated Mar. 24, 2015.
U.S. Appl. No. 13/430,249; Notice of Allowance dated Apr. 14, 2016.
U.S. Appl. No. 14/385,564; Office Action dated Aug. 10, 2016.
U.S. Appl. No. 14/475,435; Office Action dated Jul. 20, 2016.
U.S. Appl. No. 14/851,545; Office Action dated Apr. 24, 2017.
U.S. Appl. No. 15/344,843; Office Action dated Apr. 28, 2017.
U.S. Appl. No. 12/495,193; Notice of Allowance dated May 4, 2017.
U.S. Appl. No. 14/518,774; Office Action dated May 10, 2017.
Rain Bird Corporation, Agriculture Irrigation Equipment 1981 Catalog, 1979, 3 pp.

(56) References Cited

OTHER PUBLICATIONS

Rain Bird Corporation, Landscape Irrigation Products 1993-1994 Catalog, Feb. 1993, 5 pp.
Rain Bird Corporation, Landscape Irrigation Products 2001-2001 Catalog, Mar. 2001, 9 pp.
Rain Bird Corporation, Landscape Irrigation Products 2005-2006 Catalog, Jun. 2004, 13 pp.
Rain Bird Corporation, Nursery Equipment Catalog 1986/1987, 1986, 3 pp.
Rain Bird Corporation, Turf Irrigation Equipment 1982 Catalog, 1982, 4 pp.
Rain Bird Corporation, Turf Irrigation Equipment 1983 Catalog, 1983, 4 pp.
Rain Bird Corporation, Turf Irrigation Equipment 1985 Catalog, 1985, 3 pp.
Rain Bird Corporation, Turf Irrigation Equipment 1987 Catalog, 1987, 6 pp.
U.S. Appl. No. 13/839,726; Notice of Allowance dated Dec. 1, 2016; 5 pages.
U.S. Appl. No. 12/495,193; Notice of Allowance dated Oct. 14, 2016.
U.S. Appl. No. 13/430,249; Notice of Allowance dated Sep. 19, 2016.
U.S. Appl. No. 13/839,726; Notice of Allowance dated Aug. 15, 2016.
U.S. Appl. No. 13/839,726; Notice of Allowance dated Dec. 31, 2015.
U.S. Appl. No. 13/839,726; Office Action dated Apr. 26, 2016.
U.S. Appl. No. 13/839,726; Office Action dated May 28, 2015.
U.S. Appl. No. 12/495,193; Notice of Allowance dated Feb. 10, 2017.
U.S. Appl. No. 13/839,726; Office Action dated Mar. 20, 2017.
U.S. Appl. No. 14/385,564; Office Action dated Mar. 10, 2017.
U.S. Appl. No. 14/475,435; Office Action dated Jan. 26, 2017.
U.S. Appl. No. 13/839,726; Office Action dated May 30, 2017; (4 pages).
U.S. Appl. No. 14/910,573; Office Action dated Jun. 27, 2017; (10 pages).
European Patent Office, Extended European Search Report issued in Application No. 13768209.2, dated Nov. 24, 2015, 10 pp.
Final Office Action dated Aug. 25, 2015; U.S. Appl. No. 13/430,308; 11 pages.
Final Office Action dated Jul. 21, 2016; U.S. Appl. No. 13/430,308; 9 pages.
Non-Final Office Action dated Feb. 11, 2016; U.S. Appl. No. 13/430,308; 9 pages.
Patent Cooperation Treaty, International Searching Authority, Notification of Transmittal of the International Search Report and the Written Opinion of the International Searching Authority, or the Declaration, issued in International Application No. PCT/US/2014/054533, dated Dec. 25, 2014, 9 pp.
U.S. Appl. No. 14/036,881; Corrected Notice of Allowability dated May 22, 2017.
U.S. Appl. No. 14/036,881; Notice of Allowance dated May 8, 2017.
U.S. Appl. No. 14/036,881; Notice of Allowance dated Dec. 23, 2016.
U.S. Appl. No. 14/036,881; Office Action dated Aug. 2, 2016.
U.S. Appl. No. 14/036,881; Office Action dated Dec. 9, 2015.
U.S. Appl. No. 15/331,407; Office Action dated Apr. 27, 2017.
European Patent Office, Communication Pursuant to Article 94(3) EPC issued in European Application No. 14 836 360.9, dated Feb. 8, 2017, 7 pp.
http://aasystems.eu/dripper/; Advanced Automation Systems Ltd., Dec. 18, 2015, 12 pp.
Patent Cooperation Treaty, Notification of Transmittal of the International Search Report and the Written Opinion of the International Searching Authority, or the Declaration, Issued in International Application No. PCT/US2017042378, dated Oct. 26, 2017, 7 pp.
USPTO; U.S. Appl. No. 14/036,881; Notice of Allowance dated Aug. 24, 2017; (pp. 1-7).
USPTO; U.S. Appl. No. 13/839,726; Notice of Allowance dated Sep. 14, 2017; (pp. 1-5).
USPTO; U.S. Appl. No. 13/964,903; Notice of Allowance dated Aug. 4, 2017; (pp. 1-11).
USPTO; U.S. Appl. No. 13/964,903; Notice of Allowance dated Sep. 18, 2017; (pp. 1-7).
USPTO; U.S. Appl. No. 14/036,881; Notice of Allowability dated Nov. 29, 2017; (pp. 1-2).
USPTO; U.S. Appl. No. 14/036,881; Notice of Allowability dated Dec. 26, 2017; (pp. 1-2).
USPTO; U.S. Appl. No. 14/385,564; Notice of Allowability dated Nov. 29, 2017; (pp. 1-2).
USPTO; U.S. Appl. No. 14/385,564; Notice of Allowability dated Dec. 26, 2017; (pp. 1-2).
USPTO; U.S. Appl. No. 14/385,564; Notice of Allowance dated Aug. 22, 2017; (pp. 1-8).
USPTO; U.S. Appl. No. 14/475,435; Office Action dated Sep. 27, 2017; (pp. 1-9).
USPTO; U.S. Appl. No. 14/518,774; Notice of Allowance dated Jan. 4, 2018; (pp. 1-4).
USPTO; U.S. Appl. No. 14/518,774; Notice of Allowance dated Oct. 26, 2017; (pp. 1-7).
USPTO; U.S. Appl. No. 14/851,545; Office Action dated Oct. 30, 2017; (pp. 1-27).
USPTO; U.S. Appl. No. 14/910,573; Office Action dated Feb. 13, 2018; (pp. 1-10).
USPTO; U.S. Appl. No. 15/331,407; Corrected Notice of Allowability dated Dec. 28, 2017; (pp. 1-2).
USPTO; U.S. Appl. No. 15/331,407; Notice of Allowability dated Nov. 30, 2017; (pp. 1-2).
USPTO; U.S. Appl. No. 15/331,407; Notice of Allowance dated Oct. 27, 2017; (pp. 1-9).
USPTO; U.S. Appl. No. 15/344,843; Corrected Notice of Allowability dated Dec. 28, 2017; (pp. 1-2).
USPTO; U.S. Appl. No. 15/344,843; Notice of Allowability dated Nov. 30, 2017; (pp. 1-2).
USPTO; U.S. Appl. No. 15/344,843; Notice of Allowance dated Oct. 16, 2017; (pp. 1-7).
ASME 2015 International Design Engineering Technical Conferences & Computers and Information in Engineering Conference, K. Taylor et al, "A Mathematical Model for Pressure Compensating Emitters", Aug. 2-5, 2015, Boston, Massachusetts, USA, 10 pp.
State Intellectual Property Office of People'S Republic of China, First Office Action issued in Application No. 201480045002.0, dated Apr. 16, 2018, 20 pp.
DIG® Irrigation Product Catalog, <www.digcorp.com>, 2018, 72 pages.
DIG® Irrigation Product Catalog, <www.digcorp.com>, 2012, 32 pages.
DIG® Irrigation Product Catalog, <www.digcorp.com>, 2016, 72 pages.
Irritec® On Line Drippers iDrop®, Drritec S.p.A., <www.irritec.com>, available prior to May 15, 2017, 2 pages.
Irritec® Product Catalog and Price List, Irritec USA Inc., <www.irritec.com>, 2016, 66 pages.
Irritec™ USA iDrop™ PCDS, Irritec Inc., <www.irritecusa.com>, available prior to May 15, 2017, 2 pages.
Jain® Button Emitters, Jain Irrigation Inc., <www.jainsusa.com>, available prior to May 15, 2017, 2 pages.
Jain® Emission Devices, Jain Irrigation Systems Ltd., <www.jainsusa.com>, available prior to May 15, 2017, pp. 171-182.
Jain® Landscape Catalog , Jain Irrigation, Inc., <www.jainsusa.com>, 2016, 102 pages.
Jain® Online Emitters, Jain Irrigation Systems Ltd., <www.jainsusa.com>, available prior to May 15, 2017, 2 pages.
Netafim™ Non-Pressure Compensating Drippers, Netafim USA, <www.netafimusa.com>, available prior to May 15, 2017, 2 pages.
Netafim™ Point Source Emitters, Netafim USA, <www.netafimusa.com>, available prior to May 15, 2017, 4 pages.
Netafim™ Pressure Compensating (PC) Spray Stakes, Netafim USA, <www.netafimusa.com>, as of Apr. 2016, 12 pages.

(56) References Cited

OTHER PUBLICATIONS

Netafim™ Pressure Compensating Drippers, Netafim USA, <www.netafimusa.com>, Apr. 2016, 2 pages.
Netafim™ Pressure Compensating Drippers, Netafim USA, <www.netafimusa.com>, Jun. 2018, 2 pages.
Photograph of DIG® Product No. PCA-003CV, available prior to May 15, 2017, 1 page.
Photograph of Irritec® Product No. A6-WPC2BB, available prior to May 15, 2017, 1 page.
Photograph of Irritec® Product No. A6-WPC3BB, available prior to May 15, 2017, 1 page.
Photograph of Jain® Product No. CTTPC2-CNL, available prior to May 15, 2017, 1 page.
Photograph of Jain® Product No. CTTPC4-CNL, available prior to May 15, 2017, 1 page.
Photograph of Netafim™ Product No. SPCV10, available prior to May 15, 2017, 1 page.
Photograph of Netafim™ Product No. Techflow Emitter WPC20, available prior to May 15, 2017, 1 page.
Photograph of Netafim™ Product No. WPC10, available prior to May 15, 2017, 1 page.
Photograph of Netafim™ Woodpecker Junior Product No. 01WPCJL4, available prior to May 15, 2017, 1 page.
Photograph of Toro® Product No. A6-WPC2BB, available prior to May 15, 2017, 1 page.
Price Book, Oct. 2015, Rivulis Irrigation, Oct. 2015 (Revised Apr. 2016), <rivulis.com>, 116 pages.
Toro® NGE® AL Anti-Drain Pressure Compensating Emitter, The Toro Company, <www.toro.com>, 2012, 2 pages.
Toro® NGE® Emitters, The Toro Company, <www.toro.com>, 2018, 2 pages.
Toro® NGE® New Generation Emitters, The Toro Company, <www.toro.com>, 2013, 2 pages.
Toro® NGE® SF Self-flushing Pressure Compensating Emitter, The Toro Company, <www.toro.com>, 2012, 2 pages.
Toro® Turbo-SC® Plus Pressure-compensating Emitter, The Toro Company, <www.toro.com>, 2009, 2 pages.
Patent Cooperation Treaty, International Searching Authority, Notification of Transmittal of the International Search Report and the Written Opinion of the International Searching Authority, or the Declaration, issued in International Application No. PCT/US2018/015516, dated Jun. 28, 2018, 8 pages.
USPTO; U.S. Appl. No. 14/036,881; Corrected Notice of Allowability dated May 21, 2018 (pp. 1-2).
USPTO; U.S. Appl. No. 14/036,881; Notice of Allowance dated May 9, 2018 (pp. 1-5).
USPTO; U.S. Appl. No. 15/650,379; Office Action dated May 18, 2018 (pp. 1-8).
USPTO; U.S. Appl. No. 14/851,545; Office Action dated Jul. 3, 2018; (pp. 1-29).
metzerplas.com, OEM Drippers, Sep. 29, 2013, [online]. Retrieved from the Internet via the Internet Archive: Wayback Machine: <URL: http://metzerplas.com/en-US/48/865/> on Dec. 10, 2018, 2 pages.
Dixieline Lumber & Home Centers Catalog, DIG Irrigation Products Drip Tubing, 2003, p. 13.
Rain Bird® Consumer Products Catalog, Tubing, D33305-11, copyright date 2010, p. 48.
Rain Bird® Landscape Irrigation Products 1997-1998 Catalog, Component and Emmision Device, D48301, copyright date Aug. 1997, pp. 128-129.
Rain Bird® Landscape Irrigation Products 1999-2000 Catalog, Emission Devices, D37200, copyright date Aug. 1998, pp. 136-137.
Rain Bird® Landscape Irrigation Products 2004 New Products Catalog, D37200D, copyright date Oct. 2003, pp. 41-42.
Rain Bird® Landscape Irrigation Products 2008-2009 Catalog, D37200H, copyright date Sep. 2007, pp. 180-187.
Rain Bird® Landscape Irrigation Products, Rain Bird Dripline Series, RBE-03-TE-10, copyright date Aug. 2003, pp. 106-107.
Rain Bird® Nursery Equipment Catalog 1986-1987, D32304, copyright date 1986, p. 13.
Rain Bird@ XF Series Dripline | Design, Installation and Maintenance Guide, D40024A, copyright date Feb. 2012, 48 pages.
Rain Bird® XFCV Dripline with Heavy-Duty Check Valve, D40215, copyright date Oct. 2012, 2 pages.
Rain Bird® XFD Dripline with Greater Flexiblity, D39994B, copyright date Jan. 2012, 2 pages.
Rain Bird® XFS Dripline with Copper Shield™ Technology, D39978B, copyright date Jan. 2012, 2 pages.
Rain Tape Design Guide, Rain Bird®, D35252, document was published more than a year before the filed of the instant application, 5 pages.
European Patent Application No. 18172143.2, Extended European Search Report, dated Oct. 15, 2018, 9 pages.
USPTO; U.S. Appl. No. 14/851,545; Office Action dated Oct. 29, 2018; (pp. 1-32).
Photographs of an in-line cylindrical drip emitter on sale or publicly disclosed more than a year before the filing of the instant application, 2 pages.
Eurodrip U.S.A., Inc., 2009 Irrigation Products Catalog, pg. 4-5, 4 pages.
Eurodrip U.S.A., Inc., Products Guide, copyright date Nov. 2007, 2 pages.
Hunter Industries, Drip Design Guide, Dec. 2012, 32 pages.
Jain Irrigation Inc., 2009 Product Catalog, pp. 12-13, copyright date 2009 (revised Oct. 2008), 4 pages.
NDS Inc., Agrifim Drip and Micro Irrigation Catalog, Jan. 2004, 3 pages.
Netafim USA, Landscape & Turf Division Product Catalog, Aug. 2004, 36 pages.
Netafim, Ram Pressure Compensating Dripperline brochure, Feb. 1997, 4 pages.
Rain Bird Corporation, Rain Bird PC Dripline brochure, copyright date Nov. 2000, 12 pages.
Siplast/Irritec Multibar Pressure Compensated Coextruded Dripline, Jul. 22, 2005, 4 pages.
The Toro Company, 2000-2001 Irrigation Products Catalog, p. 28, copyright date Oct. 1999, 3 pages.
The Toro Company, Drip in Classic Turbulent Flow Dripline brochure, Jun. 2014, 4 pages.
The Toro Company, Drip in PC Brown Dripline brochure, 2015, 2 pages.
Brazilian Patent and Trademark Office, Search Report dated Nov. 19, 2018 for Brazilian Patent Application No. BR 11 2014 023843-0, 2 pages.
Brazilian Patent and Trademark Office, Technical Examination Report dated Nov. 19, 2018 for Brazilian Patent Application No. BR 11 2014 023843-0, 9 pages.
Cetesb and Sindiplast, Environmental Guide of the Plastic Materials Recycling and Processing Industry [electronic resource], Technical elaboration: Gilmar do Amaral et al., Collaborators: Andre H.C. Botto e Souza et al., 2011. Retrieved from the Internet: <URL: http://file.sindiplast.org.br/download/guia_ambiental_internet.pdf>, 91 pages.
European Patent Office, Communication Pursuant to Article 94(3) EPC issued in European Application No. 13 768 209.2, Jan. 4, 2019, 5 pages.
Lady Bug Emitter, Rain Bird Sales, Inc., <https://web.archive.org/web/19980121011011/http://www.rainbird.com:80/rbturf/products/xeri/emission/ladybug.htm>, dated Dec. 1997, 2 pages.
Multi-Outlet Xeri-Bug™, Rain Bird Sales, Inc., <https://web.archive.org/web/19980121010952/http://www.rainbird.com:80/rbturf/products/xeri/emission/moutlet.htm>, 1997, 2 pages.
Photograph of Toro® Product No. DPC08-MA-Red, Jun. 22, 2012, 1 page.
Pressure-Compensating Modules, Rain Bird Sales, Inc., <https://web.archive.org/web/19980121011024/http://www.rainbird.com:80/rbturf/products/xeri/emission/prescmp.htm>, 1997, 2 pages.
Rain Bird Multi-Outlet Xeri-Bug, 1998, 1 page.
Rain Bird Pressure-Compensating Module, 1998, 1 page.
Rain Bird Xeri-Bug, 1998, 3 pages.

(56) References Cited

OTHER PUBLICATIONS

USPTO; U.S. Appl. No. 15/595,427; Office Action dated Dec. 17, 2018; (pp. 1-6).
USPTO; U.S. Appl. No. 15/650,379; Notice of Allowance dated Feb. 19, 2019; (pp. 1-5).

\* cited by examiner

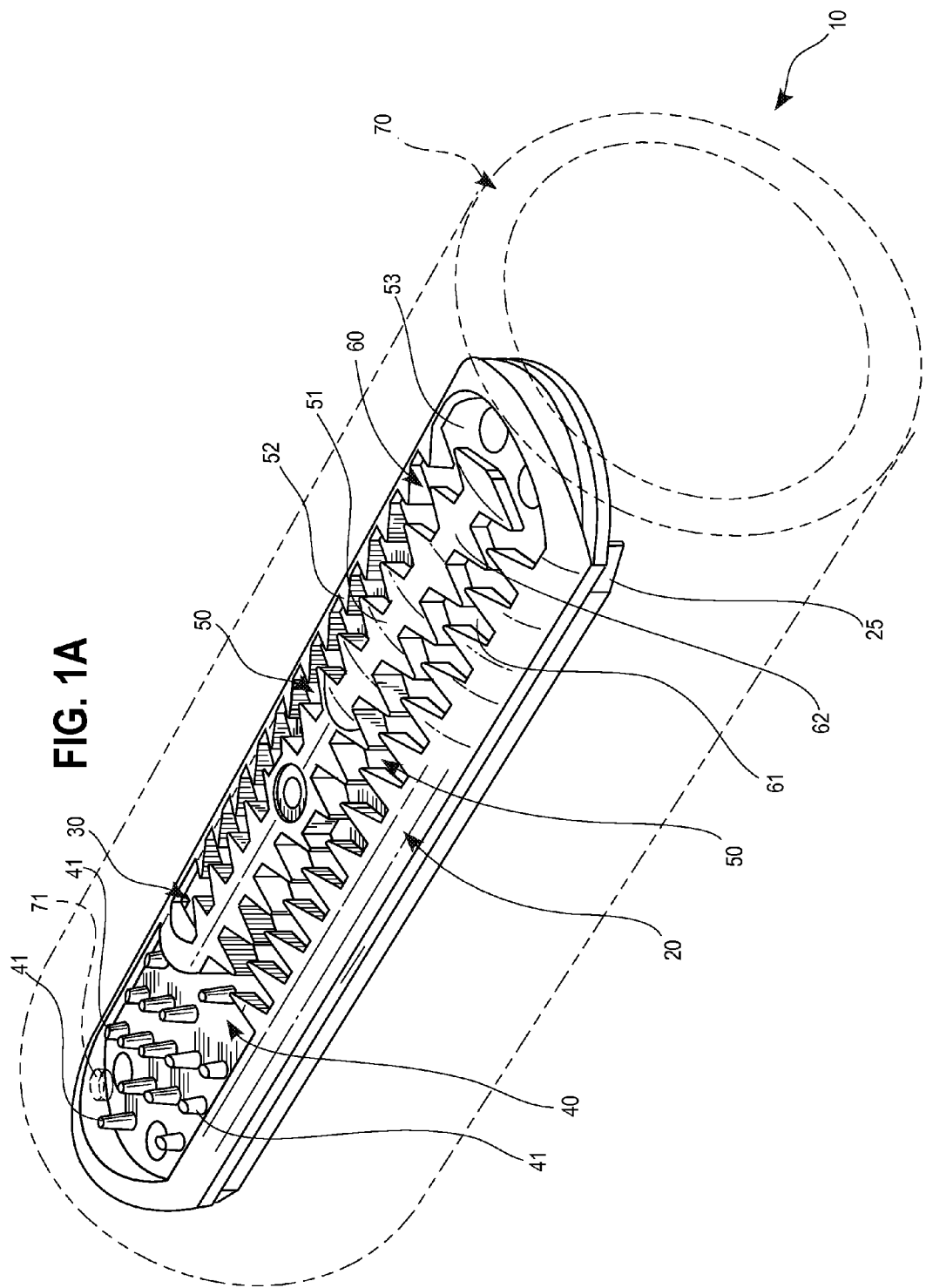

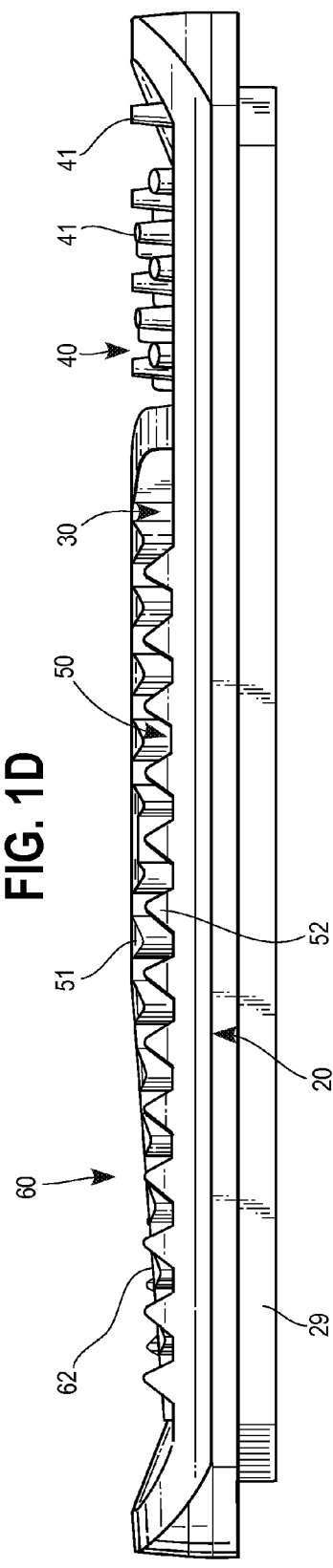
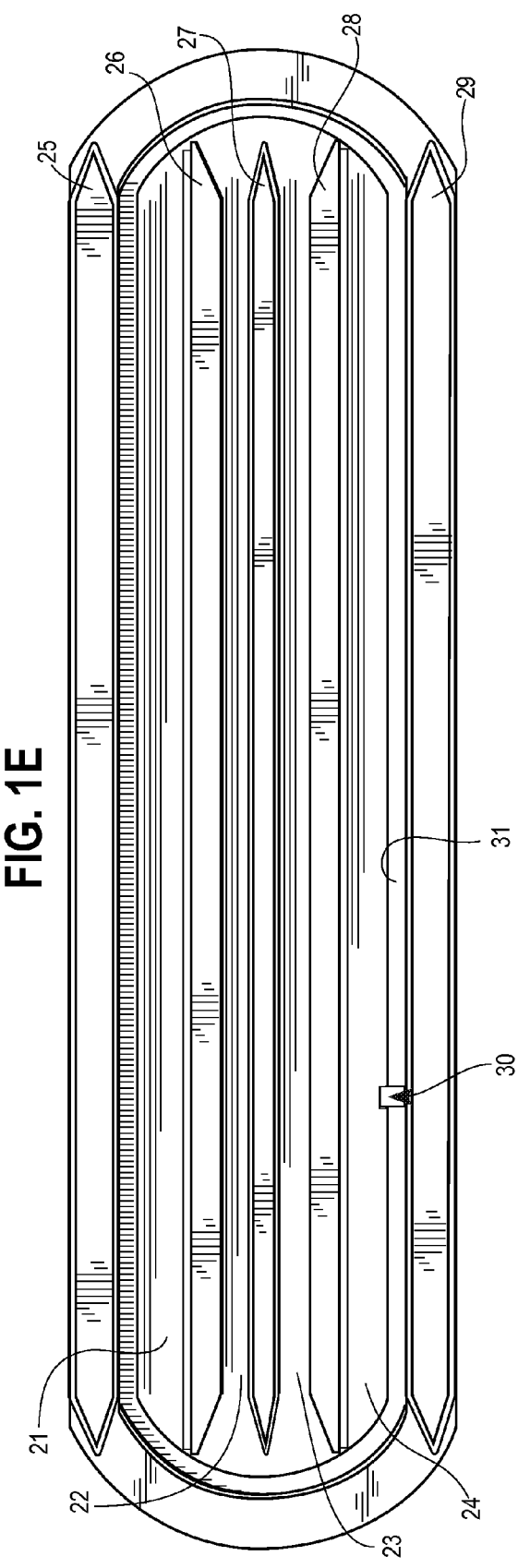

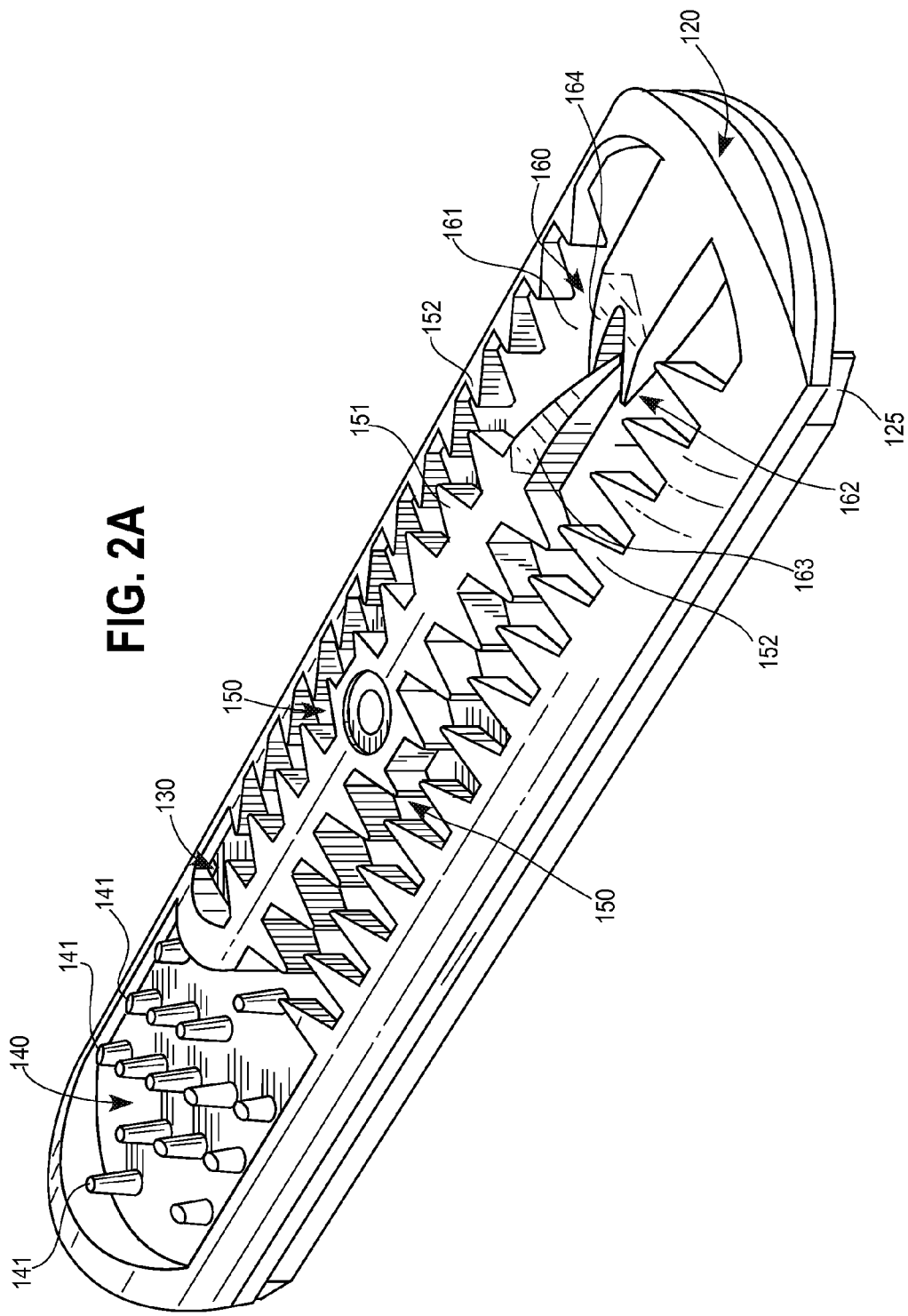

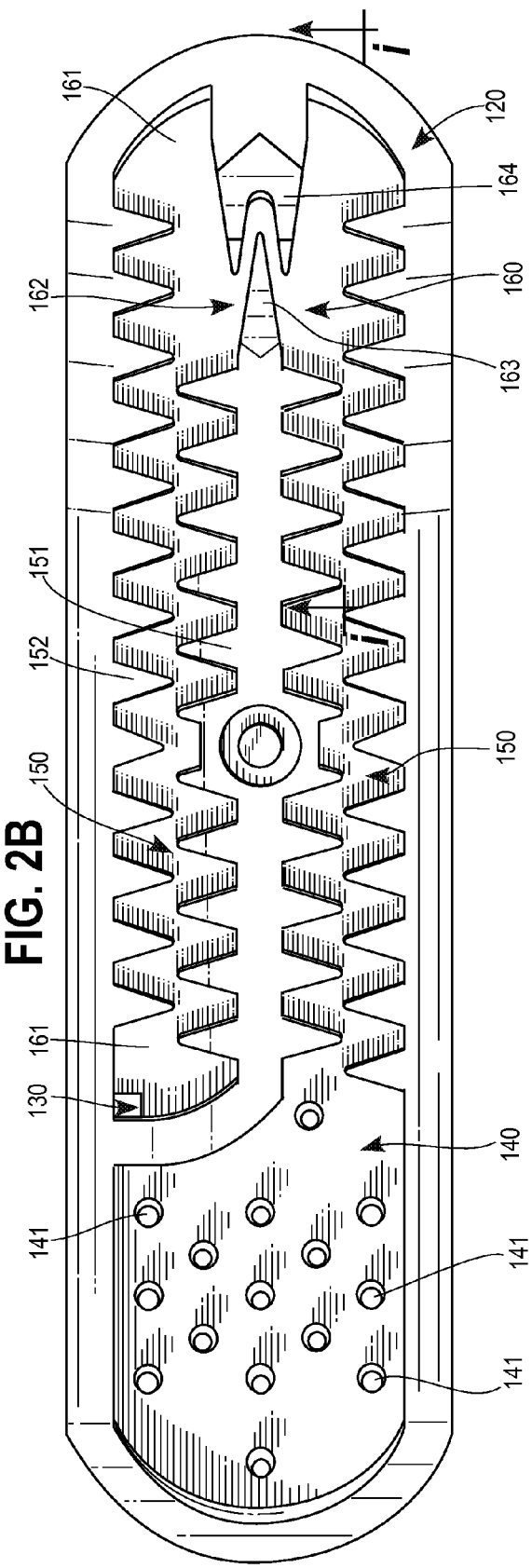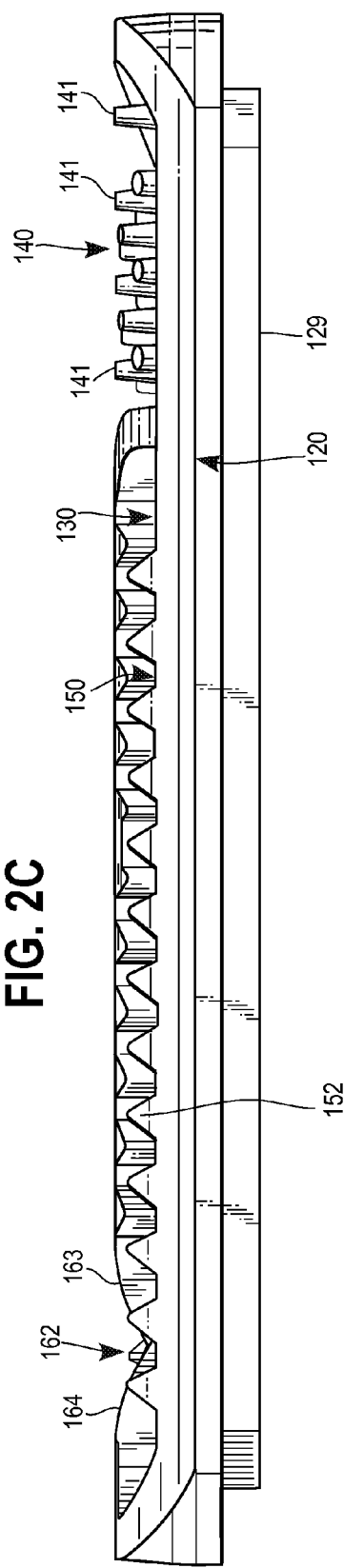

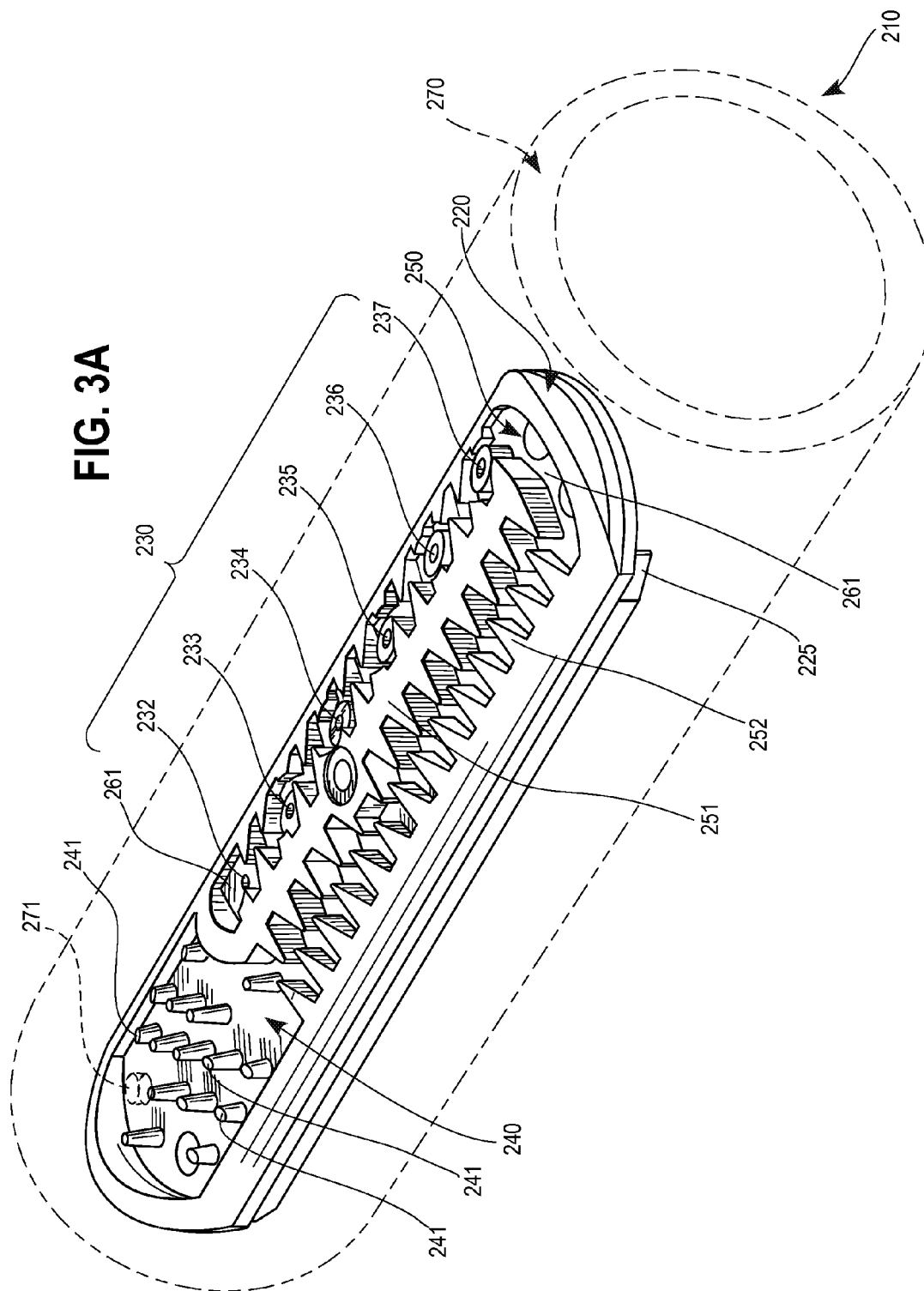

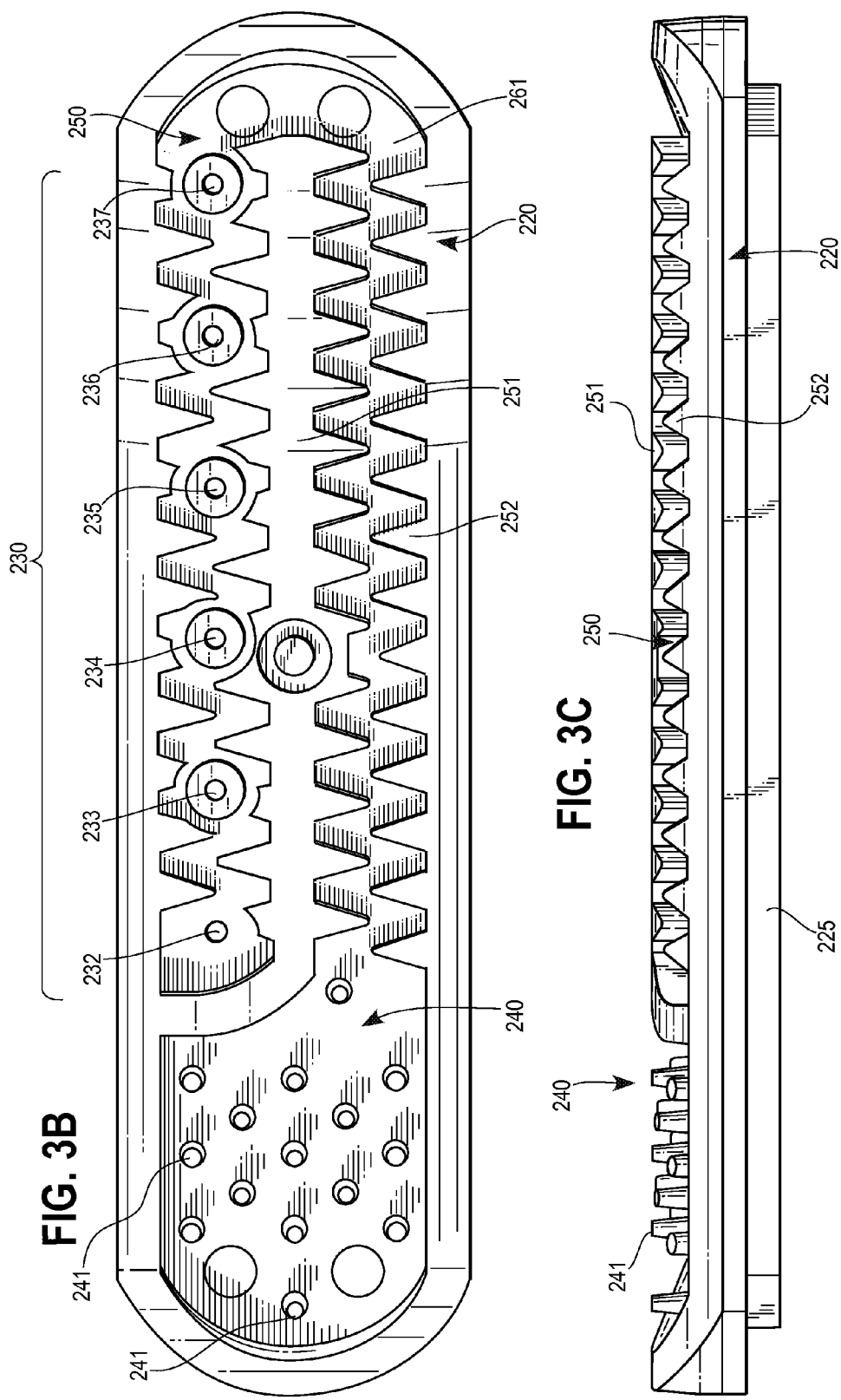

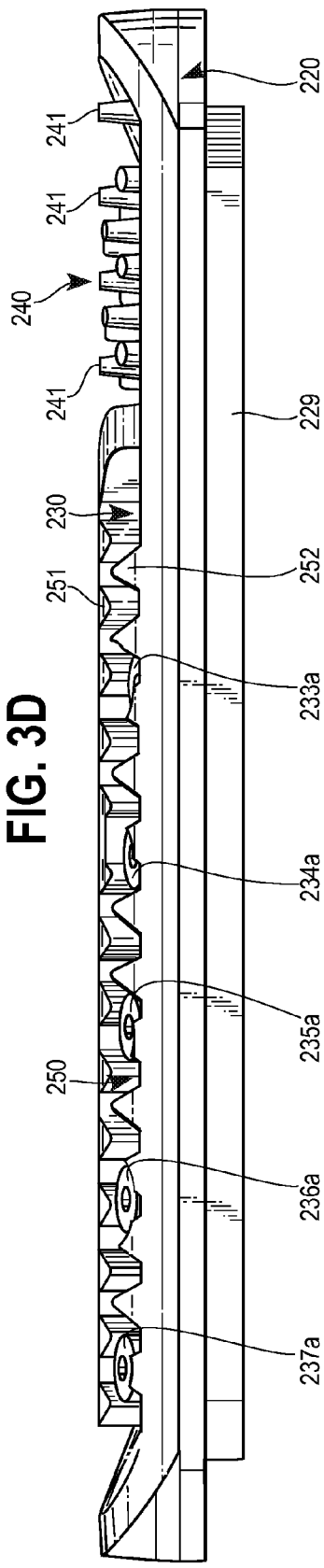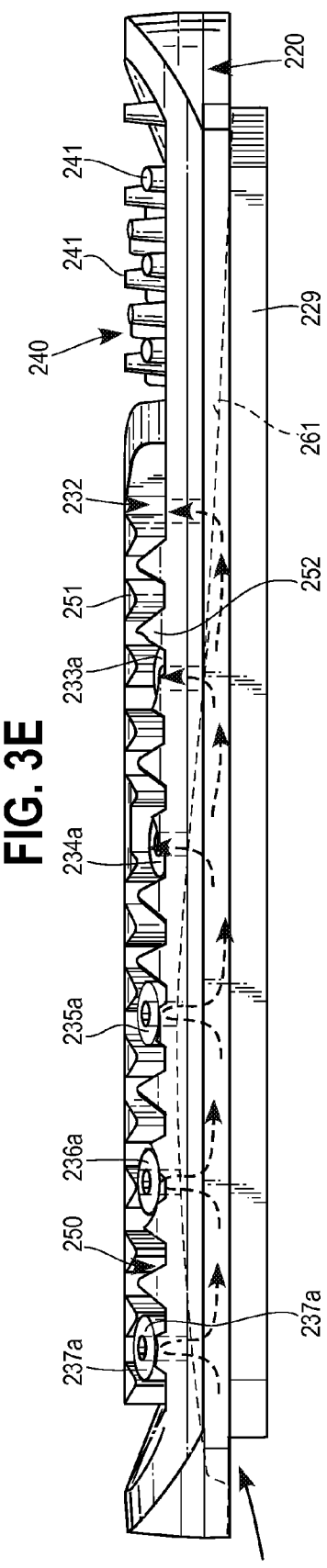

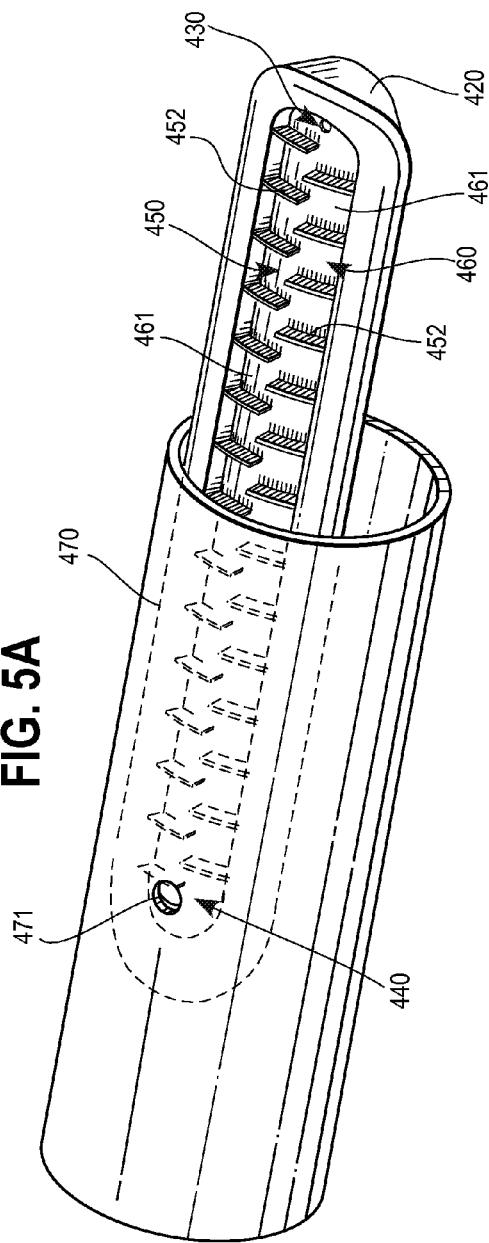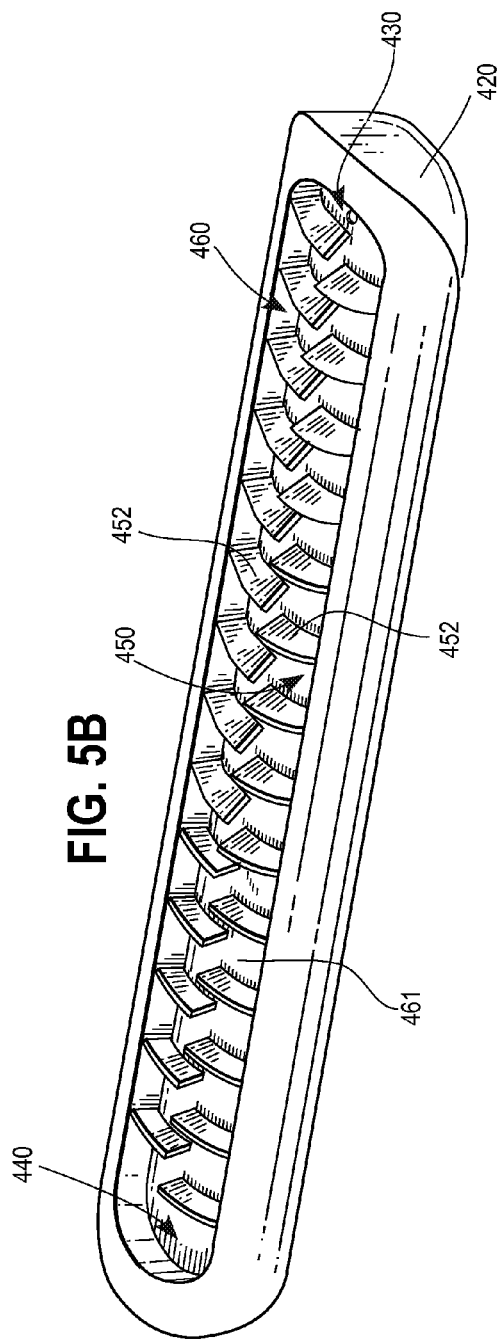

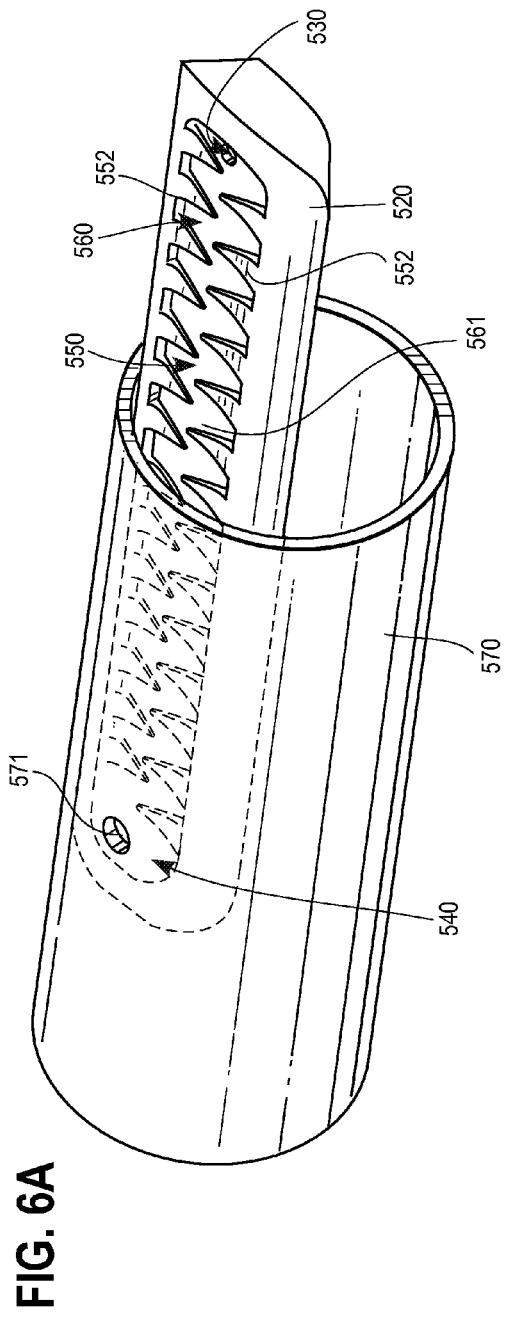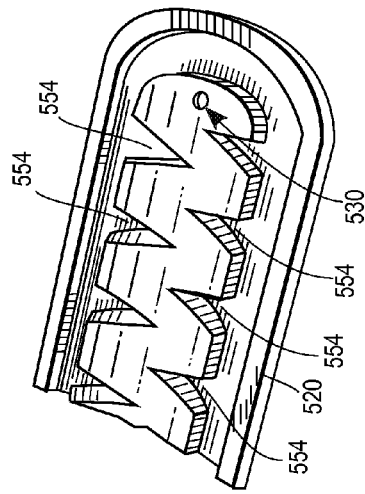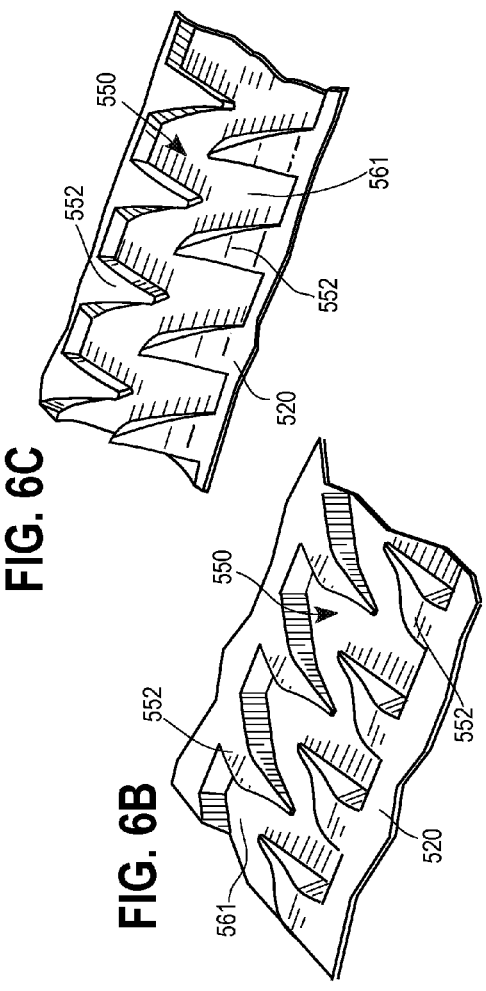

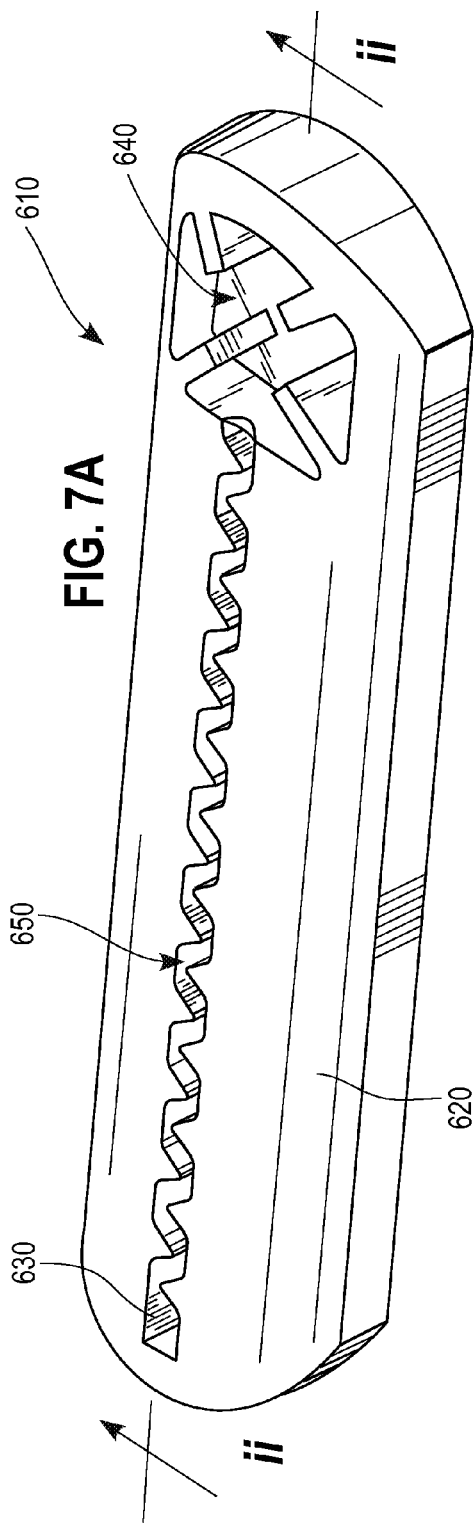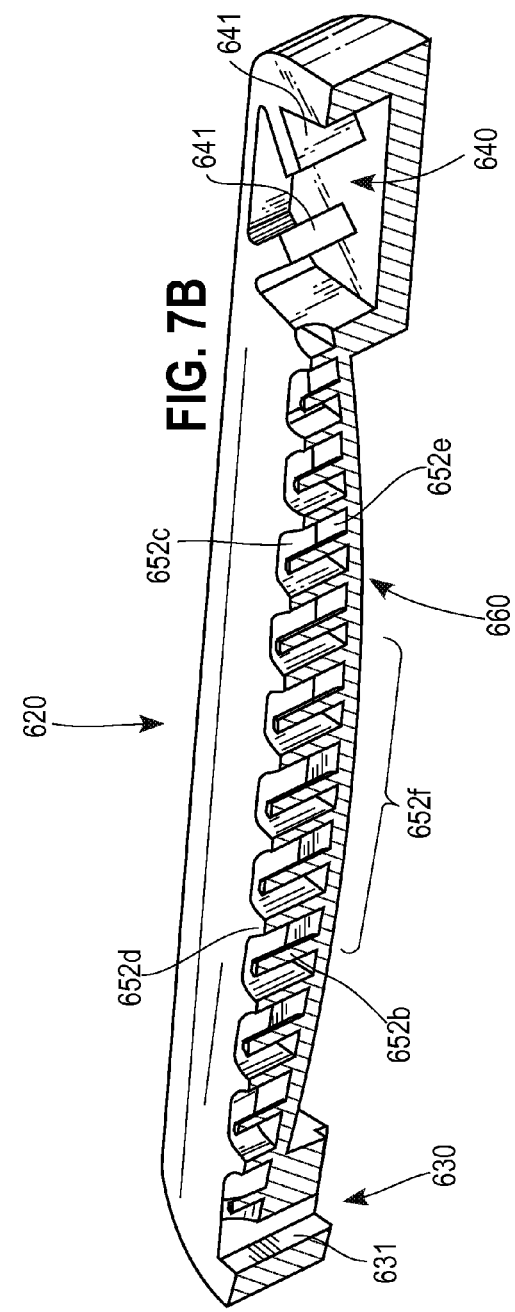

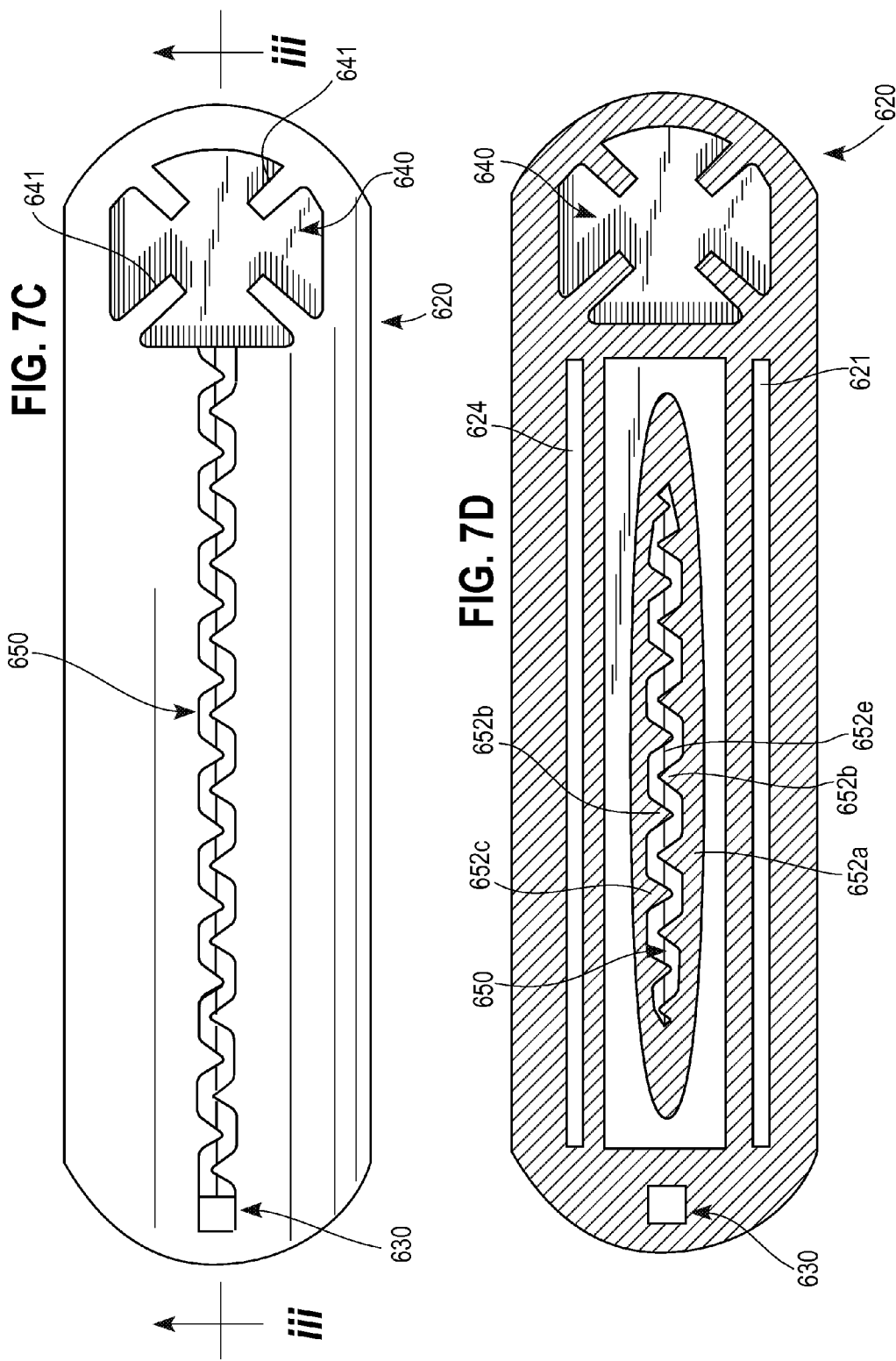

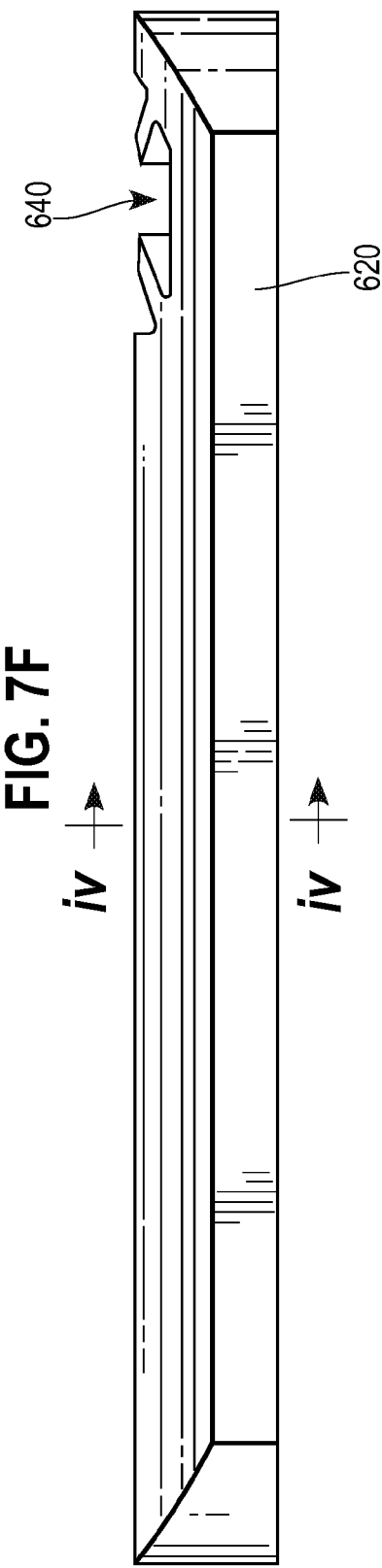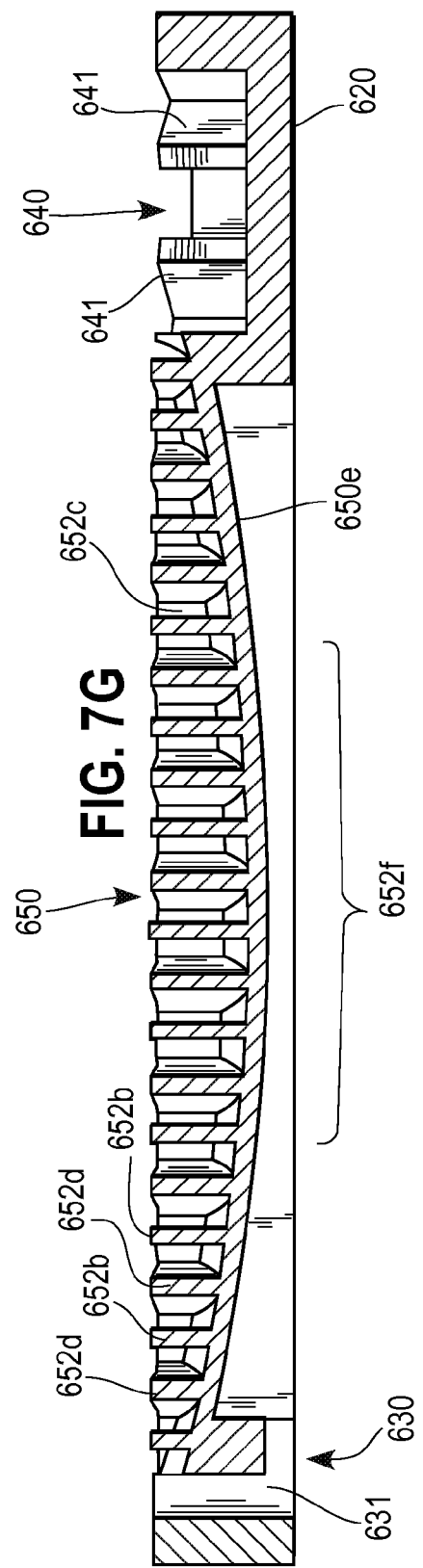

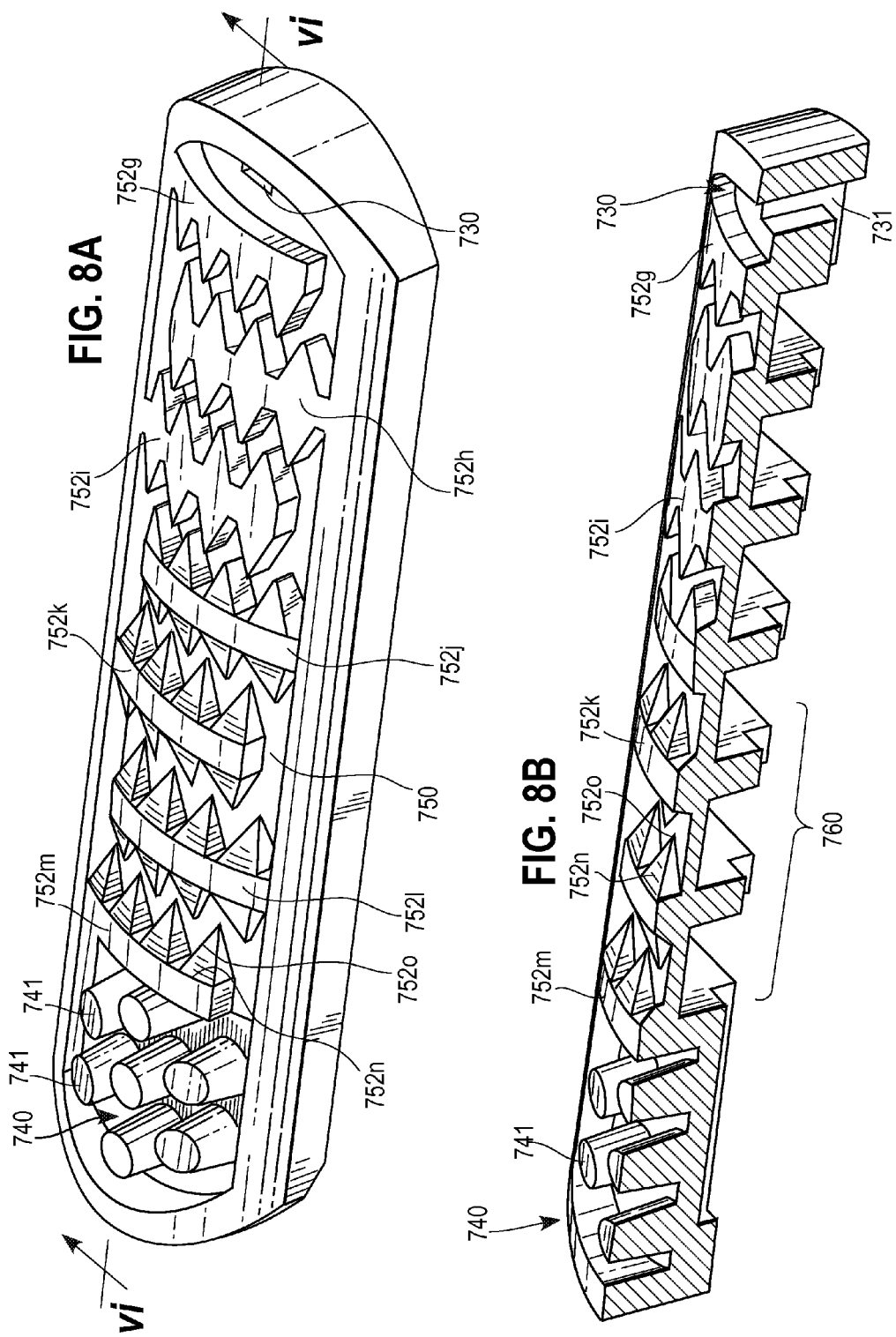

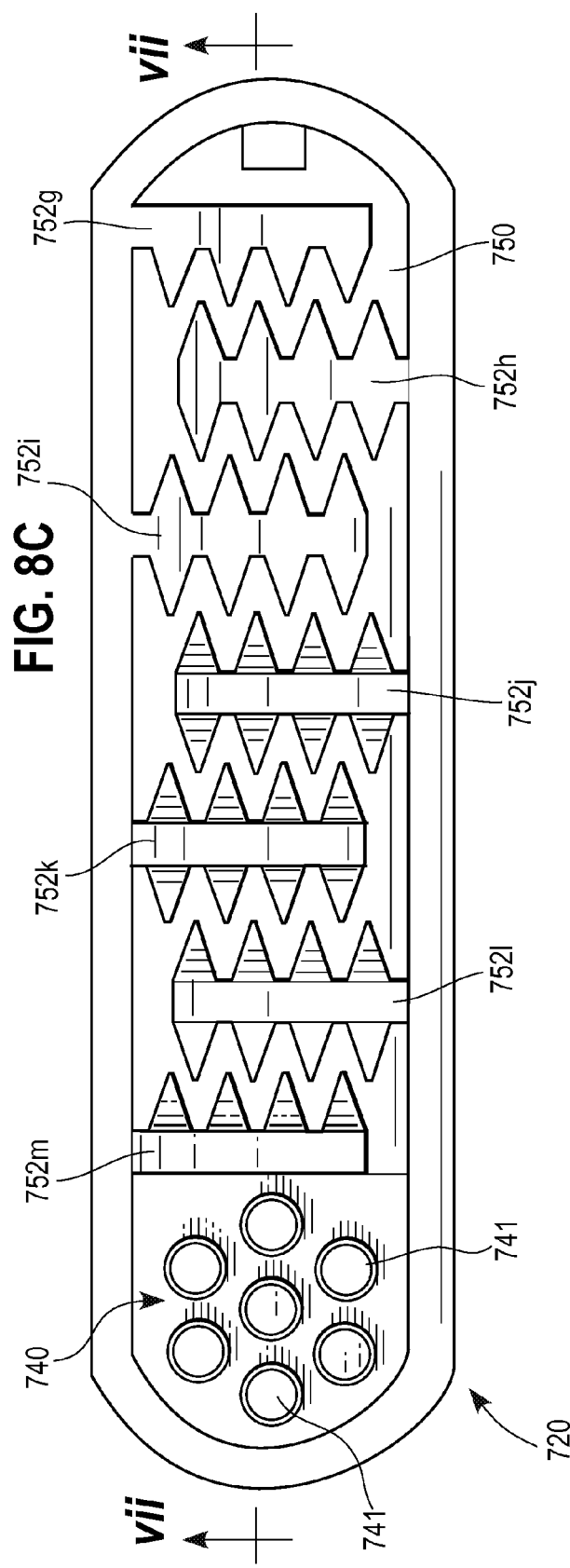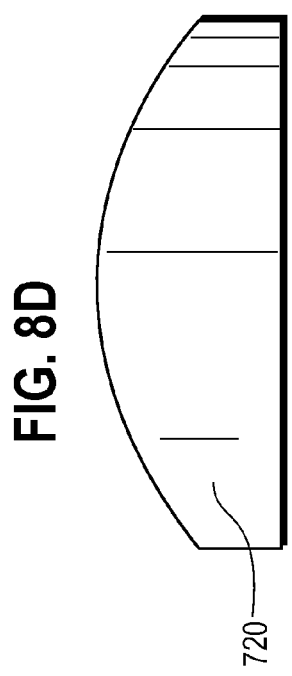

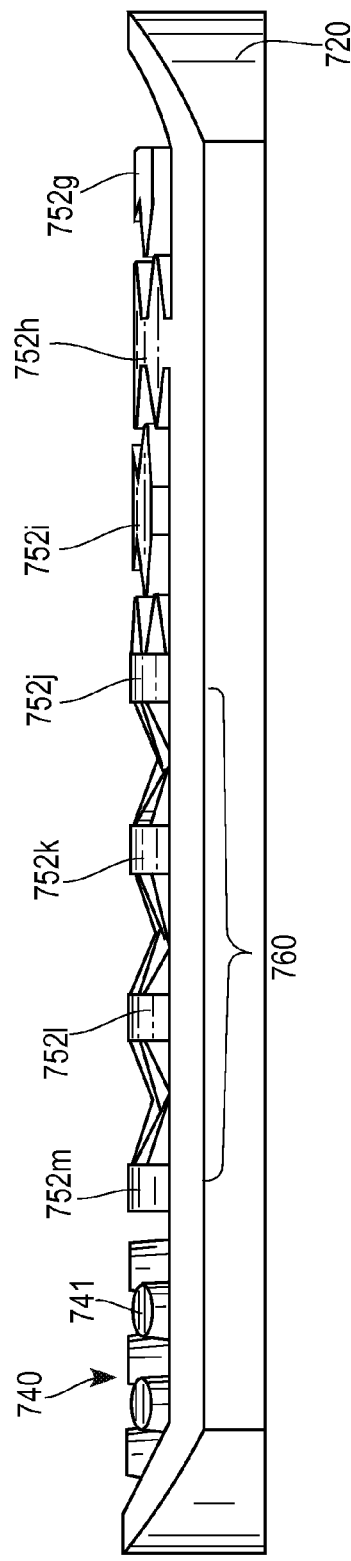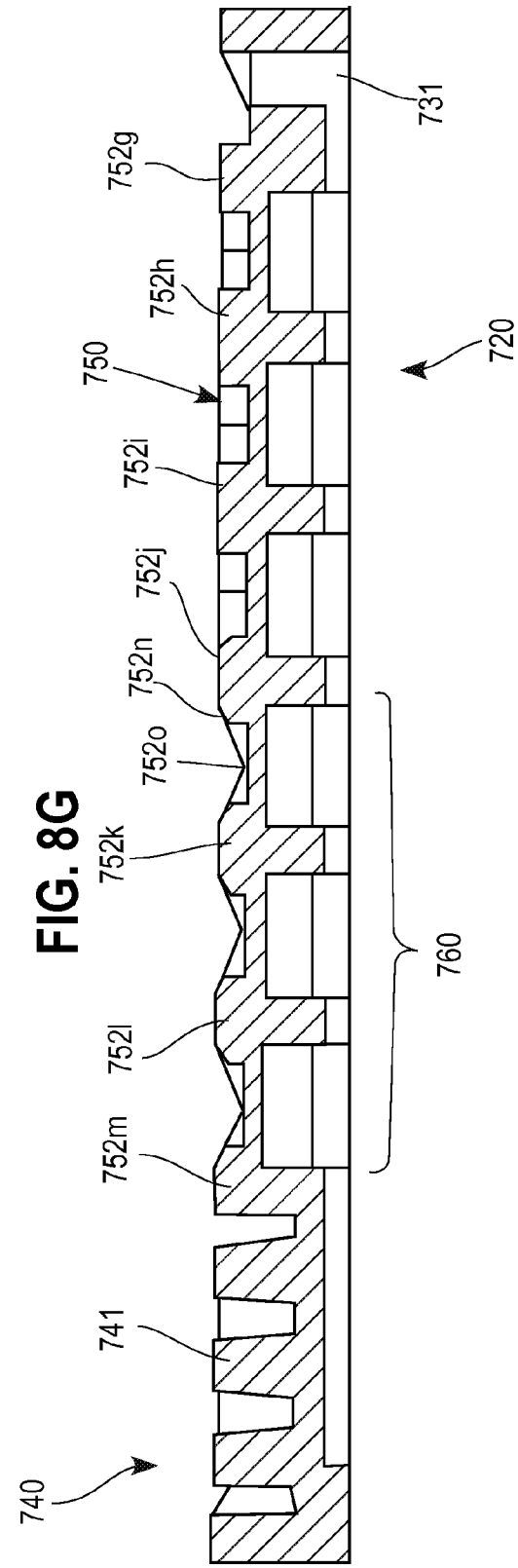

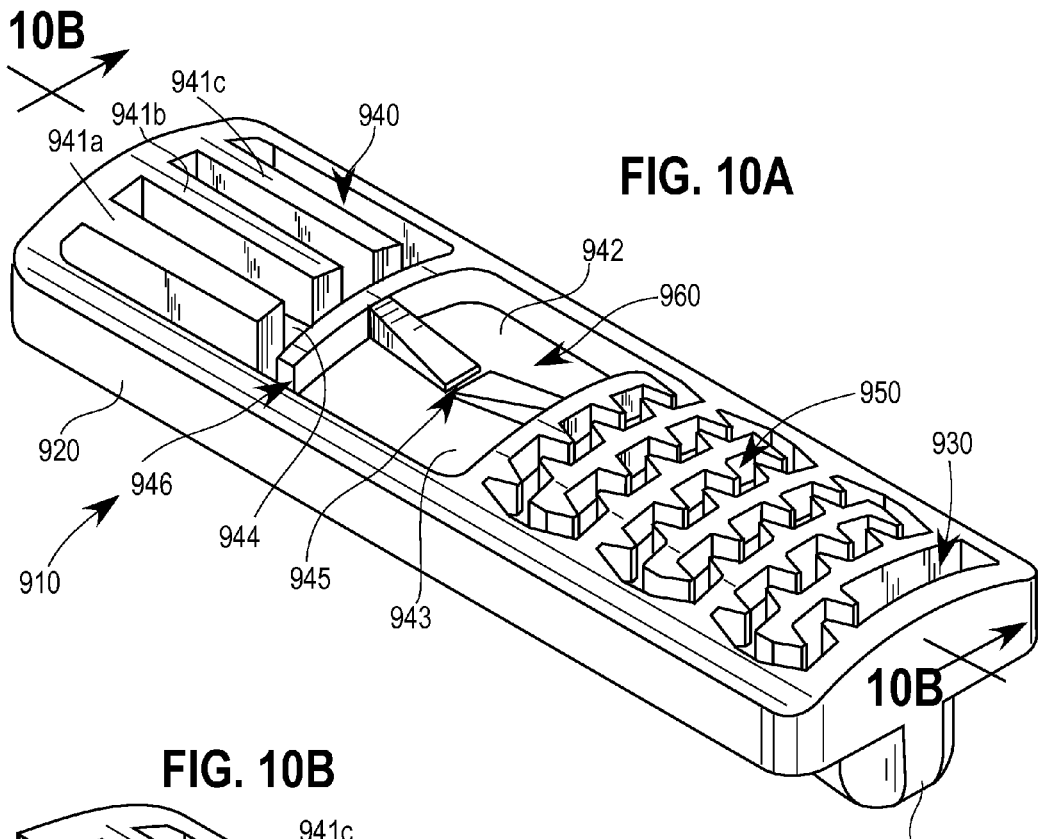
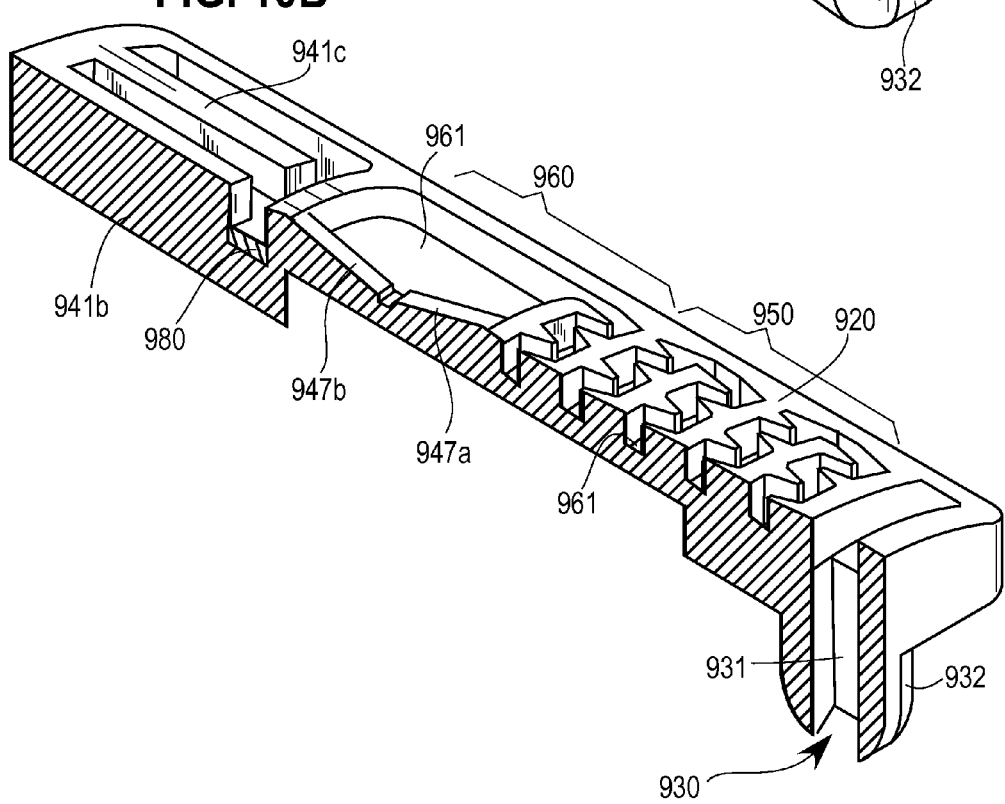

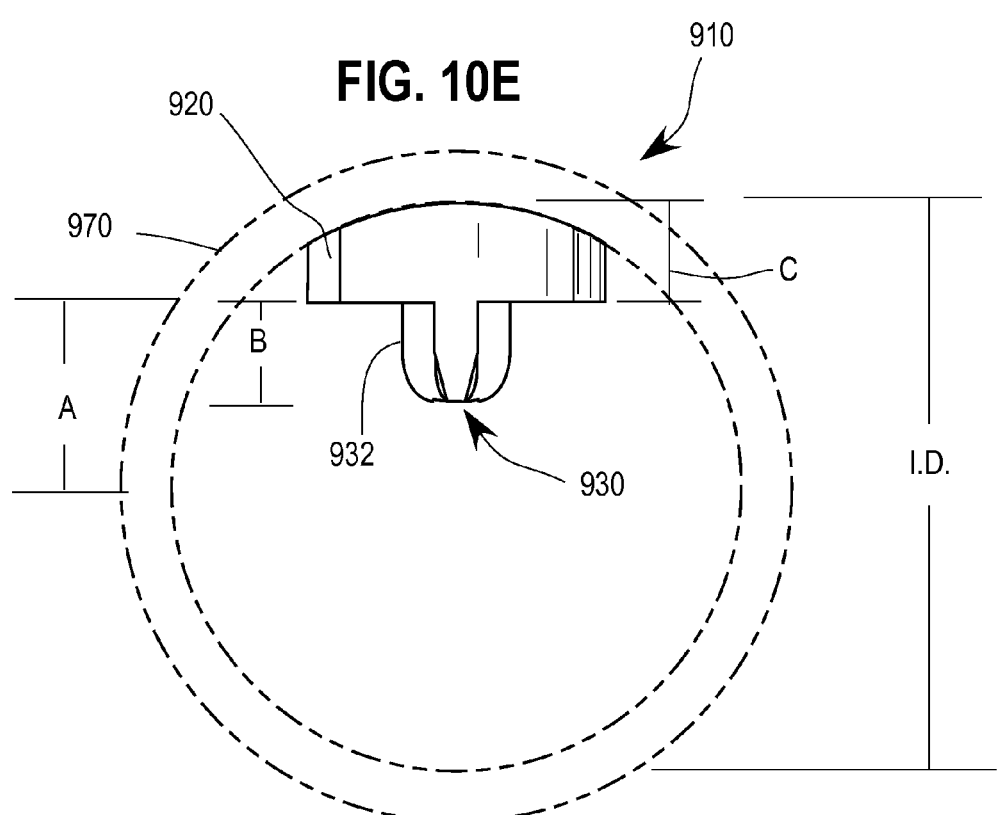

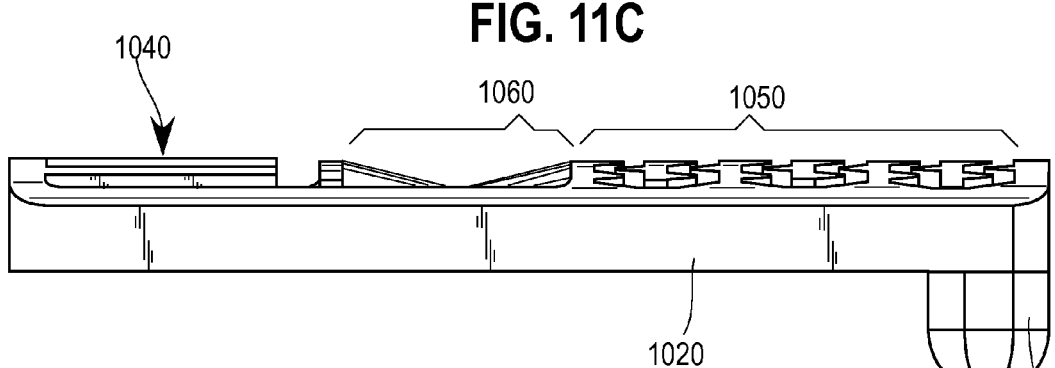
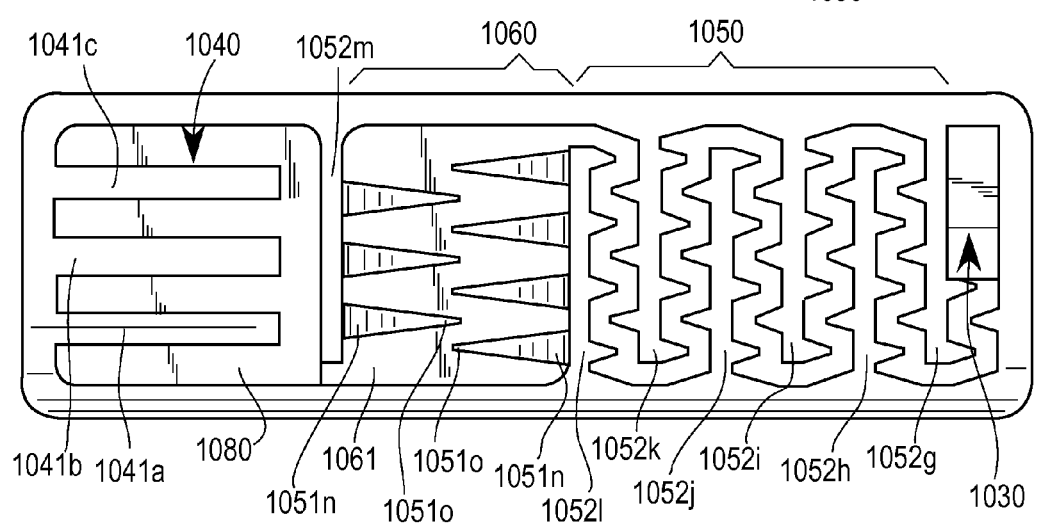
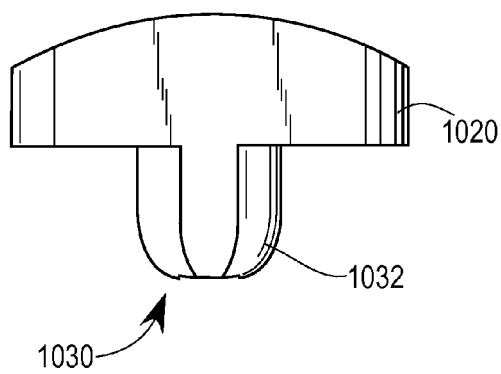

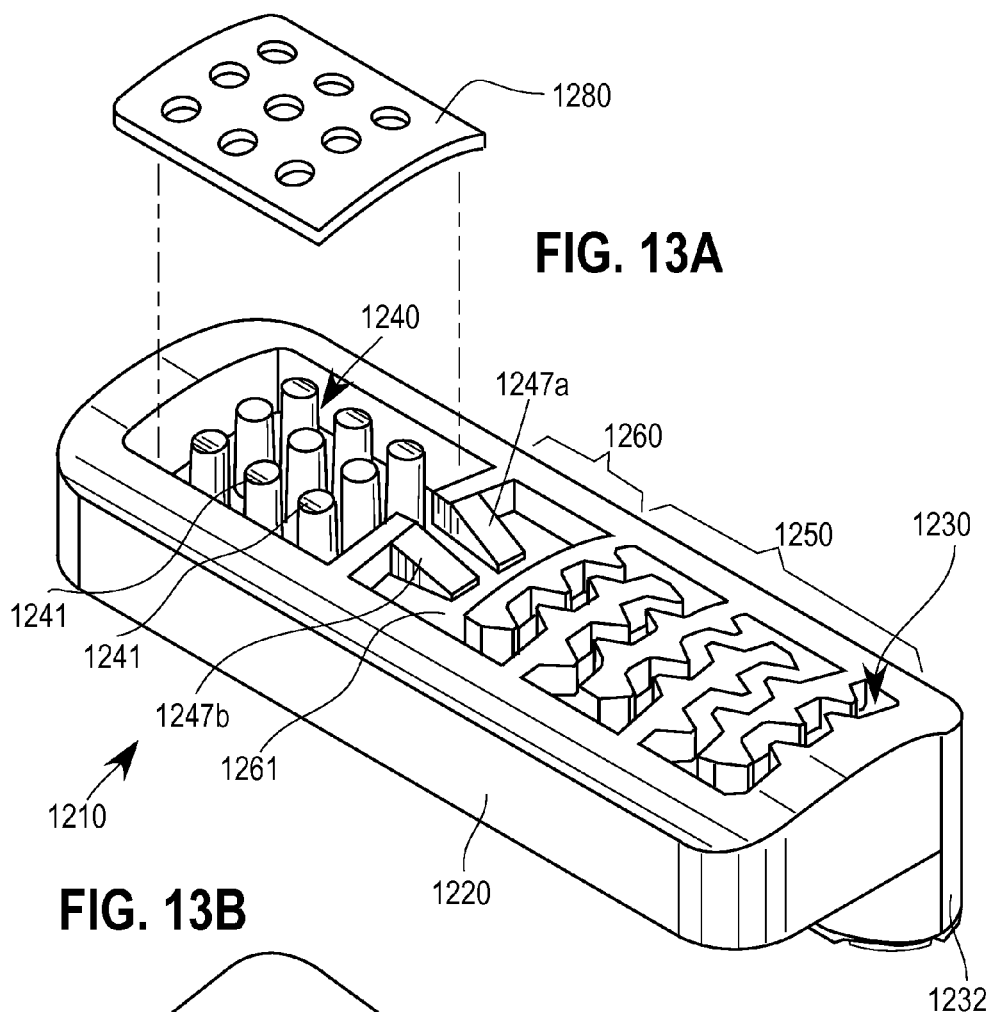
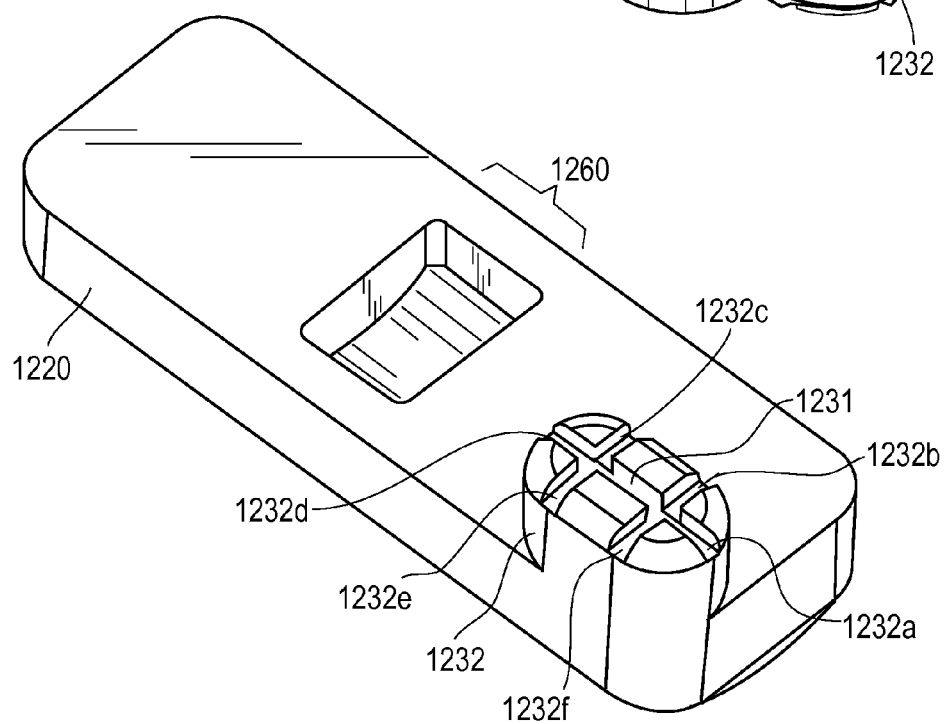

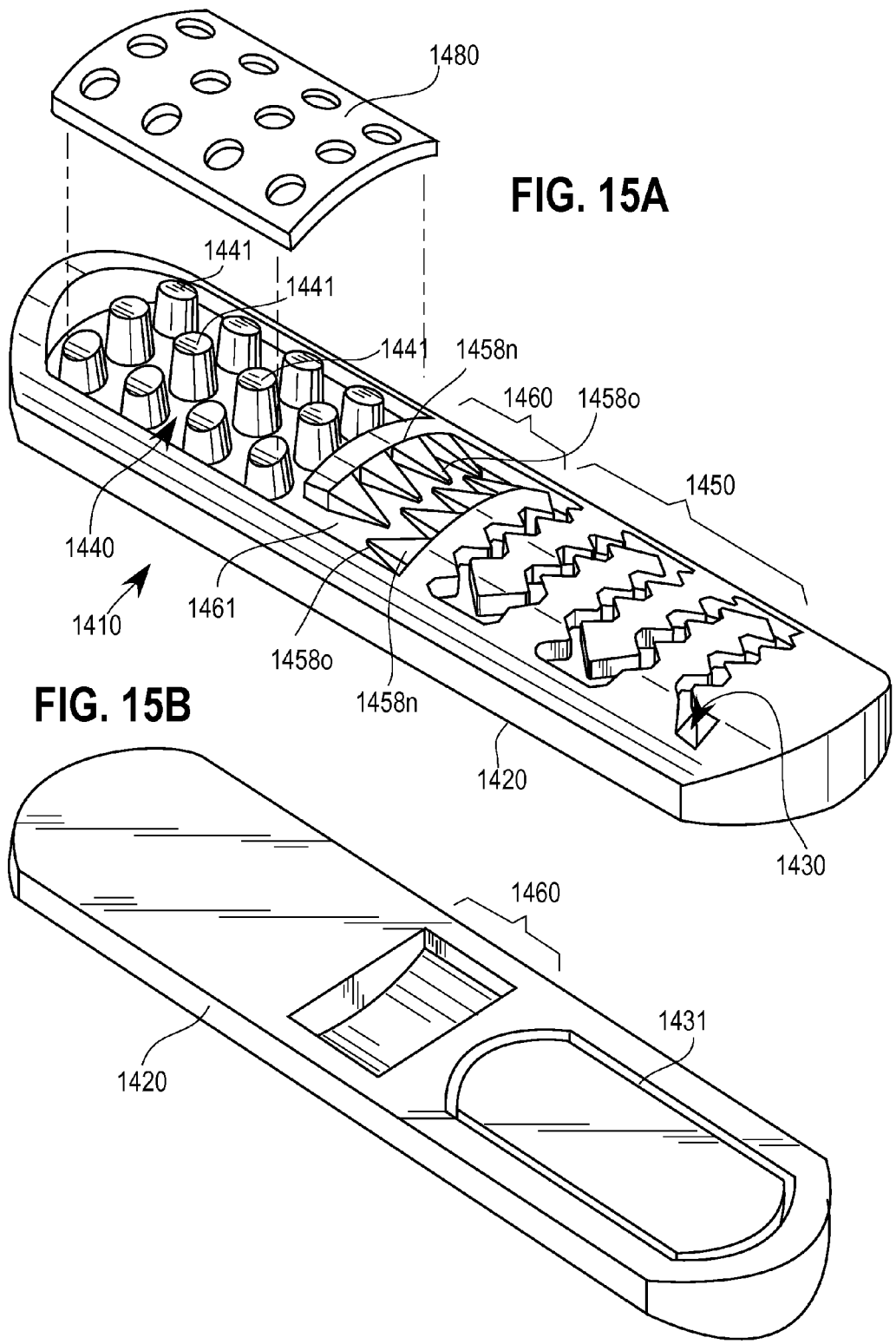

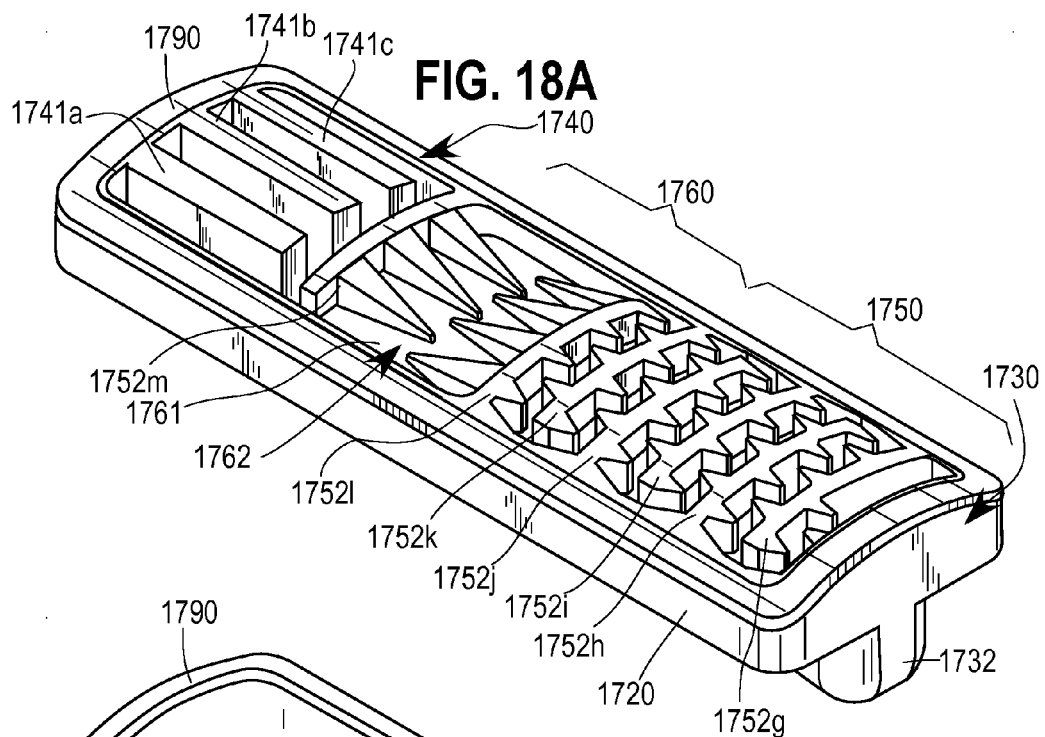
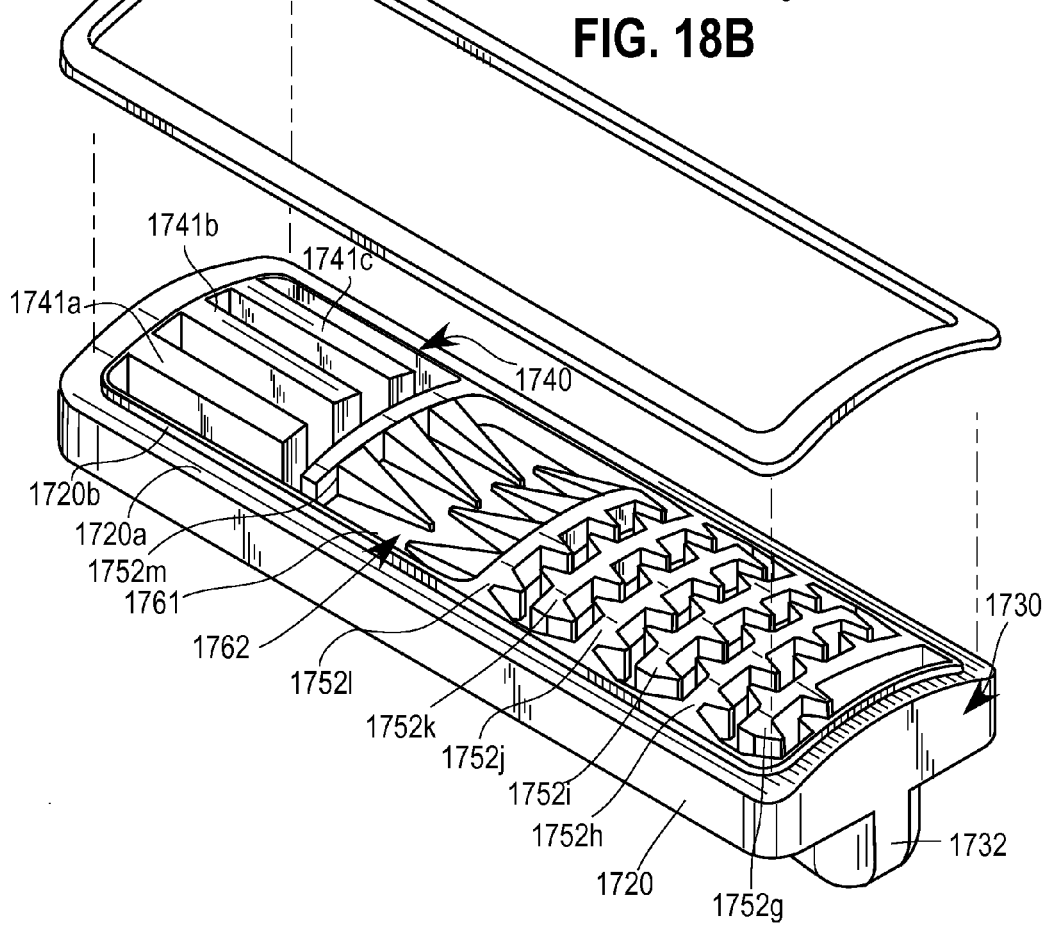

ELASTOMERIC EMITTER AND METHODS RELATING TO SAME

FIELD

The present invention relates to irrigation drip emitters, and more particularly, to multiple irrigation drip emitters mounted to a supply tube to form an irrigation assembly or system.

BACKGROUND

Drip emitters are commonly used in irrigation systems to convert water flowing through a supply tube at a relatively high flow rate to a relatively low flow rate at the outlet of each emitter. Each drip emitter generally includes a housing defining a flow path that reduces high pressure water entering the drip emitter into relatively low pressure water exiting the drip emitter. Multiple drip emitters are commonly mounted on the inside or outside of a water supply tube. In one type of system, a large number of drip emitters are mounted at regular and predetermined intervals along the length of the supply tube to distribute water at precise points to surrounding land and vegetation. These emitters may either be mounted internally (i.e., in-line emitters) or externally (i.e., on-line or branch emitters). Some advantages to in-line emitters are that the emitter units are less susceptible to being knocked loose from the fluid carrying conduit and the conduit can be buried underground if desired (i.e., subsurface emitters) which further makes it difficult for the emitter to be inadvertently damaged (e.g., by way of being hit or kicked by a person, hit by a lawnmower or trimmer, etc.).

In addition to the advantages of in-line emitters, subsurface drip emitters provide numerous advantages over drip emitters located and installed above ground. First, they limit water loss due to runoff and evaporation and thereby provide significant savings in water consumption. Water may also be used more economically by directing it at precise locations of the root systems of plants or other desired subsurface locations.

Second, subsurface drip emitters provide convenience. They allow the user to irrigate the surrounding terrain at any time of day or night without restriction. For example, such emitters may be used to water park or school grounds at any desired time. Drip emitters located above ground, on the other hand, may be undesirable at parks and school grounds during daytime hours when children or other individuals are present.

Third, subsurface emitters are not easily vandalized, given their installation in a relatively inaccessible location, i.e., underground. Thus, use of such subsurface emitters results in reduced costs associated with replacing vandalized equipment and with monitoring for the occurrence of such vandalism. For instance, use of subsurface emitters may lessen the costs associated with maintenance of publicly accessible areas, such as parks, school grounds, and landscaping around commercial buildings and parking lots.

Fourth, the use of subsurface drip emitters can prevent the distribution of water to undesired terrain, such as roadways and walkways. More specifically, the use of subsurface drip emitters prevents undesirable "overspray." In contrast, above-ground emitters often generate overspray that disturbs vehicles and/or pedestrians. The above-identified advantages are only illustrative; other advantages exist in connection with the use of subsurface drip emitters.

Although some advantages of subsurface emitters are described above, it would be desirable to provide an improved in-line drip emitter design that can be used in both subsurface and above ground applications. For both applications, there is a need to provide for a relatively constant water output from each of the emitters in the irrigation system. More specifically, it is desirable to provide pressure compensation so as to ensure that the flow rate of the first emitter in the system is substantially the same as the last emitter in the system. Without such flow rate compensation, the last emitter in a series of emitters will experience a greater pressure loss than the first. Such pressure loss results in the inefficient and wasteful use of water.

There is also a need in the irrigation industry to keep drip emitters for both subsurface and above ground applications from becoming obstructed, which results in insufficient water distribution and potential plant death. Obstruction of an emitter may result from the introduction of grit, debris, or other particulate matter from debris entering the emitter through the supply tube. It is therefore desirable to have an inlet and/or other structures that are of a design to deflect particles that might otherwise clog flow passages in the body of the emitter. The flow through area of the inlet, however, must also be large enough to allow proper functioning of the drip emitter.

It is also desirable to provide a drip emitter that minimizes parts and assembly as this will not only make the component less complicated to construct and likely save on material costs, but will also reduce the number of emitters that do not perform as desired due to misaligned parts, etc. Drip emitters are commonly formed of multi-piece components (e.g., two or more-piece housing structures with separate flexible diaphragms, etc.) that require individual manufacture of the various parts of the emitter and then assembly of the parts prior to mounting to the supply tube. Even slight misalignment of these components during assembly may result in a malfunctioning drip emitter. Thus, in addition to the above needs, it would be desirable to reduce the number of components required to make the emitter and the manufacturing steps and time it takes to create a finished product.

It is also desirable to provide a drip emitter that minimizes the amount of disturbance the emitter causes to the fluid flowing through the drip line or conduit to which the emitter is connected. Larger cylindrical emitters are available in the marketplace for in-line emitter applications, however, these emitters interfere with the flow of the fluid traveling through the drip line or tube and introduce more turbulence to the fluid or system due to the fact they cover and extend inward from the entire inner surface of the drip line or tube. The increased mass of the cylindrical unit and the fact it extends about the entire inner surface of the drip line or tube also increases the likelihood that the emitter will get clogged with grit or other particulates (which are more typically present at the wall portion of the tube than in the middle of the tube) and/or that the emitter itself will form a surface upon which grit or particulates will build-up on inside the drip line and slow the flow of fluid through the drip line or reduce the efficiency of this fluid flow. Thus, there is also a need to reduce the size of in-line emitters and improve the efficiency of the systems within which these items are mounted.

Lastly, it is also desirable to provide a drip line that can be buried sub-surface and/or under surface coverings such as bark or mulch without being interfered with by obstructions such as roots, grit, etc. Conventional emitters typically have difficulty in being used in at least sub-surface applications due to root obstruction that occurs from plants or vegetation growing toward the emitter creating an obstruction to the normal flow of fluid through the emitter. In the past, chemicals have been devised for use with sub-surface irrigation equipment to inhibit such root growth/interference, but these chemicals are either expensive to use or damaging to other materials used in the irrigation system (e.g., tubing, couplings, valves, the emitter itself, etc.).

Accordingly, it has been determined that the need exists for an improved in-line emitter and methods relating to same which overcomes the aforementioned limitations and which further provides capabilities, features and functions, not available in current bases and methods, and for an improved method for doing the same.

BRIEF DESCRIPTION OF THE DRAWINGS

The above and other aspects, features and advantages of several embodiments of the present invention will be more apparent from the following more particular description thereof, presented in conjunction with the following drawings.

FIGS. 1A-F are perspective, top, front, rear, bottom and right end views, respectively, of a drip emitter embodying features of the present invention, with the perspective and right end views illustrating the emitter bonded to the inner side of a drip line or tube (shown in broken line), the opposite end view (i.e., left end view) being a mirror image of the end view illustrated;

FIGS. 2A-D are perspective, top, rear and front views, respectively, of an alternate drip emitter embodying features of the present invention wherein a tongue and fork type arrangement is used instead of a single tapered portion to compensate for pressure fluctuations that the emitter is exposed to when inserted in a supply line, the end and bottom views of this embodiment looking similar to those of the embodiment of FIGS. 1A-F;

FIGS. 3A-D are perspective, top, front and rear views, respectively, of an alternate drip emitter embodying features of the present invention wherein inlet openings of varying heights are used to compensate for pressure fluctuations that the emitter is exposed to when inserted in a supply line;

FIGS. 3E, F and G are additional rear, bottom and perspective views, respectively, of the embodiment of FIGS. 3A-D wherein FIG. 3E illustrates the inlet opening sleeves at a higher pressure position showing at least some of the inlet openings being closed to compensate for an increase in pressure and FIG. 3G illustrates the embodiment of FIGS. 3A-D from a rear left perspective instead of the front right perspective illustrated in FIG. 3A;

FIGS. 5A-B are perspective views of an alternate drip emitter and drip line embodying features of the present invention wherein the pressure-reducing flow channel is made-up of baffles with flexible teeth that move in response to fluid flow through the emitter body;

FIG. 6A is a perspective view of an alternate drip emitter and drip line embodying features of the present invention wherein the pressure-reducing flow channel is made-up of baffles with hollow teeth or teeth that enlarge as fluid pressure increases within the supply line so that the pressure-reducing flow channel has a first cross-section at lower fluid pressures and a second cross-section, smaller than the first, at higher fluid pressures to compensate for the increase in fluid pressure so that the emitter and drip line trickle fluid at a generally constant or desired rate;

FIGS. 6B-C are perspective views of a portion of the flow channel of FIG. 6A illustrating the hollow teeth of the baffle partially enlarged and fully enlarged, respectively, in response to increasing fluid pressure showing how the cross-section of the pressure-reducing flow channel in FIG. 6B has a smaller cross-section than that illustrated in FIG. 6A due to an increase in fluid pressure and showing how the cross-section of the pressure-reducing flow channel of FIG. 6C is even smaller yet than that illustrated in FIG. 6B due to a further increase in fluid pressure;

FIG. 6D is a perspective view of a portion of the bottom of the emitter illustrated in FIG. 6A showing the underside of the hollow teeth members of the baffle and how such surfaces are exposed to the fluid and are affected by an increase in fluid pressure;

FIGS. 7A-B are perspective and perspective cross-sectional views, respectively, of another emitter embodying features of the present invention wherein a unitary body defines first and second walls interconnected together to form a pressure reduction flow channel, the cross-section being taken along lines ii-ii in FIG. 7A;

FIG. 7C-D are top plan and top cross-sectional views, respectively, of the emitter of FIGS. 7A-B, with the cross-section being taken along lines v-v of FIG. 7H;

FIGS. 7F-G are side elevation and side cross-sectional views, respectively, of the emitter of FIGS. 7A-E illustrating one form of the first and second walls that combine to restrict fluid flow through the emitter, the cross-section being taken along lines iii-iii in FIG. 7C;

FIGS. 8A-B are perspective and perspective cross-sectional views, respectively, of another emitter embodying features of the present invention wherein a unitary body defines a series of rows of baffles transverse to the longitudinal axis of the emitter and extending into the pressure reduction flow path, with a portion of the baffles varying in height to create a structure that compensates for pressure, the cross-section being taken along line vi-vi in FIG. 8A;

FIGS. 8C-E are top plan, front elevation and bottom perspective views, respectively, of the emitter of FIGS. 8A-B;

FIGS. 8F-G are side elevation and side cross-sectional views, respectively, of the emitter of FIGS. 8A-E, the cross-section being taken along line vii-vii in FIG. 8C.

FIGS. 10A-E are perspective, cross-sectional, side elevation, top plan and front elevation views, respectively, of an alternate emitter embodying features of the present invention wherein a unitary elastomeric body defines an inlet, pressure reduction and compensation section and an outlet bath having a root inhibitor member for disrupting root growth that could interfere with the operation of the emitter (FIG. 10E further illustrating the emitter mounted in a drip line or tube);

FIGS. 11A-E are perspective, cross-sectional, side elevation, top plan and front elevation views, respectively, of another emitter embodying features of the present invention wherein a unitary elastomeric body defines an inlet, pressure reduction and compensation section and an outlet bath having a root inhibitor member for disrupting root growth that could interfere with the operation of the emitter;

FIGS. 13A-B are top and bottom perspective views, respectively, of an emitter embodying features of the present invention wherein a unitary elastomeric body is illustrated with an alternate inlet, flow path and outlet;

FIGS. 15A-B are top and bottom perspective views, respectively, of an emitter embodying features of the present invention wherein a unitary elastomeric body is illustrated with an alternate inlet, flow path and outlet;

FIGS. 18A-B are perspective and exploded views, respectively, of an emitter embodying features of the present invention wherein the unitary elastomeric body is illustrated with a connecting bracket coupled to the bonding side of the elastomeric emitter body which may be used to assist in connecting the emitter to drip tubing.

Figure 1B:
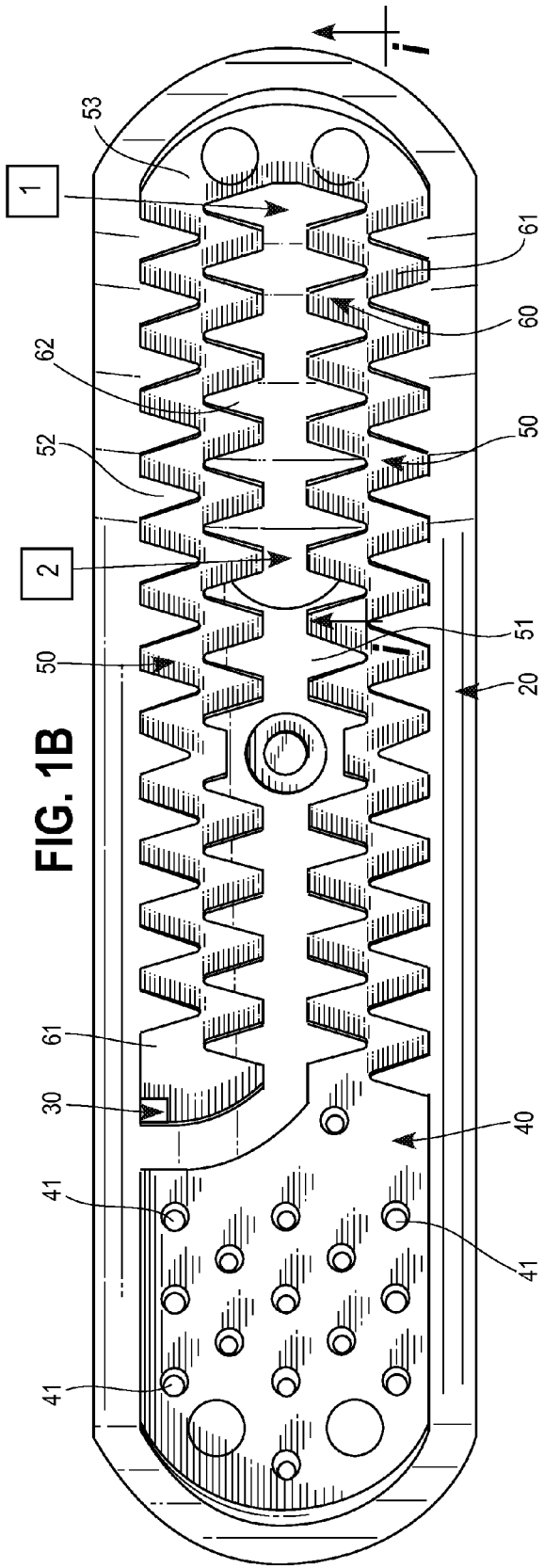

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DESCRIPTION OF THE PREFERRED EMBODIMENTS

As shown in FIGS. 1A-F, a drip irrigation emitter 10 is provided for distributing water from a fluid supply source or conduit, such as drip line or tube 70, at a low flow rate. The drip line 70 carries pressurized fluid throughout an irrigation system and preferably includes numerous emitters 10 spaced apart at predetermined intervals in the dip line 70 in order to allow the drip line 70 to be placed above or below ground to water and/or treat grass, plants, shrubs, trees or other landscaping, or to water agricultural crops of various kinds. In the form illustrated, the emitter 10 includes an integral body 20 which defines an inlet 30 connectible to a source of pressurized fluid, an outlet 40 for discharging the fluid from the emitter body 20, and a pressure reducing flow channel or passage 50 between the inlet 30 and outlet area 40 for reducing the flow of fluid discharged through the outlet 16. In addition, the emitter body 20 defines a pressure compensating member 60 for reducing a cross-section of the flow channel in response to an increase in pressure of the pressurized supply line fluid.

In the form illustrated, the emitter body 20 is made of an elastomeric material, such as a thermoplastic or thermosetting elastomeric material like materials that use ethylene, propylene, styrene, PVC, nitrile, natural rubber, silicone, etc., to form a polymer or copolymer. In a preferred form, the elastomeric material is made of thermoplastic polyolefin (TPO) and silicone rubber. This combination helps create an emitter and drip line that is capable of withstanding the high temperatures and harsh chemicals the emitter may be subjected to while in use. In addition, the emitter is made of a singular or unitary construction rather than having a multi-part construction and/or requiring the assembly of housing parts, diaphragms, etc. This simple construction makes it easier to manufacture the emitter and makes the emitter more grit-tolerant. More particularly, the simple and flexible construction of the emitter can easily process grit or other particulates by expanding to process the grit (aka burping) due to the fact there are no additional housing portions to prevent such expansion. This simple construction also allows the emitter to be flushed more easily by allowing line pressure to be increased to process grit out of the emitter without concern for damaging the emitter because there are no additional pieces, such as multi-part housings, that limit the amount of movement the emitter can make before breaking or coming apart.

Whereas in conventional emitters, even those having two-piece housings, diaphragms and metering grooves to assist in the flushing of grit, the emitter typically reaches a state where further increases is pressure will not increase processing of grit. For example, in conventional emitters, at a certain point of fluid pressure, the pressure on both sides of the diaphragm will eventually become equal and the emitter will cease processing or burping the grit. In the form illustrated, however, the disclosed emitter will continue to process grit with increases in pressure well beyond when conventional emitters stop processing grit (e.g., when this state of equal pressures on opposite sides of the diaphragm are reached). Thus, line pressure can simply continue to be increased in order to drive grit through the emitter body. The elastomeric nature of the emitter body 20 further helps flushing or burping particulates or grit even when simply turning on and off the supply line.

Figure 1C:
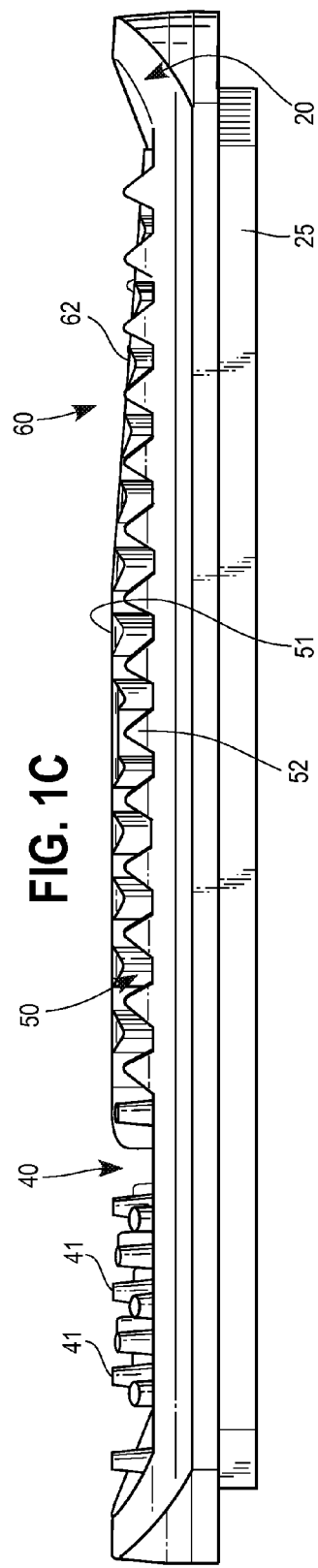
Figure 1F:
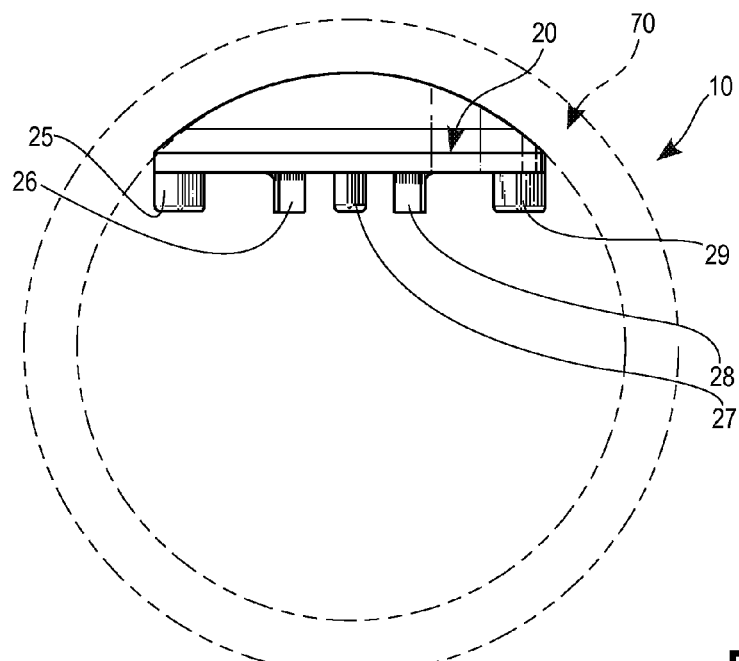

As best illustrated in FIGS. 1E-F, the body 20 defines a plurality of slots 21, 22, 23 and 24, extending longitudinally along the bottom surface of the emitter body 20 which are separated by protrusions, such as guide ribs 25, 26, 27, 28 and 29. The outer most guide ribs 25 and 29 are positioned on the periphery of the bottom surface of emitter body 20 while the inner most ribs 26-28 are positioned on an interior portion separated from the periphery by inlet channel 31. In a preferred form, the inlet channel 31 is sized to deflect foreign materials from obstructing the inlet 30 or entering the emitter body 20 and guide ribs 25-29 have at least one tapered end and run parallel to the longitudinal axis of the emitter body 20 to further help deflect foreign materials from obstructing the inlet channel 31 or entering the emitter body 20. In the form illustrated, the inlet channel 31 extends continuously around or at a perimeter region of the emitter body 20 and empties into the inlet 30. More particularly, in the form illustrated, the inlet channel 31 is a generally oval shaped raceway recessed in the bottom surface of the emitter body 20 having curved ends 31*a*, 31*b* and longer straight-aways 31*c*, 31*d* that run longitudinally along the bottom of body 20. The inlet channel has a generally rectangular cross-section and opens into the inlet 30 via a rectangular shaped opening.

The recessed nature and length of inlet channel 31 helps prevent grit or other particulates from entering into the inlet 30 that could clog the emitter 10 or form obstructions preventing the emitter 10 from operating in the desired manner. More particularly, once installed in the drip line 70, pressurized fluid flows along the bottom side of the emitter body 20 with some fluid entering into the raceway of inlet channel 31 and traveling about the periphery of the emitter body 20 and then, ultimately, into the inlet opening 30. In this manner, the side walls of channel 31 serve to deflect grit and other particulates in the fluid from entering into the inlet channel 31 and into the inlet opening 30. This prevents the emitter 10 from getting clogged and/or having obstructions enter the emitter 10 that might otherwise negatively affect or compromise the desired operation of the emitter. The circular flow that is created by the inlet channel 31 further helps ensure that larger particulates that might fit within the inlet channel 31 will fall out of or be flushed from the channel 31 as the fluid races about the raceway before the fluid enters into the inlet opening 30.

The guide ribs 25-29 serve the dual function of assisting with the mounting of the emitter body 20 into the irrigation drip line and further help deflect grit or particulates in the pressurized fluid away from the inlet channel 31 and inlet opening 30. More particularly, one or more of the guide ribs 25-29 may be used by an insertion tool to align and insert the emitter body 20 into the drip line 70 as the drip line is being extruded. In a preferred form, this is done as the drip line 70 is being extruded so that the upper surfaces of the emitter body 20 are bonded or welded to the drip line 70 while the drip line is hot and before it begins to cool. The guide ribs 25-29 may also be tapered or pointed to assist in the initial loading of the emitter body 20 from a bowl sorter and into the inserter or loader used to insert the emitter body 20 into the freshly extruded drip line 70. Such tapering further assists with getting fluid in the supply line to flow between the narrow passages defined by the ribs 25-29 without causing too much disturbance or adding too much turbulence to the fluid flowing through the supply line 70.

In the form illustrated, the guide ribs 25-29 also help prevent grit or other particulates in the pressurized fluid from entering into the inlet channel 31 and inlet opening 30. More particularly, like the sidewalls of inlet channel 31, the ribs 25-29 create narrowed passageways which help deflect larger particulates away from the inlet channel 31 and inlet opening 30. Thus, the ribs 25-29 deflect away larger particulates from the inlet channel 31 and inlet opening 30 and the sidewalls of inlet channel 31 deflect away smaller particulates that are capable of fitting into the narrowed passageways defined by the ribs 25-29. This prevents the emitter 10 from getting clogged and/or having obstructions enter the emitter 10 that might otherwise negatively affect or compromise the desired operation of the emitter 10.

Figure 4:
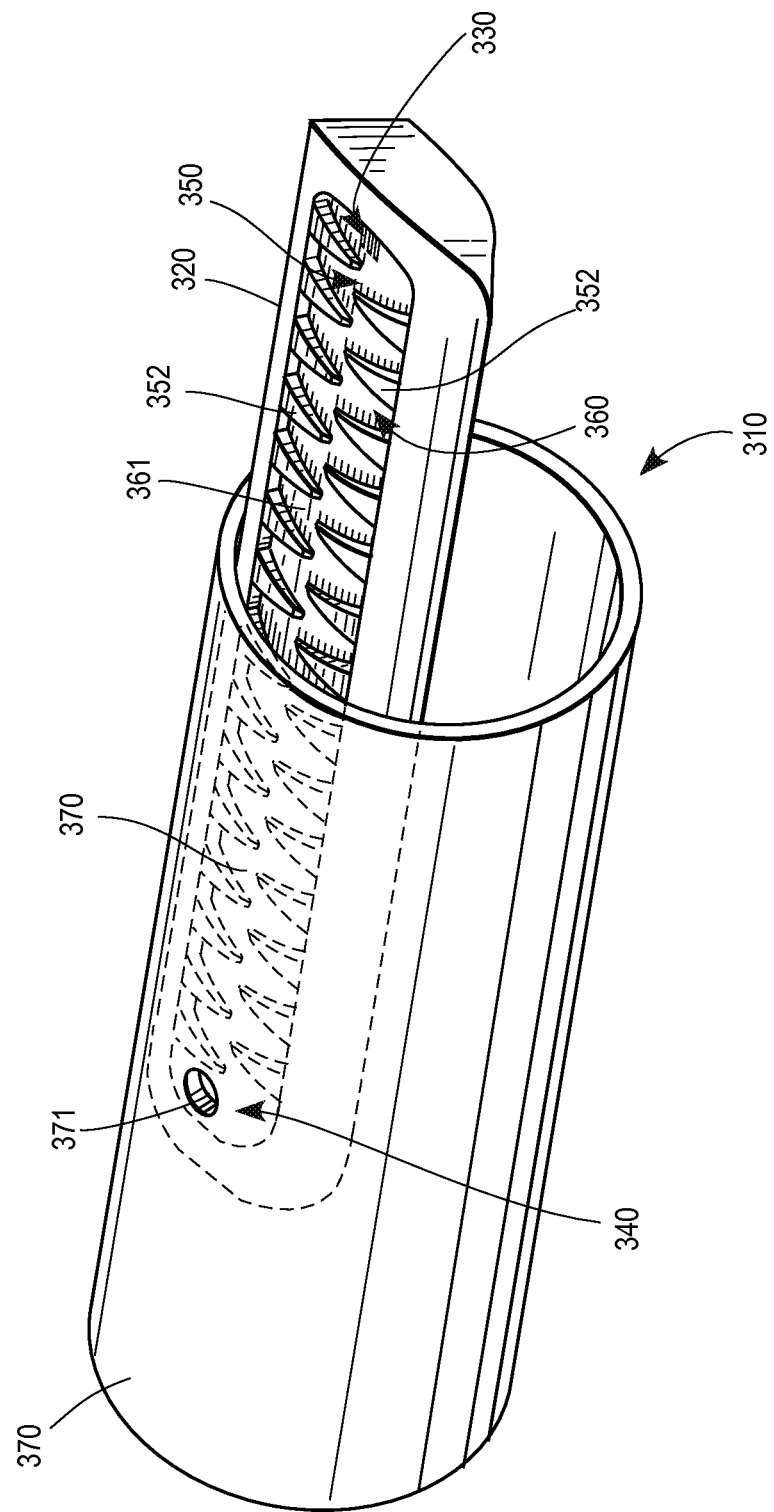
FIG. 4 is a perspective view of an alternate drip emitter and drip line embodying features of the present invention and illustrating an emitter with a baffle design which opens and closes in a non-sequential manner.

In the form illustrated, the inlet opening 30 is generally rectangular in shape and of a desired size to ensure that the emitter 10 receives a desired amount of fluid at a desired fluid flow rate in order to operate as desired. In alternate forms, however, the inlet opening 30 may be designed in a variety of different shapes and sizes to accommodate specific desires or applications. For example, in alternate forms, the inlet opening may be designed as more of an elongated slot or slit, or plurality of slot-like openings as illustrated in FIG. 4 (which will be discussed further below), for receiving fluid but further deflecting grit or particulates that are small enough to pass through the walls of inlet channel 31 or it may be designed to cooperate with the pressure-reduction flow channel 50 to start reducing the flow and pressure of the fluid as it enters the emitter body 20 (e.g., the inlet may form a tortuous passage that leads to the pressure-reduction channel 50). Similarly, the inlet channel 31 may be designed in a variety of different shapes and sizes. For example, instead of a generally oval shape, the inlet channel 31 may be designed to be a smaller slot that extends over a small portion of emitter body 20 instead of traveling about a periphery of the bottom of the emitter body 20, or may be designed with a zigzag pattern to form a tortuous path to further assist in reducing pressure of the fluid passing through the emitter body 20 (similar to that of the flow path 50, which will now be discussed in further detail).

With respect to the fluid that makes it through the passageways defined by ribs 25-29 and into the inlet channel 31, this fluid passes through the inlet opening 30 and enters a pressure-reducing flow channel 50 that produces a significant reduction in pressure between the fluid flowing in the primary lumen of the supply conduit or drip line 70 and the fluid ultimately emptying into and present in the emitter outlet area 40. In the form illustrated, the emitter body 20 defines opposed baffle walls to create the pressure-reducing flow channel and, in a preferred form, has an inner baffle wall 51 that is surrounded by an outer baffle wall 52 which extends about the inner baffle wall 51 in a generally U-shaped manner to form a flow passageway that generally directs the water in a U-shaped direction of travel. More particularly, the inner and outer baffle walls 51, 52 have alternating projections and recesses that form a tortuous passage and cause the fluid flowing therethrough to zigzag back and forth, reducing pressure with each turn the fluid makes. The outer baffle wall 52 is defined by an outer rim or peripheral wall of the emitter body 20 and the inner baffle wall 51 extends from a portion of the outer rim or peripheral wall and into to the middle of the emitter body 20 to form a peninsula about which the fluid flows from inlet 30 to outlet 40. The upper surfaces of the emitter body preferably have a radius of curvature that tracks the radius of curvature of the tube 70 so that the emitter body 20 can be bonded securely to the inner wall of the tube 70 and create an enclosed pressure reduction passage from inlet 30 to outlet 40. In the form illustrated, the tortuous passage is formed via alternating teeth extending from opposing surfaces of the inner and outer baffle walls 51, 52 and has a cross-section that is generally rectangular in shape when the emitter body 20 is bonded to the inner surface of the extruded drip line 70 (keeping in mind that the radius of curvature of the tube 70 will likely make the upper portion of the cross-section slightly curved and the side walls to be slightly wider at their top than at their bottom).

It should be understood, however, that in alternate embodiments the pressure-reducing flow channel 50 may be made in a variety of different shapes and sizes. For example instead of having projections with pointed teeth, the baffles could be made with blunt or truncated teeth, with teeth that are angled or tapered, with curved or squared projections instead of triangular shaped teeth, with projections of other geometrical shapes or geometries, symmetric or asymmetric, etc.

In the form illustrated, the pressure-reducing flow channel 50 also includes an intermediate bath 53 that the fluid pours into as it makes the turn in the generally U-shaped direction of travel which further causes pressure reduction as the water is flowing from a smaller passage to a larger passage in the bath 53. After making the turn, the fluid passes or zigzags through another section of the pressure-reducing flow channel 50 and empties into outlet pool 40.

In addition to the pressure-reducing flow path 50, the emitter 10 further includes a pressure compensating feature 60 which further allows the emitter 10 to compensate for increases in fluid pressure in the primary lumen of the tube 70. More particularly, pressure compensating feature 60 allows the emitter 10 to maintain relatively constant outlet fluid flow and pressure even though the inlet fluid pressure may fluctuate from time-to-time. In the form illustrated, the pressure compensating feature 60 is a two part pressure compensation mechanism that comprises an elastomeric portion 61 capable of deflecting under pressure to reduce the cross-section of the pressure-reducing flow channel 50 and regulate fluid flow through the emitter, and a moveable baffle portion 62 capable of changing the length of the flow channel to compensate for changes in supply line 70 fluid pressure.

The elastomeric portion 61 being a deflectable portion of the emitter body 20 that is moveable between a first position wherein at least a portion of the pressure-reducing flow channel 50 is of a first cross-section and a second position wherein the at least a portion of the pressure-reducing flow channel 50 is of a second cross-section, smaller than the first cross-section to regulate fluid flow through the emitter. In the form illustrated, the floor 61 of the flow channel 50 forms an elastomeric portion and raises and lowers in response to increases and decreases in supply line 70 fluid pressure, respectively. Thus, when fluid pressure increases in the supply line 70, the floor 61 of the flow channel 50 is pressed-up or deflected up into the flow channel 50 thereby reducing the cross-section of the flow channel to regulate the flow of fluid through the emitter 10. Conversely, when fluid pressure in the supply line 70 reduces, the floor of the flow channel 50 retreats from the flow channel back to a normal position wherein the floor is not deflected up into the flow channel thereby increasing the cross-section of the flow channel to allow fluid to flow more freely through the flow channel 50.

Although the above embodiment has been described with the floor of the flow path 50 deflecting up into the emitter flow path to reduce cross-section size of the flow path to compensate for increases in fluid pressure, it should be understood that in alternate embodiments other emitter surfaces could be designed to either create this deflection on their own or to cooperate with the floor or other surface so that both deflect in order to compensate for fluid pressure increases. For example, rather than having the floor deflect, the side walls and/or ceiling of the flow channel 50 could be designed to deflect either in combination with any one of these items or on their own as the sole deflecting portion.

The second part of the pressure compensation mechanism 60 comprises a moveable structure, such as moveable baffle portion 62, which is capable of moving between a first low pressure position wherein the length of the flow channel 50 is of a first distance and a second high pressure position wherein the length of the flow channel 50 is of a second distance wherein the length of the flow channel is longer than the first distance to compensate for increase pressure in the supply line 70. More particularly, in the form illustrated, the moveable baffle portion 62 deflects up and down with the floor of the flow channel 50 to sealingly engage and disengage the moveable baffle portion 62 with the inner wall of the supply line 70, respectively, and thereby lengthen or shorten the extent of the flow channel for at least some fluid flowing therethrough to compensate for changes in supply line fluid pressure.

Figure 1G:
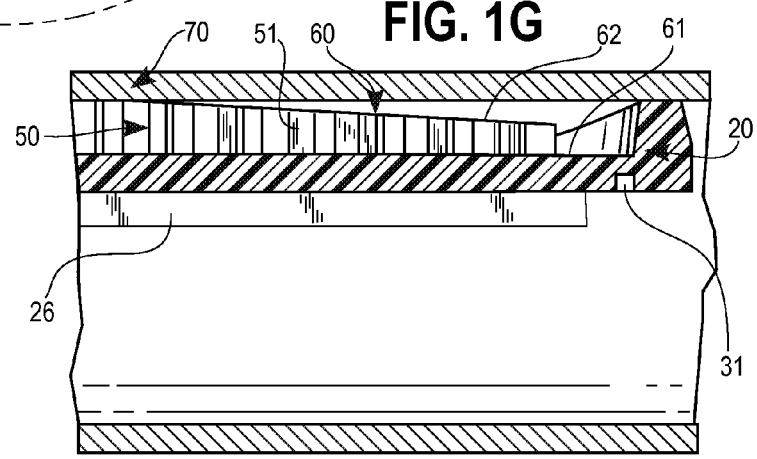
FIGS. 1G-H are cross-sectional views of the emitter of FIGS. 1A-F taken along line i-i illustrated in FIG. 1B, with FIG. 1G illustrating the tapered portion of the inner baffle wall at its low pressure position to show how fluid can flow over the top thereof, and FIG. 1H illustrating the tapered portion of the inner baffle wall at its high pressure position to show how fluid is prevented from flowing over the top thereof.
Figure 1H:
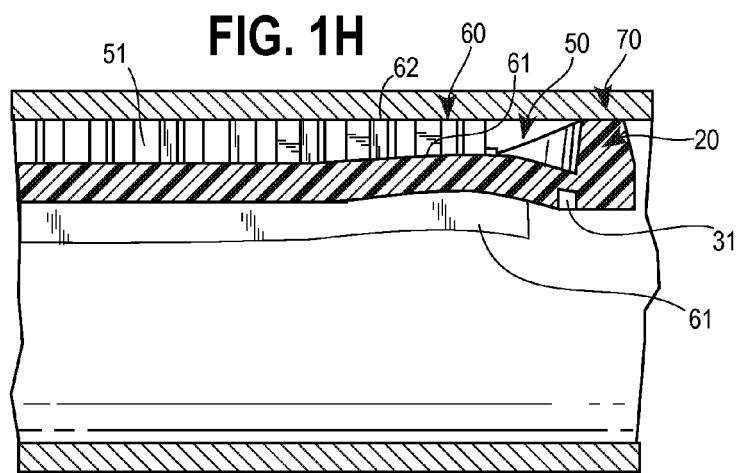

As best illustrated in FIGS. 1C, D and G, the moveable baffle portion 62 comprises a tapered portion of the central or inner baffle wall 51 that tapers down away from the inner surface of supply line 70 so that at lower fluid pressures in supply line 70, fluid flows through the inlet 30 and first section (or upstream section) of flow channel 50 and then over the top of the tapered baffle section 62, through the second section (or downstream section) of the flow channel 50 and then into outlet pool 40. Fluid may flow through the remaining portion of the flow channel 50 including intermediate bath 53 (located between the upstream and downstream sections of the flow channel 50), but it does not have to nor does all of the fluid flow through these portions of the flow channel 50 due to the gap between the upper surface of the tapered inner baffle wall section 52 and the inner surface of tube 70. As fluid pressure increases in the fluid supply line 70 and as best illustrated in FIG. 1H, the floor of the flow channel 50 starts to deflect upwards and into the flow channel 50 moving the tapered baffle section 62 toward the inner surface of tube 70 thereby reducing the gap between these two until the upper surface of the tapered baffle section 62 sealingly engages the inner wall of the tube 70 thereby preventing fluid from flowing over the top of the tapered baffle section 62 and lengthening the amount of the flow channel 50 through which all of the fluid must flow and reducing fluid pressure and flow due to same.

The emitter body 20 further defines an outlet area 40 which forms a pool into which the fluid that passes through inlet 30 and tortuous passage 50 and pressure compensation mechanism 60 collects or gathers. An outlet in outer supply line 70, such as opening 71, provides access to the fluid collected in the outlet pool 40 and, more particularly, provides an egress for the fluid to trickle or drip out of emitter 10.

Since the emitter 10 is made of an integral body 20, the outlet area 40 is provided with obstructions or stops, such as posts or nubs 41, that prevent the outlet are 40 from collapsing when the fluid pressure of supply line 70 raises to a level sufficient for deflecting the floor of the flow channel 50 into the flow channel 50 to reduce the cross-section of same and regulate fluid flow through the flow channel (or as the moveable structure 62 moves from the first or low pressure position to the second or high pressure position). In the form illustrated, the posts 41 extend away from the body 20 and are generally frustoconical in shape to make the posts easier to mold when the body 20 is molded. In addition, in a preferred form, the upper surfaces of the posts 41 have a radius of curvature common to the radius of curvature of the upper surfaces of baffles 51, 52 and that corresponds with a second radius of curvature of the inner wall of tube 70. The solid nature of the baffle walls 51, 52 and outer rim or peripheral wall of emitter body 20 likewise prevent these portions of the emitter body 20 from collapsing when the fluid pressure of supply line 70 pushes the floor of the flow channel 50 into the flow channel.

Although the form illustrated in FIGS. 1A-D shows the outlet 71 of outer tube 70 as a round opening, it should be understood that in alternate embodiments this may be provided in a variety of different shapes and sizes. For example, in one form the outer tube outlet 71 may be provided in the form of a slit, such as an elongated narrow oval shape, instead of a round hole. In other forms, the outer tube outlet 71 may further define a pressure reducing passageway such as a tortuous or zigzag passage.

Figure 1I:
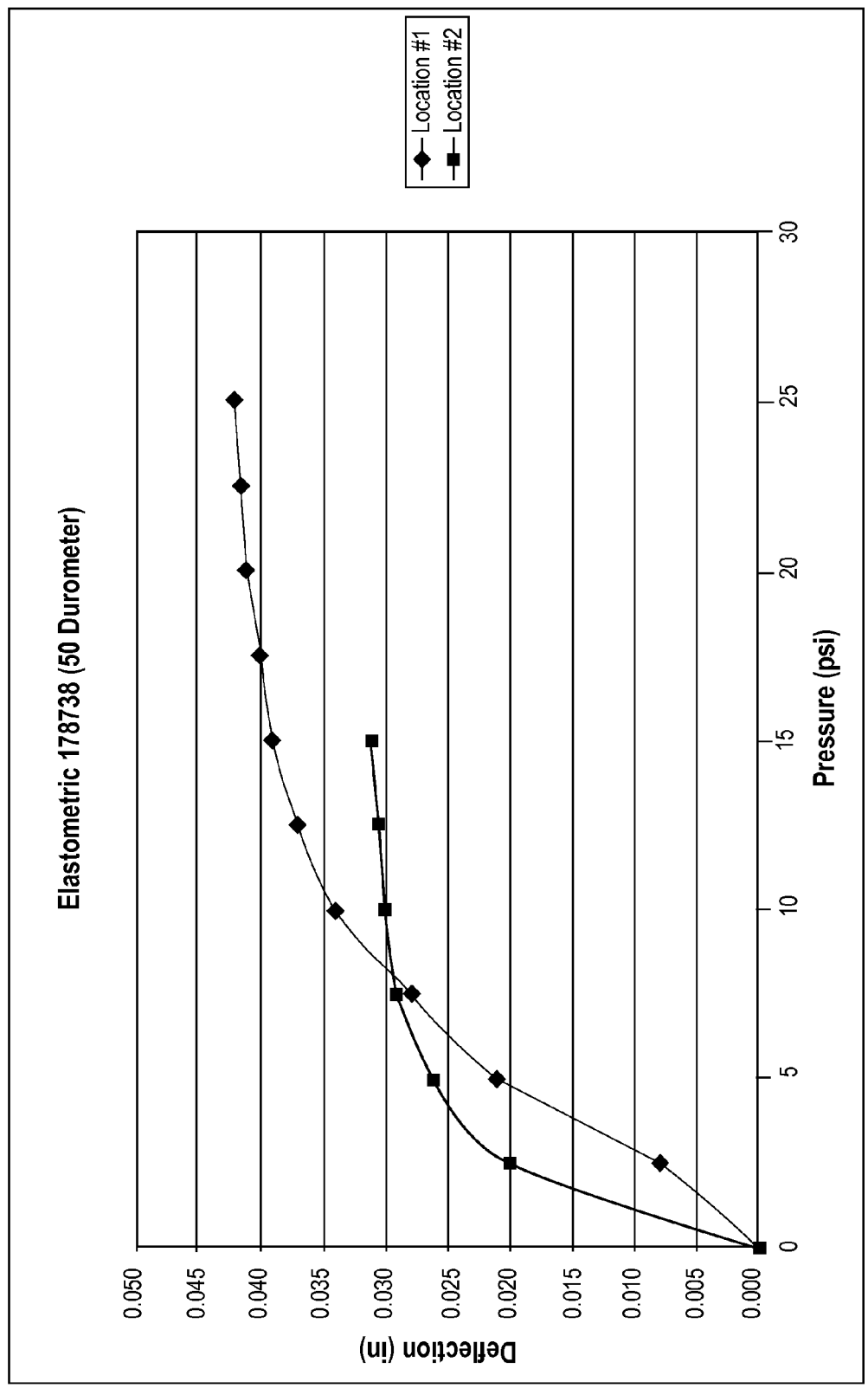
FIGS. 1I-J are charts illustrating the amount of deflection of the tapered portion of the inner baffle wall per increase in pressure at points 1 and 2 along the tapered portion as illustrated in FIG. 1B, with FIG. 1I illustrating deflection vs. pressure for an elastomeric emitter body material having a Durometer value of 50 and FIG. 1J illustrating deflection vs. pressure for an elastomeric emitter body material having a Durometer value of 75.
Figure 1J:
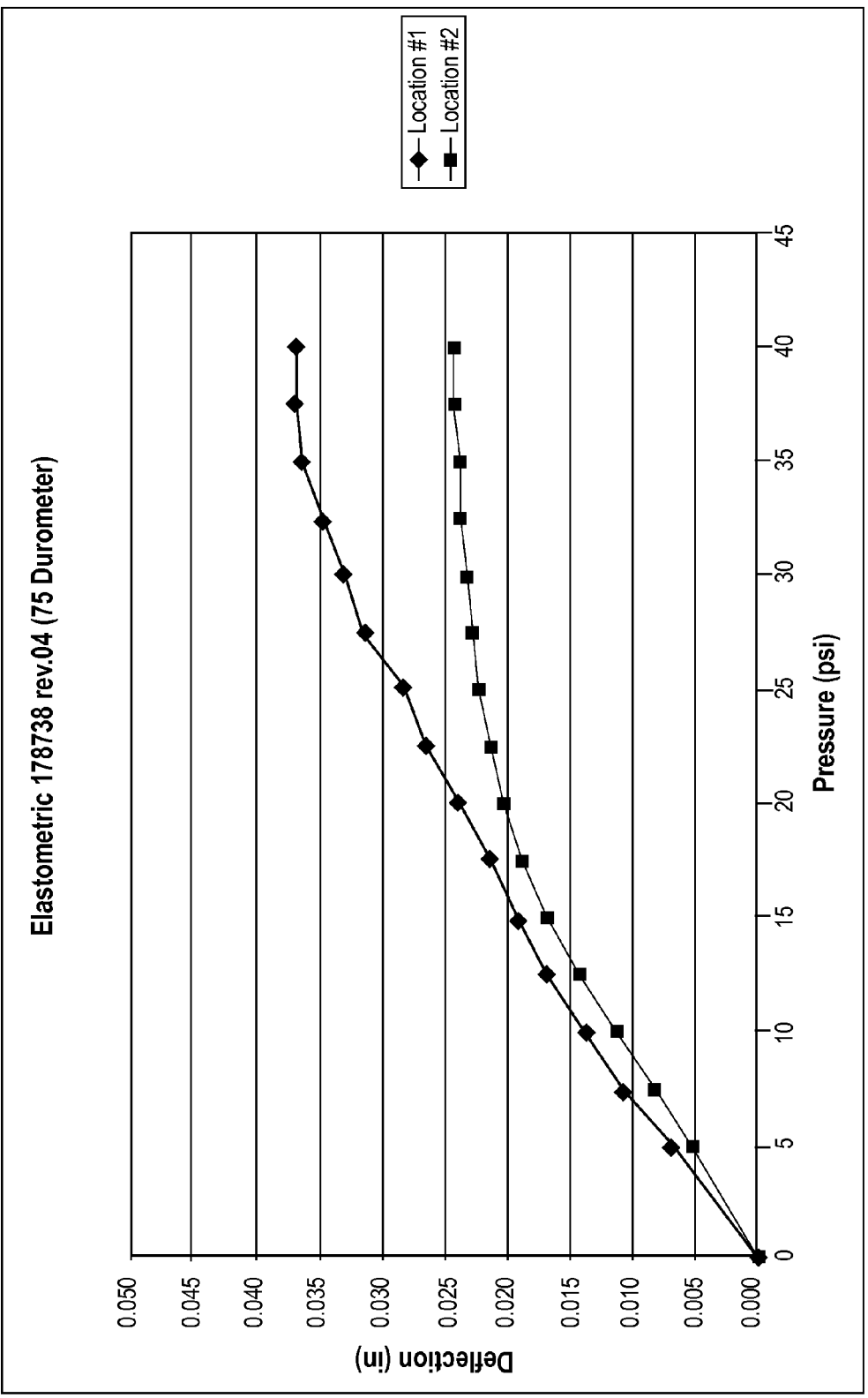

By using a unitary emitter body 20 to form the inlet 30, flow channel 50, outlet 40 and pressure compensating mechanism 60 rather than requiring multiple parts to be constructed and assembled to form such features, the emitter 10 is much easier to manufacture and provides significant cost savings due to the reduction in parts and materials, and assembly time. The body 20 may be made of any type of material capable of allowing for this type of movement for pressure compensation. In a preferred form, however, the body 20 is made of TPO having a Durometer reading ranging between 25 and 100, with the Durometer reading preferably being between 50 and 75. In FIGS. 1I-J, data is provided for the amount of deflection per increase in pressure for materials having Durometer readings of 50 and 75, respectively. In these examples, data was collected at location points 1 and 2, as indicated in FIG. 1B, with the distance (or gap) between the inner surface of tube 70 and the upper surface of the tapered inner baffle wall portion 62 being thirty thousandths of an inch (0.030") at location point 1 and thirteen thousandths of an inch (0.013") at location point 2, and the floor thickness of flow channel 50 being eight thousandths of an inch (0.008"). These distances being calculated when the tapered baffle wall portion 62 is at its normal position (or low pressure/non-deflected position) as illustrated in FIG. 1G.

As can be seen in comparing FIGS. 1I-J, a quicker movement of the tapered baffle wall portion 62 and corresponding lengthening of the flow channel 50 can be achieved using a material with a lower Durometer reading (e.g., a softer material), whereas a more constant movement (almost linear at times) of the tapered baffle wall portion 62 may be achieved by using a material with a higher Durometer reading (e.g., a harder material). Thus, the specific application the emitter 10 is intended for may play a role in the material selected for emitter body 20 (e.g., if a quicker lengthening of the flow channel 50 is desired a material with a lower Durometer reading will be used, whereas if a more gradual closing of the tapered baffle wall portion 62 and more gradual lengthening of the flow channel 50 is desired a material with a higher Durometer reading will be used, etc.).

In order to ensure the consistency of operation for each emitter 10 mounted to the extruded supply line 70, care is taken to make sure that the various portions of body 20 are constructed with consistent thickness and density from one emitter to the next and that the distances between location points 1 and 2 and the inner surface of supply line 70 are maintained consistently from one emitter to the next. In doing so, the emitters 10 mounted to the supply line 70 should operate in a uniform manner and produce common low pressure fluid flow and flow rates at their respective outputs 40 (e.g., the flow rate of the first emitter mounted in the supply line should operate the same as the last emitter mounted in the supply line).

In an alternate form, the emitter and drip line may be made-up of a multi-part construction and/or use a multi-step manufacturing or assembly process. For example an emitter body of a first type of material may be combined with another type of material (e.g., a structure, a layer, a coating, etc.) that is more easily bonded to conventional drip tubing so that emitter can be bonded to the tubing in a more consistent manner and each emitter is ensured to work similar to one another. More particularly, since soft materials, such as silicon, do not always bond easily to the various types of conventional drip line tubing used in the industry, which is typically polyethylene tubing, the emitter body may be made-up of a combination of soft and hard materials to assist in the bonding of the emitter to the extruded tubing and to provide a process that can repeatedly bond such emitters to extruded tubing so that there is no significant (if any) variance in bonding between the emitters bonded to the tubing.

For example, by combining a soft material like silicon with a hard material like a polyethylene, the hard portion of the emitter may more easily be bonded to the extruded tubing in a uniform and repeatable fashion. Although this form of emitter and tubing may be considered by some to be a two-part construction, it would preferably remain housingless and the soft portion of the emitter would make up the majority of the component. For example, in one form the hard portion of the emitter would simply comprise a polyethylene coating applied to an upper surface of the emitter to assist in consistently bonding the emitter to the inner surface of the drip line tubing in a manner that can be repeated easily from emitter to emitter. Not all of the upper surfaces of the emitter body need to be coated with the polyethylene coating and/or connected to the inner surface of the drip line tubing. Thus, in this example, the emitter continues to comprise a singular or uniform structure through which fluid flows that simply has a bonding layer or agent of polyethylene which assists in connecting the emitter to the inner surface of the drip line tubing. In addition, this configuration would still produce an emitter that can process grit better than conventional emitters, including those with multi-part housings, diaphragms and metering grooves. In alternate forms, true two-piece constructions may be used to form the emitter body if desired with either piece making up a majority of the structure or both making-up equal portions of the structure and/or either piece or both making up portions of the inlet, flow channel or outlet as desired.

Turning now back to FIGS. 1A-F, a housingless irrigation drip emitter 10 is provided for attachment to only a portion of an inner circumference of an inner surface of an irrigation drip line tube 70 having an elastomeric emitter body 20 integrally defining an inlet 30 for receiving pressurized fluid from a fluid supply source, an outlet area 40 for discharging the fluid from the body 20, a pressure reducing flow path 50 extending between the inlet 30 and the outlet area 40 for reducing the pressure and flow of fluid received at the inlet 30 and discharged through the outlet area 40, and a pressure compensating portion 60 for automatically adjusting the pressure and fluid flow reducing effect of the flow channel 50 in response to a change in pressure of the fluid supply source 70, wherein the pressure reducing flow channel 50 includes an inner baffle wall 51 and an outer baffle wall 52 that extends about the inner baffle wall 51 in a generally U-shaped manner. The baffle walls 51, 52 having upper surfaces that have a first radius of curvature that corresponds with a second radius of curvature of an inner wall of the irrigation drip line tube 70, and the inner baffle wall 51 having a first portion of constant height and a second portion 62 of tapering height, the second portion 62 being moveable between a first position wherein the upper surface of the second portion 62 is not level with the upper surface of the first portion such that fluid can flow over the upper surface of the second portion at predetermined low fluid pressures and a second position wherein the upper surface of at least a portion of the second portion 62 is level with the upper surface of the first portion and fluid cannot flow over the level upper surfaces of the second portion 62 such that the cross-section of the flow channel is reduced and the length of the flow channel is effectively lengthened.

In the form illustrated, the baffles of the inner and outer baffle walls 51, 52 do not close sequentially when the second portion 62 of inner baffle 51 moves from the first position to the second position, but rather, the teeth of the baffle walls 51, 52 on opposite ends of the flow passage 50 (i.e., some on the inlet end and some on the outlet end) close at the same time. This allows the moving portion 62 of inner baffle 51 to gradually lengthen the extent of the flow passage 50 as supply line fluid pressure increases and to gradually shorten the extent of the flow passage 50 as supply line fluid pressure decreases without having to worry about trying to sequentially close the baffles of the pressure-reducing passage 50.

In alternate embodiments, it should be understood that alternate portions of the emitter body 20 may be moved to compensate for increases in fluid line pressure, either in conjunction with or in lieu of those discussed above. For example, in one alternate form, the emitter body 20 may be designed so that additional sections of the baffle walls 51, 52 may be moved to compensate for pressure increases in the supply line 70. More particularly and as illustrated in FIGS. 2A-D, both the inner baffle wall and outer baffle wall may be designed to move and lengthen the flow path to compensate for increases in supply line fluid pressure. For convenience, items which are similar to those discussed above with respect to emitter 10 in FIGS. 1A-F will be identified using the same two digit reference numeral in combination with the prefix "1" merely to distinguish one embodiment from the other. Thus, the emitter body identified in FIGS. 2A-D is identified using the reference numeral 120 since it is similar to emitter body 20 discussed above. Similarly, the inlet, outlet and pressure-reducing flow channel are identified using reference numerals 130, 140 and 150 since they are similar to the above-mentioned inlet, outlet and flow channel 30, 40 and 50.

While the emitter body 120 of FIGS. 2A-F defines both a pressure-reducing flow channel 150 and a two part pressure compensating mechanism 160 having an elastomeric portion 161 and moveable baffle portion 162 like the embodiment of FIGS. 1A-H, the moveable baffle portion 163 in FIGS. 2A-F is made up of portions of the inner and outer baffle walls 151, 152 rather than just the inner baffle wall 151. More particularly, the inner and outer baffle walls 151, 152 move to compensate for fluid pressure increases and decreases in the supply line fluid. In the form illustrated, the central or inner baffle wall 151 tapers at its distal end into a tapered tongue-type structure or projection 163 to form a first moveable structure and the outer baffle wall 152 defines a mating fork or groove-type structure 164 that corresponds in shape to the tongue-type structure 163 to form a second moveable structure.

Figure 2D:
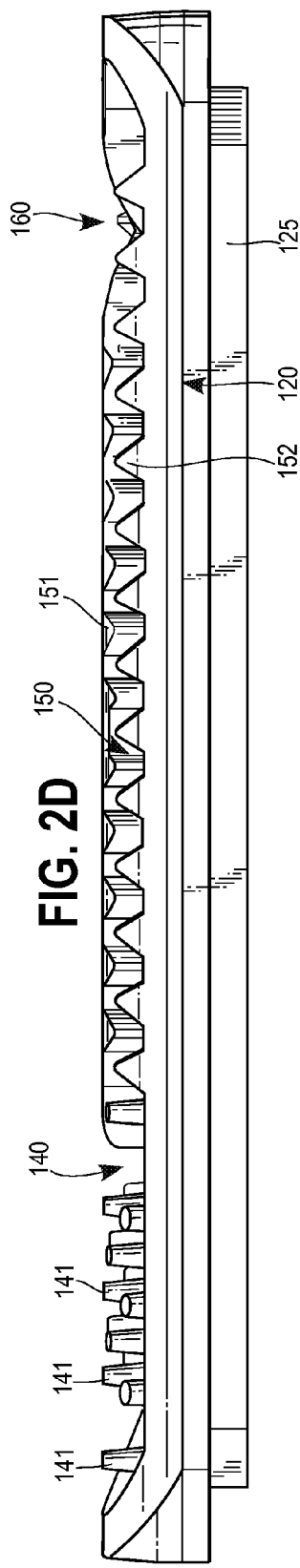
Figure 2F:
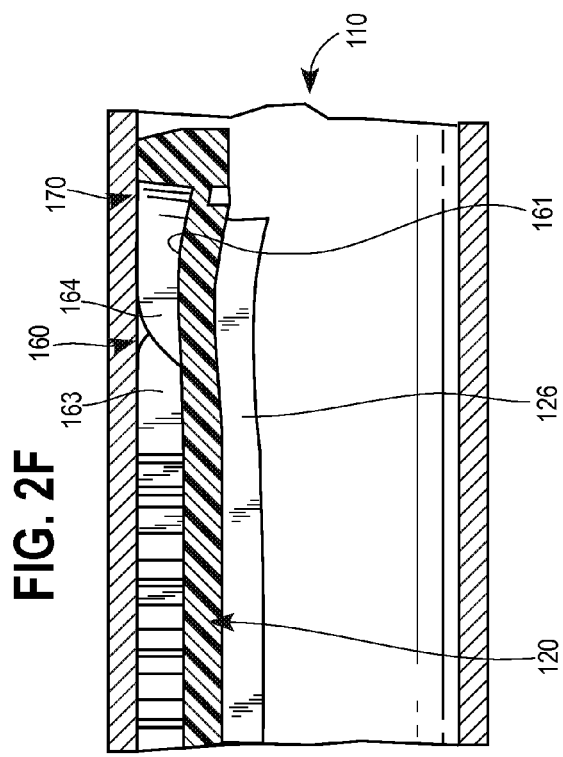
FIGS. 2E-F are cross-sectional views of the emitter of FIGS. 2A-D taken along line i-i illustrated in FIG. 2B, with FIG. 2E illustrating the tongue and fork arrangement at their low pressure position to show how fluid can flow over the top thereof, and FIG. 2F illustrating the tongue and fork arrangement at their high pressure position to show how fluid is restricted from flowing over the top thereof.
Figure 2E:
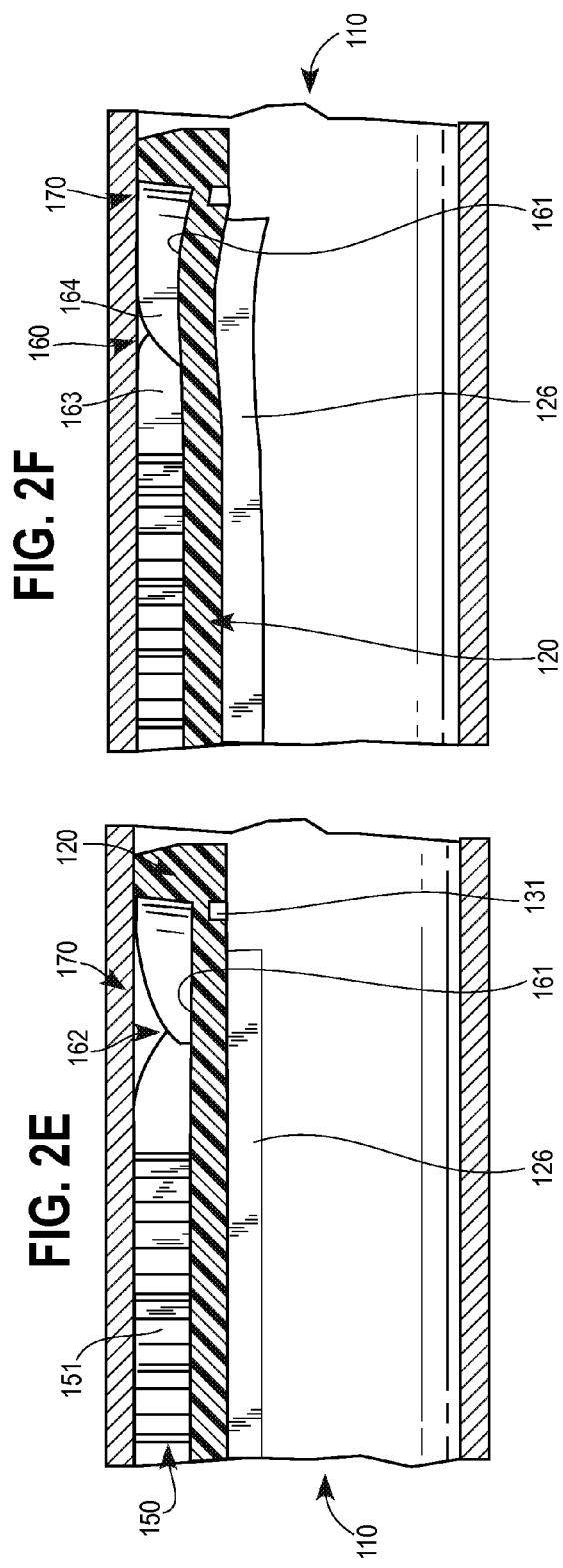
Figure 3F:
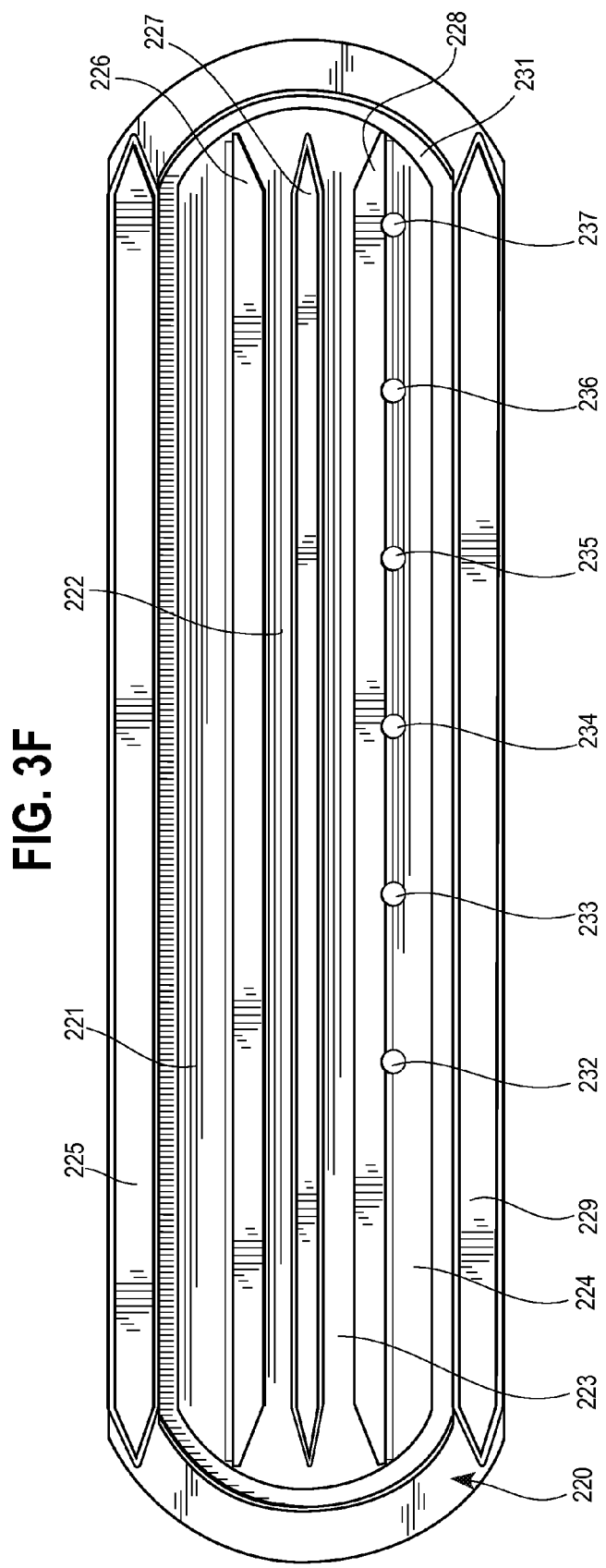
Figure 3G:
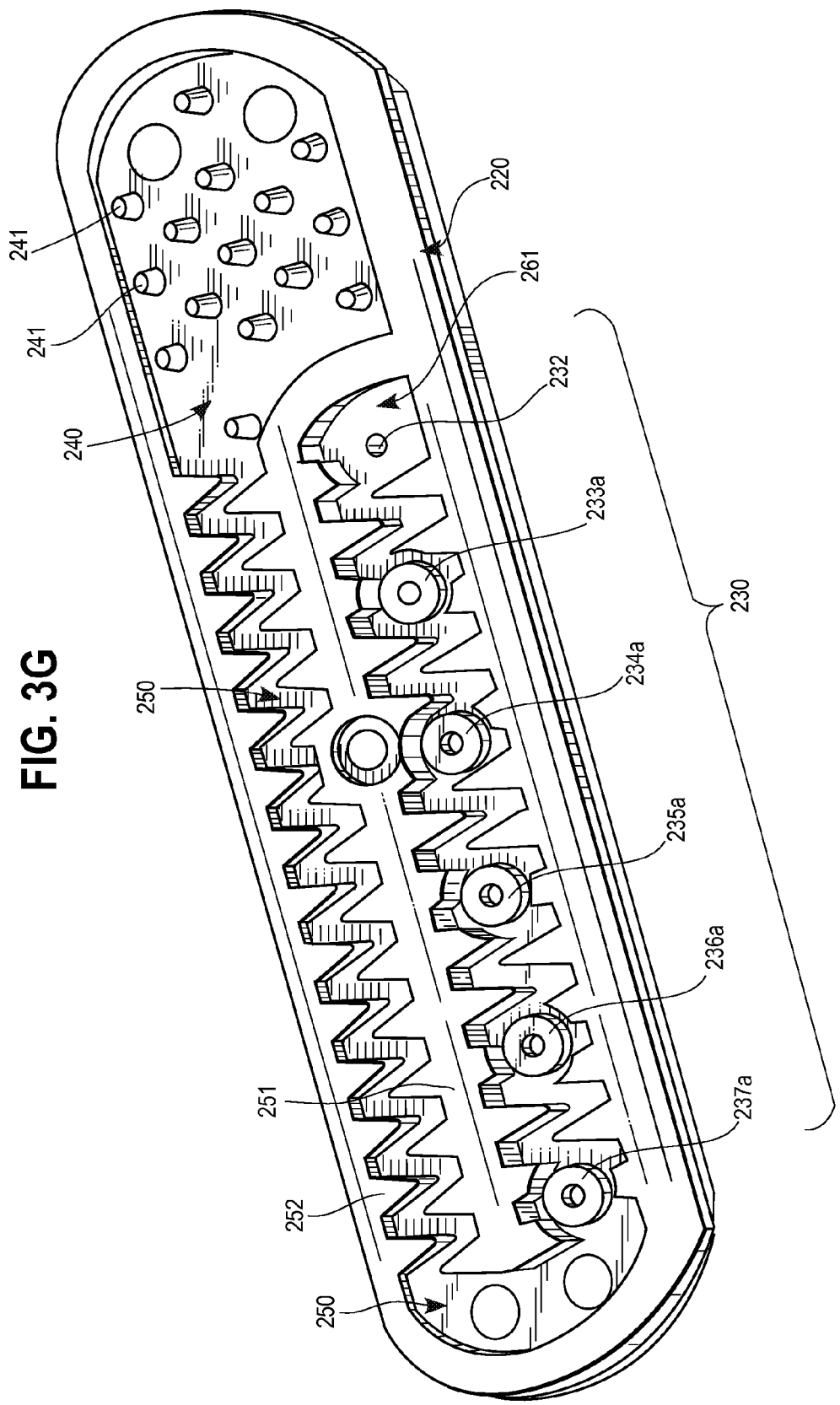

As best illustrated in FIG. 2F, the tongue and fork or groove structures 163, 164 cooperate with one another so that when the floor 161 of the flow channel 150 rises in response to increases in supply line pressure, the tapered structures 163, 164 both rise toward the inner surface of the tube 170 thereby reducing the amount of fluid that can flow over the upper surfaces of the tapered structures 163, 164 and effectively lengthening the flow channel 150 and reducing the cross-section of the flow channel 150 to compensate for the increase in supply line fluid pressure. Similarly, when the floor 161 of flow channel 150 falls in response to a decrease in supply line pressure, the tapered structures 163, 164 both move away from the inner surface of the tube 170 thereby increasing the amount of fluid that can flow over the top of the upper surfaces of the tapered structures 163, 164 and effectively shortening the length of the flow channel 150 and increasing the cross-section of the flow channel 150 to compensate for the decrease in supply line fluid pressure as illustrated in FIG. 2E.

In the form illustrated, the upper surfaces of the tapered structures 163, 164 never fully seal against the inner wall of the tube 170 when moved to their high pressure position, however, in alternate forms, the tapered structures 163, 164 could be designed such that this occurs if desired. Similarly, the embodiment of FIGS. 1A-H could be designed so that the upper surface of the tapered baffle section 62 does not seal completely against the inner surface of the tube 70, if desired.

It should be understood that in alternate embodiments the first and second moveable structures 163, 164 of the inner and outer baffle walls 51, 52 could be swapped so that the inner baffle wall 51 terminated in a groove-type structure and the outer baffle wall 52 defined a tongue-type structure, or in yet other forms both could define other structures meant to correspond with one another or mesh with one another to achieve the same effect of lengthening and shortening the flow channel 50 in response to increases and decreases in supply line fluid pressure, respectively, and if desired, reducing and increasing the cross-section of the flow channel 150 in response to increases and decreases in supply line fluid pressure, respectively. For example, in alternate forms, both the inner and outer baffle walls 51, 52 could define structures that correspond in shape with one another including but not limited to intermeshing U- or V-shaped structures that lengthen the flow channel 150 and reduce the cross-section of the flow channel 150 in response to increases in fluid pressure and that shorten the flow channel 150 and increase the cross-section of the flow channel 150 in response to decreases in fluid pressure.

Thus, with this configuration an irrigation drip emitter 110 is provided for attachment to only a portion of an inner circumference of an inner surface of an irrigation drip line tube 170 having an elastomeric emitter body 120 integrally defining an inlet 130 for receiving pressurized fluid from a fluid supply source, an outlet area 140 for discharging the fluid from the body 120, a pressure reducing flow path 150 extending between the inlet 130 and the outlet area 140 for reducing the pressure and flow of fluid received at the inlet 130 and discharged through the outlet area 140, and a pressure compensating portion 160 for automatically adjusting the pressure and fluid flow reducing effect of the flow channel 150 in response to a change in pressure of the fluid supply source 170, wherein the pressure reducing flow channel 150 includes an inner baffle wall 151 and an outer baffle wall 152 that extends about the inner baffle wall 151 in a generally U-shaped manner. At least some of the upper surfaces of the baffle walls 151, 152 having a first radius of curvature that corresponds with a second radius of curvature of an inner wall of the irrigation drip line tube 170 and the inner baffle wall 151 defines a first tapered baffle structure 163 and the outer baffle wall 152 defines a second tapered baffle structure 164 positioned proximate the first baffle structure 163, with the first and second tapered baffle structures 163, 164 cooperating to form part of the pressure reducing flow channel 150 and the first and second tapered baffle structures 163, 164 tapering in height toward one another and being variably moveable between a first position wherein the upper surfaces of the first and second tapered baffle structures 163, 164 are not level with the upper surfaces of the baffle walls with the first radius of curvature so that fluid can flow over the first and second tapered baffle structures 163, 164 and a second position wherein the upper surfaces of the tapered baffle structures 163, 164 move toward and/or are at the same level as the other upper surfaces of the baffle walls with the first radius of curvature and fluid is restricted from flowing over at least a portion of the first and second tapered baffle structures 163, 164 and the cross-section of the flow channel 150 proximate the first and second baffle structures 163, 164 is reduced and the length or extent of the flow channel 150 is lengthened.

In yet other embodiments, the two part pressure compensating mechanism may use other types of moveable walls in combination with a deflecting member to compensate for changes in fluid pressure. For example, in the alternate embodiment illustrated in FIGS. 3A-G, the emitter body is designed with a plurality of fluid inlet openings with sleeves or annular walls extending therefrom, which can move in response to increases and decreases in supply line fluid pressure. For convenience, items which are similar to those discussed above with respect to emitter 10 in FIGS. 1A-F and emitter 110 in FIGS. 2A-F will be identified using the same two digit reference numeral in combination with the prefix "2" merely to distinguish this embodiment from the others. Thus, the emitter body identified in FIGS. 3A-F is identified using the reference numeral 220 since it is similar to emitter bodies 20 and 120, and defines an inlet 230, outlet 240 and pressure-reducing flow channel 250, which are similar to those discussed above (i.e., inlet 30, 130, outlet 40, 140, and pressure-reducing flow channel 50, 150). In addition, the upper surfaces of the peripheral wall of emitter body 220, inner and outer baffle walls 251, 252, and nubs 241 all have a first common radius of curvature that corresponds with a second radius of curvature of an inner wall of the irrigation drip line tube 270.

Unlike the embodiments discussed above, however, the inlet 230 of emitter body 220 comprises a plurality of inlet openings 232, 233, 234, 235, 236 and 237. In the form illustrated, the inlet openings 232-237 vary in height, with the initial inlet opening 232 being flush to the floor 261 of the pressure-reducing flow channel 250 and the remaining inlet openings 233-237 having annular walls, such as sleeves or bosses 233a, 234a, 235a, 236a and 237a, respectively, that have terminal ends that progressively extend further into the pressure reducing flow channel 250 with the terminal end of each boss moving variably from an open position wherein the terminal end of the boss is not generally level or flush with the first common radius of curvature of the upper surfaces of the baffle walls 251, 252 so that fluid can flow through the boss and into the flow channel 250, and a closed position wherein the terminal end of the boss is generally level or flush with the first common radius of curvature of the upper surfaces of the baffle walls 251, 252 so that fluid is prevented from flowing through the boss and into the flow channel 250.

In a preferred form, the upper surfaces of the terminal end of the bosses 233a-237a have a radius of curvature that is the same as the first common radius of curvature of the upper surfaces of baffle walls 251, 252 which corresponds with the second radius of curvature of the inner wall of the irrigation drip line tube 270 so that the bosses 233a-237a can close flush against the inner wall of tube 270 and prevent fluid from flowing through the boss and into the flow channel 250 when raised into engagement with the inner wall of tube 270. In addition, the height of the bosses 233a-237a are varied so that the inlets 233-237 close sequentially starting with the inlet furthest from the initial inlet opening 232 (i.e., which in the illustrated example is inlet 237) and then moving to the inlet that is the next furthest (i.e., 236), then the next furthest (i.e., 235) and so on. By closing the inlets 233-237 in this order (i.e., starting with the inlet furthest downstream and moving upstream), the emitter body 220 actually lengthens the pressure-reducing passage 250 with each sequential closing for all fluid flowing therethrough which allows the emitter to compensate for increases in the supply line fluid pressure. Conversely, as supply line fluid pressure decreases, the emitter body opens the inlets 233-237 beginning with the inlet furthest upstream and moving downstream, which allows the emitter to shorten the pressure-reducing passage 250 for some of the fluid flowing through the emitter to compensate for the reduction in supply line fluid pressure.

In the form illustrated, it is contemplated that each of inlet openings 233-237 will close during normal operation of the emitter 210 or that the emitter body 220 will be designed such that inlet openings 233-237 will normally close at some point during the operation of the emitter due to expected increases in supply line fluid pressure (i.e., that enough pressure is expected to be reached that will cause inlets 233-237 to close at some point or another). However, it should be understood that in alternate embodiments the emitter body 220 may be designed to only shut one or more of the inlets 233-237 during normal or expected supply line fluid pressure conditions and only having the remaining inlets 233-237 close under extraordinary conditions (e.g., when supply line fluid pressures are reached that are much greater than normal or expected pressures). This can either be done by altering the size of the emitter body 220 or any of its features (e.g., inlet opening, floor thickness, baffle wall size, flow path cross-section, etc.) or by using different materials for body 220 (e.g., materials with different Durometer values, different compositions that make the body 220 harder or less flexible, etc.). Conversely, the emitter body 220 may be made of materials that allow for inlets 233-237 to close more rapidly if desired (e.g., by altering body features and/or selecting different materials as discussed above). In this way, the emitter 10 can be customized for specific applications.

Thus, with this configuration an irrigation drip emitter 210 is provided for attachment to only a portion of an inner circumference of an inner surface of an irrigation drip line tube 270 having an elastomeric emitter body 220 integrally defining an inlet 230 for receiving pressurized fluid from a fluid supply source, an outlet area 240 for discharging the fluid from the body 220, a pressure reducing flow path 250 extending between the inlet 230 and the outlet area 240 for reducing the pressure and flow of fluid received at the inlet 230 and discharged through the outlet area 240, and a pressure compensating portion 260 for automatically adjusting the pressure and fluid flow reducing effect of the flow channel 250 in response to a change in pressure of the fluid supply source 270, wherein the pressure reducing flow channel 250 includes an inner baffle wall 251 and an outer baffle wall 252 that extends about the inner baffle wall 251 in a generally U-shaped manner. With at least some upper surfaces of the baffle walls 251, 252 having a first common radius of curvature that corresponds with a second radius of curvature of an inner wall of the irrigation drip line tube 270, and the inlet 230 includes a plurality of inlet passages 232-237 with each passage 232-237 extending from a surface of the body exposed to the pressurized fluid to the pressure reducing flow channel 250, with at least some of the inlet passages 233-237 extending through bosses each having a terminal end progressively extending further into the pressure reducing flow channel 250, the terminal end of each boss being moveable variably from an open position wherein the terminal end of the boss is not level with the upper surfaces of the baffle walls having the first radius of curvature so that fluid can flow through the boss and into the flow channel 250 and a closed position wherein the terminal end of the boss is generally level with the upper surfaces of the baffle walls having the first radius of curvature so that fluid is prevented from flowing through the boss and into the flow channel 250.

It should be understood that in alternate embodiments the sleeves or bosses 233a-237a may take on other shapes and sizes as may be desired for specific applications. For example, in some applications inlets with rectangular cross sections may be desired over the round inlets depicted in FIGS. 3A-G. In yet other forms, inlet passages that serve some form of pressure reduction, such as passages that define tortuous paths, may be desired. In still other embodiments, fewer or more inlet openings or bosses may be provided than those shown in FIGS. 3A-G if desired. For example, in FIG. 4, an alternate drip emitter and drip line is illustrated having an inlet made-up of a plurality of inlet openings. In keeping with the above practice, features that are common to those discussed above will use the same two-digit reference numeral, but having the prefix "3" merely to distinguish one embodiment from another.

In the form illustrated in FIG. 4, the plurality of inlets are shaped like elongated openings, such as slits or slots 330, which not only allow fluid to flow through the inlet of the emitter 310, but also help filter or deflect particulates such as grit away from the emitter 310 to help ensure the fluid flowing through the emitter 310 is free of such particulates so that the particulates do not interfere with the operation of the emitter 310. The plurality of openings 330 have longitudinal axes that parallel the longitudinal axis of the emitter 310, however, in alternate forms it should be understood that the plurality of openings may take on a variety of different shapes and sizes and may be oriented in different ways so as not to have longitudinal axes parallel to the longitudinal axis of the emitter 310 (if even having longitudinal axes).

In alternate forms, it should be understood that the inlet or inlets of the emitter may be placed in certain positions to help determine how the emitter will operate. For example, in some forms, an inlet opening may be positioned further upstream to effectively shorten the length of the pressure-reducing flow channel and create an emitter that has a higher fluid flow rate (e.g., four gallons per hour or 4 GPH). In another form the inlet opening may be positioned further downstream to effectively lengthen the pressure-reducing flow channel and create an emitter that has a lower flow rate (e.g., 1 GPH). In still another form, the inlet opening may be positioned somewhere in-between the above mentioned locations to create an emitter with an intermediate pressure-reducing flow channel length that has a flow rate somewhere in-between the other flow rates (e.g., 2 GPH). The changing of this inlet location could be accomplished by having a readily adjustable mold (e.g., one where the location of the inlet opening can be slid or moved between the desired locations) or, alternatively, separate molds could be made for each embodiment (i.e., one for the low flow rate emitter, another for the intermediate flow rate emitter, and another for the high flow rate emitter).

The same may be true for outlet openings. For example, when manufacturing the drip line, the location of the outlet opening may be altered to affect how the emitter will operate. The outlet opening could be located further upstream to effectively shorten the pressure-reducing flow channel and create an emitter with a higher flow rate (e.g., 4 GPH). In another form the outlet opening may be located further downstream to effectively lengthen the pressure-reducing flow channel and create an emitter with a lower flow rate (e.g., 1 GPH). In another form, the outlet opening may be positioned somewhere between the above mentioned locations to effectively create an emitter with an intermediate pressure-reducing flow channel length that operates with a fluid flow rate somewhere between the above-mentioned flow rates (e.g., 2 GPH). The outlet opening may be formed in the drip line tubing before or after the emitter is bonded to the inner surface of the tubing, however, in a preferred form the opening will be formed after the emitter is bonded to the inner surface of the tubing. The opening is typically formed via a die, press, awl or the like. Thus, adjustments to the location of where the outlet opening can be made by adjusting where this puncture occurs in the tubing.

In addition, in some forms color may be added to the individual emitters and/or the drip line and methods of manufacturing same to distinguish these products or product lines from one another or to signify something relating to the items intended use or application. For example, one color may be used to identify an emitter or dip line that drips at a rate of one gallon per hour (1 GPH), another color may be used to identify an emitter or drip line that drips at a rate of two gallons per hour (2 GPH), another color may be used to identify an emitter or drip line that drips at four gallons per hour (4 GPH). In one form, emitters of different flow rates are distinguished by color so that workers can more easily determine which emitters are to be inserted into extruded tubing during assembly in order to obtain a drip line with common emitter drip rates. In another form, the extruded tubing may be made in a specific color or have a marking of a specific color to designate the flow rate of the drip emitters located therein in order to help workers and/or end users distinguish drip lines of different drip rates. In still other forms, both the emitters and the tubing may include color to specify the drip rate or intended application. In other forms, colors may be used to signify the source of fluid to be used with the emitter or drip line or the particular application for which the emitter or drip line is to be used. For example, the color purple is often used to indicate that reclaimed or recycled water is being used. Thus, the emitter or drip line could be marked with this color to indicate that the emitter or drip line is intended for these types of applications or to indicate the type of fluid that is suppose to travel through these types of emitters/drip lines. If desired, any of the embodiments and methods disclosed herein could include the addition of color for such purposes.

Turning back to the embodiment of FIG. 4, it should be appreciated that in this form, the emitter 310 includes a baffle design having teeth extending from the sides of the emitter body 320 toward one another to form the tortuous flow passage 350 without a central baffle portion. The height of each tooth is higher at the sides of the emitter body 320 than at the distal end of each tooth and, as fluid pressure increases, the floor 361 of flow channel 350 moves up toward the inner surface of the tube 370 causing the portions of the teeth closest to the sides of the emitter body 320 to close against (e.g., touch, engage, etc.) the inner surface of the tube 370 first, before gradually closing more and more of each tooth against the inner surface of tube 370 simultaneously until the floor 361 cannot move any further. Thus, rather than closing the baffle teeth consecutively or sequentially against the inner surface of tube 370 to lengthen the pressure-reducing flow passage 350 and compensate for the increase in pressure, this configuration allows each tooth to gradually close against the inner surface of tube 370 simultaneously in response to increases in line pressure thereby lengthening the pressure-reducing flow passage 350 and reducing the cross-section of the pressure-reducing flow channel 350 to form a pressure compensating mechanism 360 that compensates for increases and decreases in line pressure. For convenience, only a portion of tube 370 is illustrated in FIG. 4 so that a portion of the emitter body 320 remains visible, however, it should be understood that the tube 370 would extend over the entire emitter body 320 and that the emitter body 320 would be bonded to the inner surface of the tube in a manner similar to that discussed above.

In the form illustrated, fluid flowing through the drip line 370 enters the emitter 310 via inlet openings 330, travels through the tortuous passage 350 and then exits the emitter 310 via outlet opening 371. The pressure compensating mechanism 360 reduces the cross-section of the flow channel 350 by raising the floor 361 of flow channel 350 and pressing more of the upper surfaces of the baffle teeth into engagement with the inside surface of the tubing 370 as fluid pressure increases, and increases the cross-section of the flow channel 350 by allowing the floor 361 of flow channel 350 to move away from the inner surface of tubing 370 as fluid pressure decreases. This configuration also provides a large central flow path down the middle of the pressure-reducing flow channel 350 which allows for easier processing of grit or other particulates, particularly at start-up and shutdown of fluid flow due to the low pressures associated with same and due to the fact the portion of the flow channel 350 with the largest cross-sectional area will always remain in the middle of the emitter 310 and, specifically, at the longitudinal axis of the flow channel 350.

FIGS. 5A-B are perspective views of an alternate drip emitter and drip line embodying features of the present invention wherein the pressure-reducing flow channel is made-up of baffles with flexible teeth that move in response to fluid flow through the emitter body. In keeping with above practices, items that are common to those discussed above will use the same two digit reference numeral but with the addition of the prefix "4" to distinguish one embodiment from another. In the form illustrated, only a portion of the tube 470 is illustrated in FIG. 5A so that the details of emitter body 420 may be seen, however, it should be understood that the entire emitter body 420 would be inserted within the tube 470 and connected to an inner surface of tube 470.

The emitter 410 includes a plurality of flexible baffle walls extending from opposite sides of the emitter body 420 toward one another and in a staggered arrangement so one wall is not directly opposite a wall on the other side of the emitter body 420. In the form illustrated, the baffle walls form flexible teeth that are much narrower than those discussed above and form generally rectangular walls connected at their base to the floor 461 of the pressure-reducing flow channel 450 and on one side to the side of the emitter body 420. Thus, when fluid flows through the supply line 470, at least a portion of the fluid flows through the inlet opening 430, through the tortuous passage 450 defined by the baffle walls 452, to the outlet 440 and through outlet opening 471. As the supply line fluid pressure increases, the floor of the flow channel 461 moves toward the inner surface of tube 470 driving the tops of the baffle walls into engagement with the inner surface of the supply line tubing 470 and, thereby, restricting or reducing the cross-sectional area of the flow channel 450 and/or increasing the length of the flow channel 450 in response to the increase in pressure in order to compensate for the supply line fluid pressure increase. As the fluid pressure in the supply line continues to increase, the baffle walls 452 closest to inlet 430 flex or bend over in the direction of the fluid flow. This occurs because the pressure of the fluid is always greater than the pressure of the floor 461 raising the baffle walls 452 into engagement with the inner surface of the tube 470. As fluid pressure increases further within tube 470, more and more of the flexible baffle walls 452 will flex or bend in the direction of the fluid flow which can also help the emitter process obstructions such as grit or other particulates by allowing the baffle walls to bend so that the obstructions can be carried through the flow channel and out of the emitter 410. Conversely, when fluid pressure decreases in the supply line 470, the baffle walls cease bending and return to their normal positions (e.g., as illustrated in FIG. 5A) and the floor 461 lowers, allowing the walls 452 to move away from the inner surface of tube 470 and thereby increasing the cross-sectional area of the flow path 450 and/or reducing the length of the flow channel 450 to account for the decrease in fluid pressure. In this way, emitter 410 is equipped with a pressure compensating mechanism 460 like some of the other embodiments discussed herein.

Although the embodiment illustrated shows circular inlets and outlet openings 430 and 471, it should be understood that in alternate embodiments these inlet and outlet openings may take on a variety of different shapes and sizes. In addition, in alternate forms the emitter body 420 may be designed with larger pools or baths located at the inlet 430 and outlet 440 (like the embodiment of FIGS. 1A-H), instead of directly transitioning to the tortuous flow passage 450 as illustrated in FIGS. 5A-B. Furthermore, the flexible baffle walls 452 disclosed in this embodiment could easily be used in any of the other embodiments disclosed herein, just like any of the features of the various embodiments discussed herein could be mixed and matched together to form another embodiment regardless of which embodiment the specific feature is currently illustrated in. Thus, in one form, the flexible teeth 452 may be used in an embodiment more like that shown in FIGS. 1A-H (e.g., with a U-shaped tortuous passage). In still other forms, the flexible teeth 452 may be attached to the emitter body 420 in such a way as to be predisposed to flex or bend in a preferred direction. For example, rather than having the flexible teeth 452 bend in the same direction the fluid flows through the emitter 410, the teeth 452 could be predisposed with an angle causing the teeth 452 to bend in a direction opposite the fluid flow in order to cause more turbulence and interference with the fluid flowing through the emitter 410. As mentioned above, however, in a preferred form of the embodiment of FIGS. 5A-B, the baffle walls 452 will bend in the same direction as the fluid flow.

Yet another embodiment of an alternate drip emitter and drip line in accordance with the invention is illustrated in FIGS. 6A-D. As with the other embodiments discussed herein, this embodiment will use the same two digit reference numeral to refer to items similar to those discussed above, but will include the prefix "5" to distinguish one embodiment from the others. Thus, in the form illustrated in FIGS. 6A-D, the emitter 510 includes an emitter body 520 having an inlet 530, outlet 540 and tortuous flow path 550 extending therebetween; however, unlike the previous embodiments discussed herein, the baffle walls 552 include at least one hollow portion which fills with fluid as the supply line fluid pressure increases in order to reduce the cross-sectional area and/or increase the length of the flow channel 550 to compensate for an increase in fluid pressure.

More particularly, in the form illustrated in FIGS. 6A-D, the teeth 552 of the baffle walls are hollowed-out or define an opening or void 554 in order to allow supply line fluid to fill the void 554 of the hollow teeth 552 (or the space 554 defined by each hollow tooth) and, as supply line fluid pressure increases, to swell or enlarge the size of each tooth 552 by filling this void with pressurized fluid and thereby causing the size of the teeth to grow/expand and reduce the cross-sectional area of the flow channel 550 to compensate for the increase in the fluid pressure. A view of the bottom of emitter body 520 (which is the side of the emitter facing the fluid flowing through supply line 570) is illustrated in FIG. 6D showing the void 554 and illustrating how some of the supply line fluid is able to flow along the bottom surface of the emitter body 520, fill the voids 554 of the hollow teeth, enter the inlet 530 of the emitter and/or continue flowing down the supply line 570.

As fluid pressure increases, the floor of the emitter 561 will also move upwards and, thus, the upper surfaces of the baffle walls 552 will gradually engage more and more of the inner surface of tube 570 thereby increasing the length of the tortuous passage 550 that the fluid must flow through in order to compensate for the increase in fluid pressure. Conversely, when fluid pressure decreases, the floor 561 will drop, gradually disengaging the baffle walls 552 from the inner surface of the tube 570 and the teeth 552 will shrink or reduce in size to effectively increase the cross-sectional area of the flow path 550 and reduce the length of the tortuous passage that the fluid must flow through to compensate for the reduction in fluid pressure. Thus, like the previous embodiments discussed herein, the emitter 510 is equipped with both a pressure-reducing flow path 550 and a pressure compensating mechanism 560 for ensuring that each emitter operates uniformly and as desired.

In FIG. 6A, the supply line fluid pressure is low and, thus, the teeth of baffle walls 552 are not enlarged and the upper surfaces of the baffle walls are not fully engaged with the inner surface of the supply line tube 570. This reduces the length of the flow channel 550 that the fluid must flow through and allows for the flow channel 550 to have a maximum cross-sectional area. In FIG. 6B, the supply line fluid pressure has increased some to a generally intermediate level of pressure such that the teeth of baffle walls 552 have enlarged a bit and the upper surfaces of the baffle walls nearest the side of emitter body 520 begin to engage the inner surface of supply line tube 570. This increases the length of the flow channel 550 that the fluid must flow through and reduces the cross-sectional area of the flow channel 550 to account for or compensate for the increase in fluid pressure. In FIG. 6C, the supply line fluid pressure has increased further to a high level of pressure such that the teeth of the baffle walls 552 have grown or enlarged to their maximum size (or close to their maximum size) and the upper surfaces of the baffles fully engage the inner surface of the supply line tube 570. This further increases the length of the flow channel 550 that the fluid must flow through (thereby maximizing the amount of pressure-reduction taking place via flow channel 550) and reduces the cross-sectional area of the flow channel 550 to its smallest cross-sectional area to compensate for the increase in fluid pressure. In addition, the baffle teeth 552 in FIG. 6C are shown tipping or bending in the direction of the fluid flow (similar to that shown with respect to the embodiment of FIGS. 5A-B). Thus, with this configuration, the pressure-reducing flow channel has a first cross-sectional area at lower fluid pressures, a second cross-sectional area, smaller than the first, at higher fluid pressures to compensate for the increase in fluid pressure so that the emitter and drip line trickle fluid at a generally constant or desired rate, and a plurality of gradually decreasing cross-sectional areas as the fluid pressure increases from the pressure that exists at the first cross-sectional area to the pressure at the second cross-sectional area.

FIGS. 6B-C are perspective views of a portion of the flow channel of FIG. 6A illustrating the hollow teeth of the baffle partially enlarged and fully enlarged, respectively, in response to increasing fluid pressure showing how the cross-sectional area of the pressure-reducing flow channel in FIG. 6B has a smaller cross-sectional area than that illustrated in FIG. 6A due to an increase in fluid pressure and showing how the cross-sectional area of the pressure-reducing flow channel of FIG. 6C is even smaller than that illustrated in FIG. 6B due to a further increase in fluid pressure.

Another emitter embodying features of the present invention is shown in FIGS. 7A-I. In keeping with the above practices, this embodiment will use the same latter two-digit reference numerals to describe items that are similar to those discussed above, but will include the prefix "6" merely to distinguish one embodiment from another (e.g., emitter body will be referenced as 620 indicating it is similar to prior emitter bodies 520, 420, 320, 220, 120 and 20).

In this embodiment, the emitter 620 is made of an elastomeric material and defines a single pressure reducing flow channel or passage 650 laid out in a generally straight pattern like those illustrated in FIGS. 4-6D above, rather than a curved or U-shaped pattern like those illustrated in FIGS. 1A-3G. The flow channel 650 has a plurality of teeth extending from outer baffle walls 552 that move in response to changes in fluid pressure in order to provide a pressure compensating emitter. In this particular embodiment, however, the unitary emitter body 620 defines first and second outer baffle walls 652a, 652c that are interconnected via hinge or joint 652e. The baffles of first wall 652a extend into the flow path via teeth 652b and the baffles of wall 652c extend out into the flow path via teeth 652d. When fluid pressure increases, the walls 652a, 652c and their respective teeth 652b, 652d are moved from a first or static position wherein the walls and teeth are spaced apart from one another to a second, higher or high pressure position wherein the walls and teeth are squeezed closer together to one another thereby reducing the cross-section of the fluid passage 650 and restricting the amount of fluid that is allowed to flow through emitter 620 and reducing the flow rate of same. In this way, the entire fluid passage 650 is capable of serving as the pressure compensating member 660.

More particularly and as best shown in FIGS. 7B, 7C-E, 7G and 7I, the unitary emitter body 620 defines an inlet 630, outlet 640 and having first wall 652a and second wall 652c between the inlet 630 and the outlet 640. The first and second walls 652a, 652c define a pressure reduction or reducing flow channel 650 and having interconnecting member or interconnection 650e between one another. In this way, emitter 620 operates similar to emitter 520 (FIGS. 6A-D) in that increases in fluid pressure result in lateral or sideways movement or growth of teeth 652b, 652d to reduce the size of the flow path 650 and, in particular, the effective cross-section of the flow passage 650.

Figure 7E:
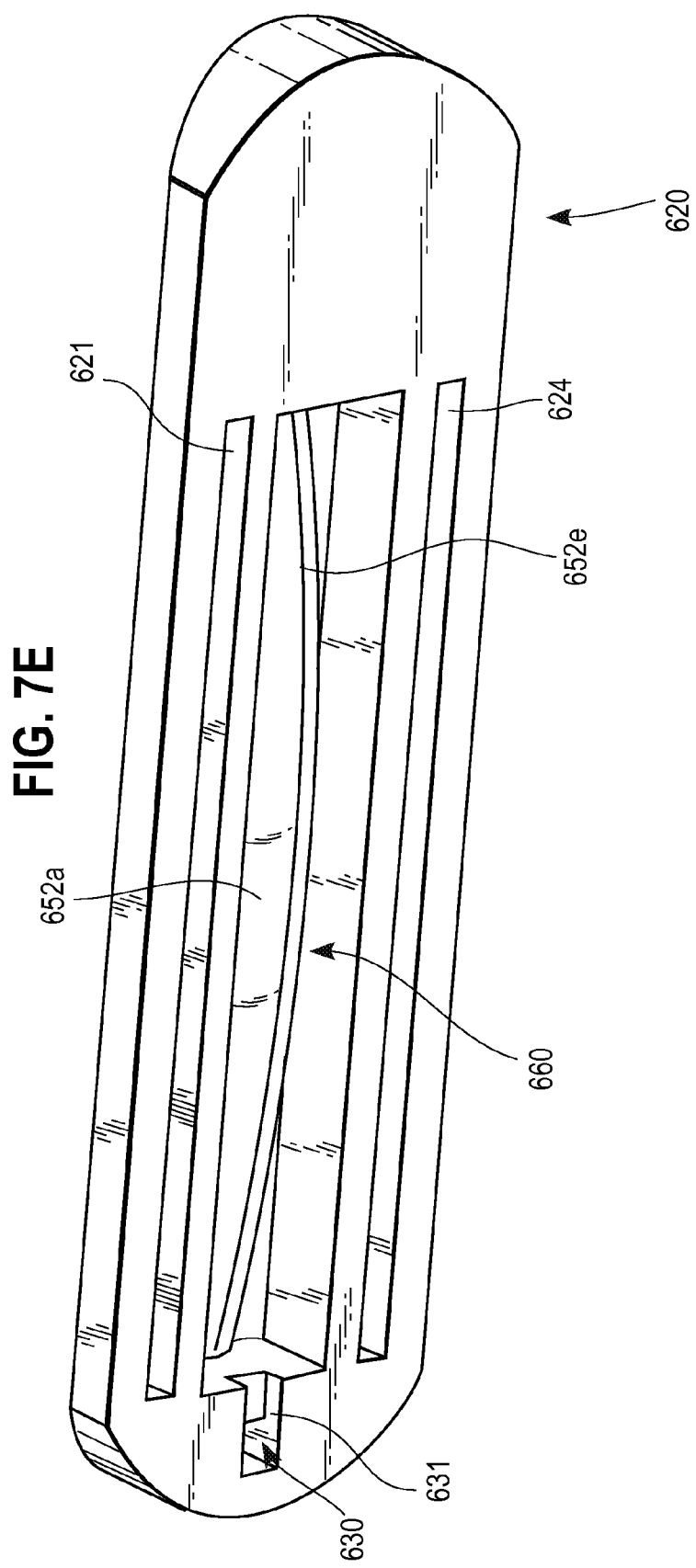
FIG. 7E is a bottom perspective view of the emitter of FIGS. 7A-D illustrating how the first and second walls form a generally curved channel that increases of pressure will act upon to press the first and second walls toward one another to further restrict fluid flow.
Figure 7H:
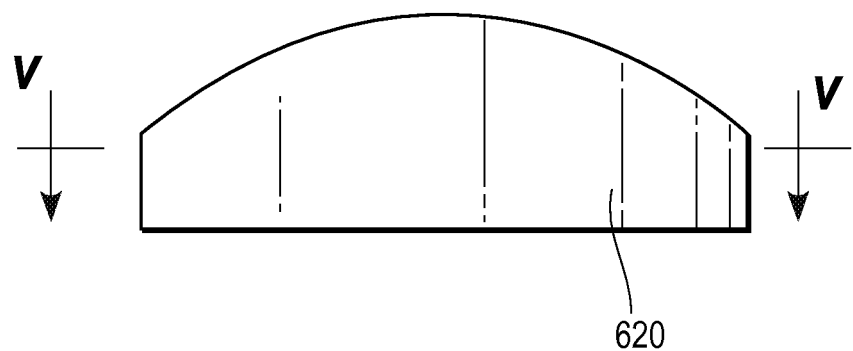
FIGS. 7H-I are front elevation and front cross-sectional views, respectively, illustrating the emitter body shape and shape of the first and second walls and the interconnection therebetween, the cross-section being taken along lines iv-iv in FIG. 7F.
Figure 7I:
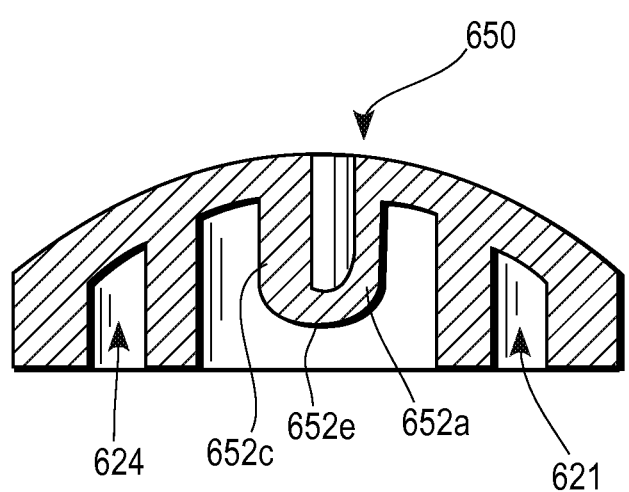

In the form illustrated in FIGS. 7E and 7I, the side walls 652a, 652c and interconnecting member 652e form an arcuate cross-sectional shape (e.g., a generally U-shape) extending down from the top of emitter 620 and running along the longitudinal axis of the emitter 620. In addition and as best illustrated in FIGS. 7D and 7E, the flow channel or passage 650 further increases in height from the inlet side or end 630 of the emitter 620 to an intermediate point of the emitter 620, but then decreases in height from the intermediate point of the emitter 620 to the outlet end 640 of the emitter 620. More particularly, the walls 652a, 652c increase in height from the inlet end of the emitter 630 to the general middle or center of the emitter 620 and then decrease in height from the middle/center of emitter 620 to the outlet portion 640 of emitter 620. Thus, the pressure reducing channel 650 has a varying cross-sectional area along its longitudinal axis and the maximum cross-sectional area of the flow channel 650 is in the intermediate portion of the flow channel 650.

In a preferred form, the alternating series of baffles 652b, 652d extending from first and second walls 652a, 652c vary in length or height in a manner corresponding with the varying length or height of walls 652a, 652c giving the first and second walls a cross-section that appears as an oval at certain planes as illustrated in FIG. 7D. This configuration means that the intermediate portion 650f of the flow channel 650 will have the maximum length or height for baffles 652b, 652d and that this portion of the flow channel 650 will be affected first in relation to fluid pressure increases due to it offering more surface area than other portions of the flow channel 650. Thus, the flow channel 650 will be squeezed or pinched in the intermediate area 650f of the emitter first, before elsewhere along the flow channel (e.g., before the portions at or near the input and output ends 630, 640).

As best illustrated in FIGS. 7C and 7D, the baffles 652b, 652d are preferably tooth shaped, having the edges of the baffles 652b for the first wall 652a overlap with the edges of baffles 652d for the second wall 652c. In the form illustrated, the overlap is approximately twenty-thousandths of an inch (0.020") with the teeth 652b, 652d varying in length or height from thirty-thousandths of an inch (0.030") to one hundred-thousandths of an inch (0.100") and having a maximum flow gap when the first and second walls 652a, 652c are in their static or non-moved position of thirty-thousandths of an inch (0.030")(the bridge gap between first and second walls 652a, 652c being approximately fifty-thousandths of an inch (0.050"). It should be understood, however, that in alternate embodiments these dimensions may be changed and instead of having an overlap between teeth 652b, 652d, a gap may be maintained to assist with flushing the emitter 650 of obstructions such as grit (as discussed above).

Another difference with respect to emitter 620 of FIGS. 7A-I and prior embodiments is that the emitter 620 defines an outlet bath 640 that has projections such as walls or posts/stanchions 641 to prevent the outlet pool 640 from collapsing under increases in fluid pressure. In this way, these structures 641 are similar to the nubs discussed above (e.g., 41, 141 and 241), however, they connect to the outer wall of the emitter 620, the wall that defines the bath 640, rather than rising up from the surface of the floor of the outlet 640.

As with earlier embodiments, the emitter 620 has a top surface that is capable of being attached to the inside surface of a conduit (not show) at predetermined intervals thereof in order to form a drip line using said emitter. Unlike prior embodiments which used guide ribs (e.g., 25-29), the emitter body 620 uses guide recesses or slots 621 and 624 for aligning the emitter 620 and inserting same into the conduit during constructions, preferably as the conduit is extruded. The inlet 630 also preferably has a recessed opening or inlet, such as channel 631 which helps to prevent large obstructions from entering into the emitter 620 during operation within a fluid-filled drip line.

Turning now to FIGS. 8A-G, in which there is illustrated yet another emitter embodying features of the present invention, this emitter defines a series of rows of baffles transverse to the longitudinal axis of the emitter and extending into the pressure reduction flow path, with a portion of the baffles varying in height to create a structure that compensates for pressure. In keeping with the above, items that are similar to those discussed in earlier embodiments will be referenced using the same last two-digit identifier, but using the prefix "7" to distinguish one embodiment from others. Thus, in the form illustrated, the emitter body is referenced by reference numeral 720.

In the form illustrated in FIGS. 8A-G, the unitary emitter body 720 is made of an elastomeric material and defines a single pressure reducing flow channel or passage 750 laid out in a generally serpentine pattern. The body 720 has a longitudinal axis and defines an inlet 730 and outlet 740 in addition to the pressure reduction flow path 750 which connects both the inlet 730 and outlet 740. The body 720 has a series of rows of baffles 752g-m, extending transverse to the longitudinal axis of the emitter 720 and into the pressure reduction flow path 750. A first series of baffles, 752g, 752h and 752i have constant height, whereas, a second series of baffles, 752j, 752k, 752l and 752m vary in height. The baffles having a varying height, 752j-752m, have a static or normal position and a pressurized elevated position (or elevated pressure position).

In the embodiment depicted, the baffles are shaped in the form of teeth positioned about a wall wherein each varying height baffle tooth has a base 752n and a distal or terminal end 752o with the varying height being at a maximum height at the base 752n and at a minimum height at the distal or terminal end 752o. The baffle teeth are staggered or positioned to alternate with one another so that the teeth align opposite gaps between teeth members on the opposite wall defining the fluid flow passage 750.

In FIGS. 8A-G, at least two rows of the series of baffles (e.g., 752k, 752l) include varying height teeth members. An additional two rows of the series of baffles (e.g., 752j, 752m) include varying height teeth members on one side of the baffle. Baffle row 752j includes teeth of continuous height extending from one side of the row (e.g., the side facing the inlet 730) and teeth of varying height on the opposite side of the row (e.g., the side facing outlet 740). Baffle rows 752h and 752i having continuous height (including all teeth). Baffle rows 752g and 752m have teeth extending from only one side of their respective row, with the baffle row 752g being of continuous height and baffle row 752m being of varying height. Thus, with this configuration, the baffles with varying height 752j-m server as the pressure compensating member 760 for emitter 720.

Thus, when a plurality of emitters 720 are installed in a conduit to form a drip line, fluid will flow through the conduit, into the inlet of the drip emitter 720 and through pressure reducing flow passage 750. As fluid pressure increases in the conduit, the passage floor of passage 750 will push up into the flow passage 750 in at least the areas where baffles of varying height are provided (e.g., compensation portion 760) due to the spacing that exists and allows for baffle movement. This will cause the baffle teeth to move to their elevated pressure position, preferably forcing their upper surfaces to engage the inside surface of the conduit (or approaching such engagement), thereby, reducing the cross-section of the flow passage 750 in this area and restricting the amount of fluid that can flow through this region in order to compensate for the fluid pressure increase. In this way, the emitter operates similar to the emitter embodiments discussed above with respect to FIGS. 1A-I and 2A-F.

Although the embodiment depicted in FIGS. 8A-G shows specific series of baffles having continuous height and varying height, it should be understood that in alternate embodiments more or less of the baffles 752g-m may have varying heights. In fact, in some forms all of the baffles may be provided in constant height (for example, in situations where no pressure compensation feature is required or desired for the emitter). Alternatively, in other embodiments all of the baffles may have some form of varying height component.

In FIGS. 8A-G, the emitter 720 preferably includes a guide recess, such as channel 721, which serves the dual role of helping position or align the emitter 720 for insertion into the conduit and helps recess the inlet 730 of emitter 720 into a recessed opening 731 which helps block larger obstructions from entering into the emitter 720 or at least blocking all flow of fluid into the inlet 730.

Figure 8E:
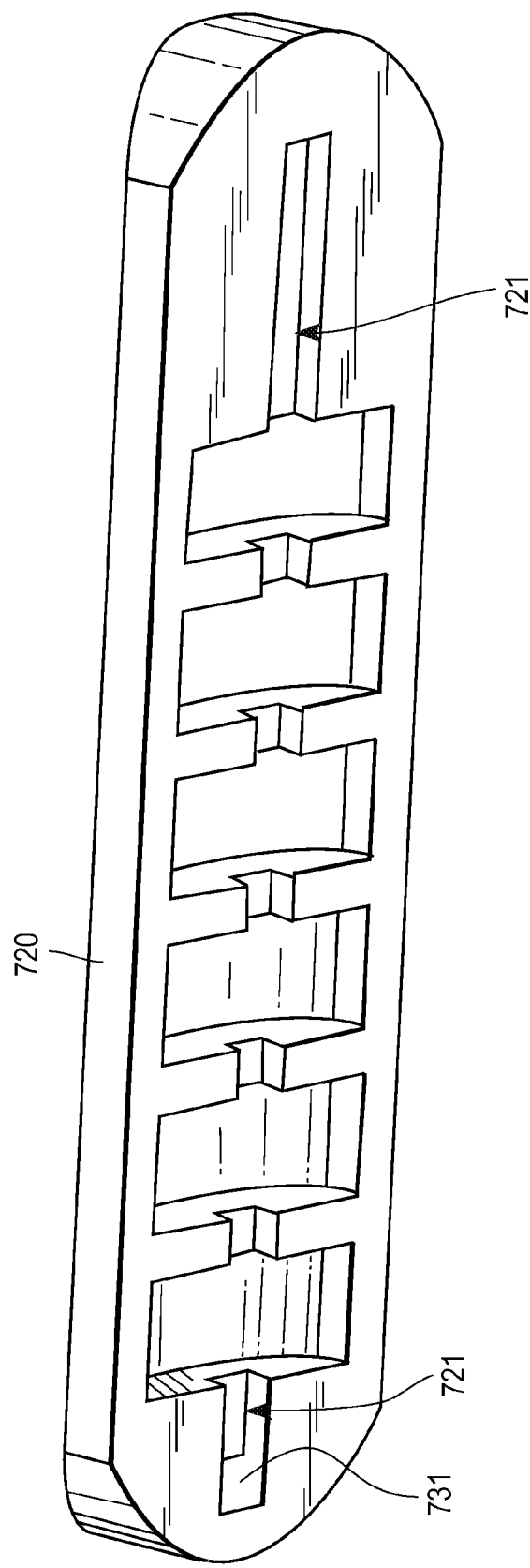

The emitter body 720 further defines an outlet bath 740 and the pressure reduction flow path 750 includes an outlet end at the outlet bath. In a preferred form, the unitary emitter body 720 will include at least one projection 741 in the outlet bath 740 to prevent the outlet bath from collapsing under increased fluid pressure. In the form illustrated a plurality of projections or nubs 741 extend up from the floor of the outlet 740 to prevent collapse of the bath 740. Additional rectangular notches or voids are illustrated in FIG. 8E which show how the emitter body 720 may be designed to use less elastomeric material, which not only will have a material cost savings, but also will reduce the amount of time it takes to manufacture the emitter 720 and may potentially improve the operation of the pressure compensating portion 760 of the emitter 720 due to the fact thinner portions of elastomeric material will be more responsive to pressure increases than larger portions of elastomeric material.

Figure 9A:
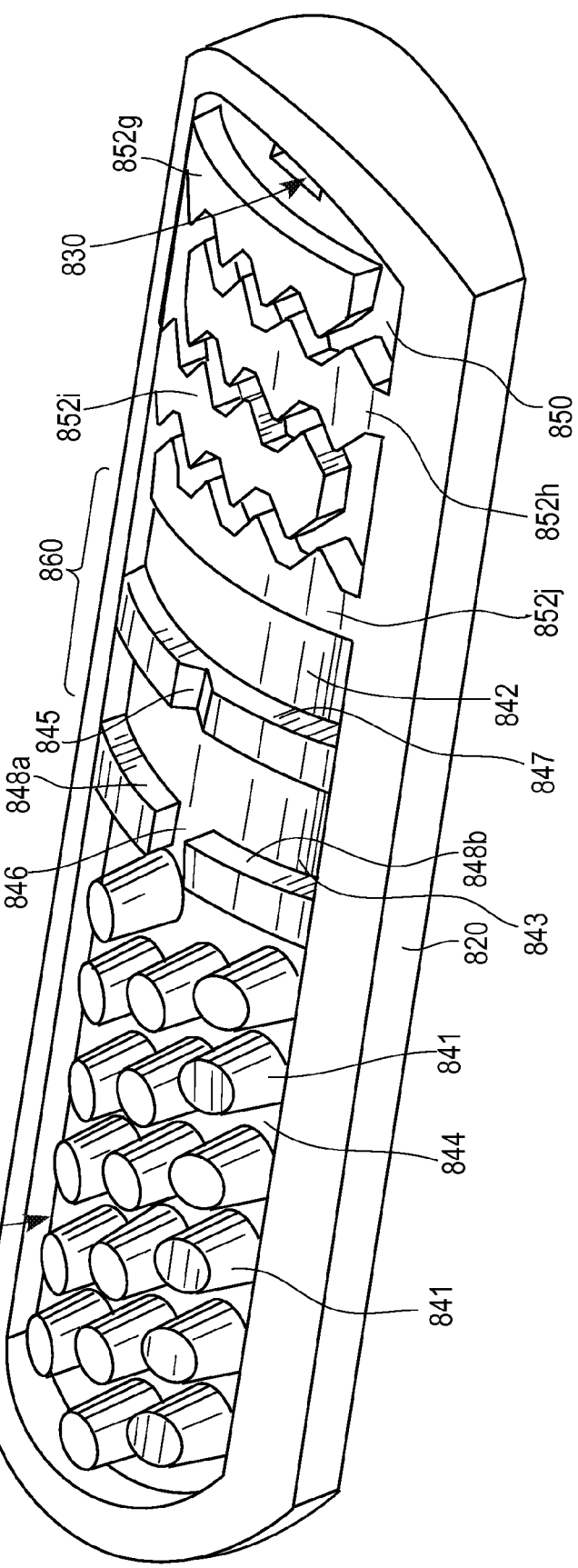
FIGS. 9A-B are top and bottom perspective views, respectively, of another emitter embodying features of the present invention wherein a unitary body defines a series of rows of baffles transverse to the longitudinal axis of the emitter and extending into the pressure reduction flow path, and a plurality of outlet baths with at least a portion of outlet passage being moveable between first and second positions, the second position defining a fluid passage that is more constrictive than the first position.
Figure 9B:
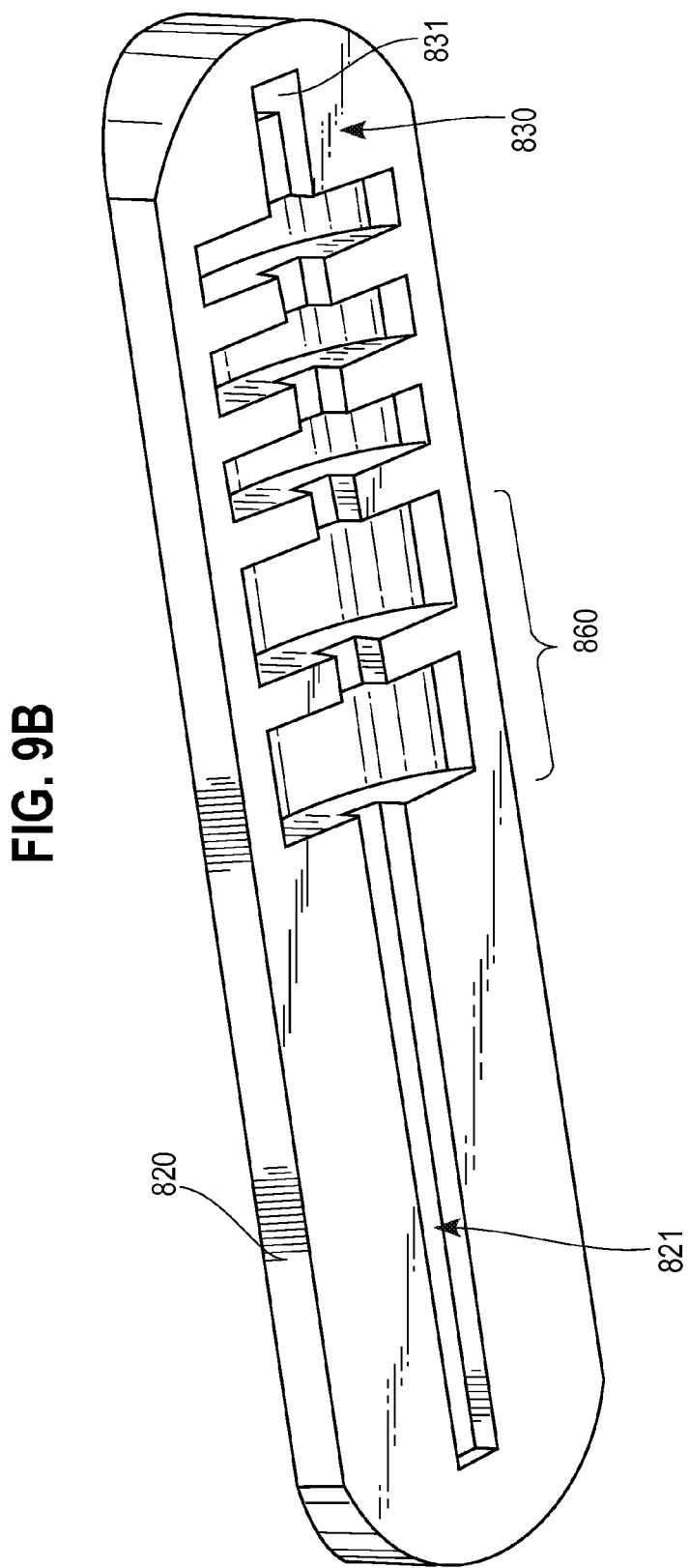
Figure 10C:
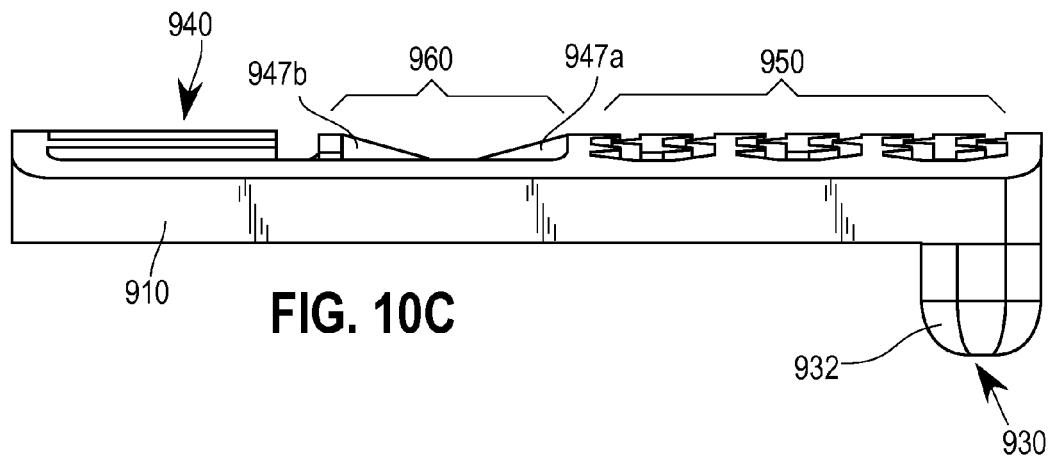
Figure 10D:
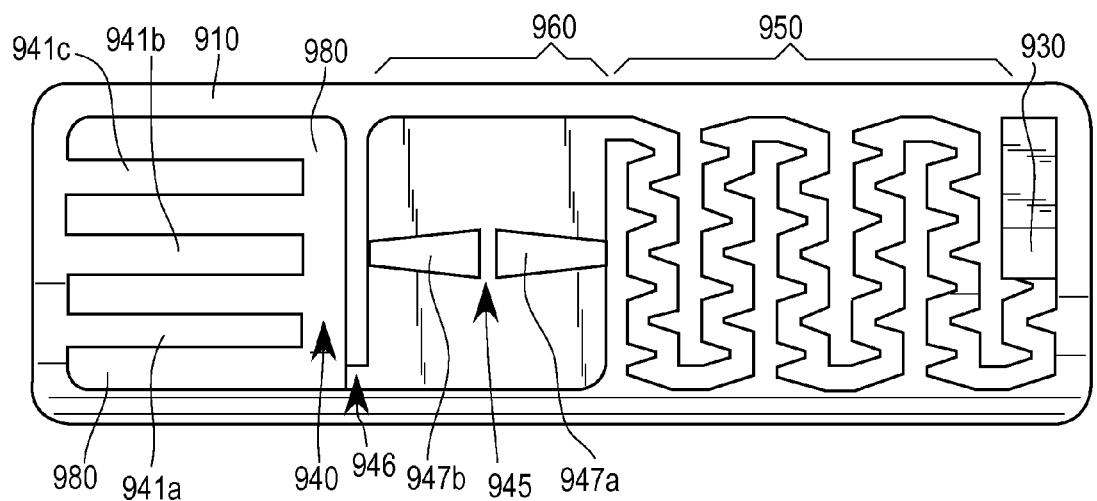
Figure 11A:
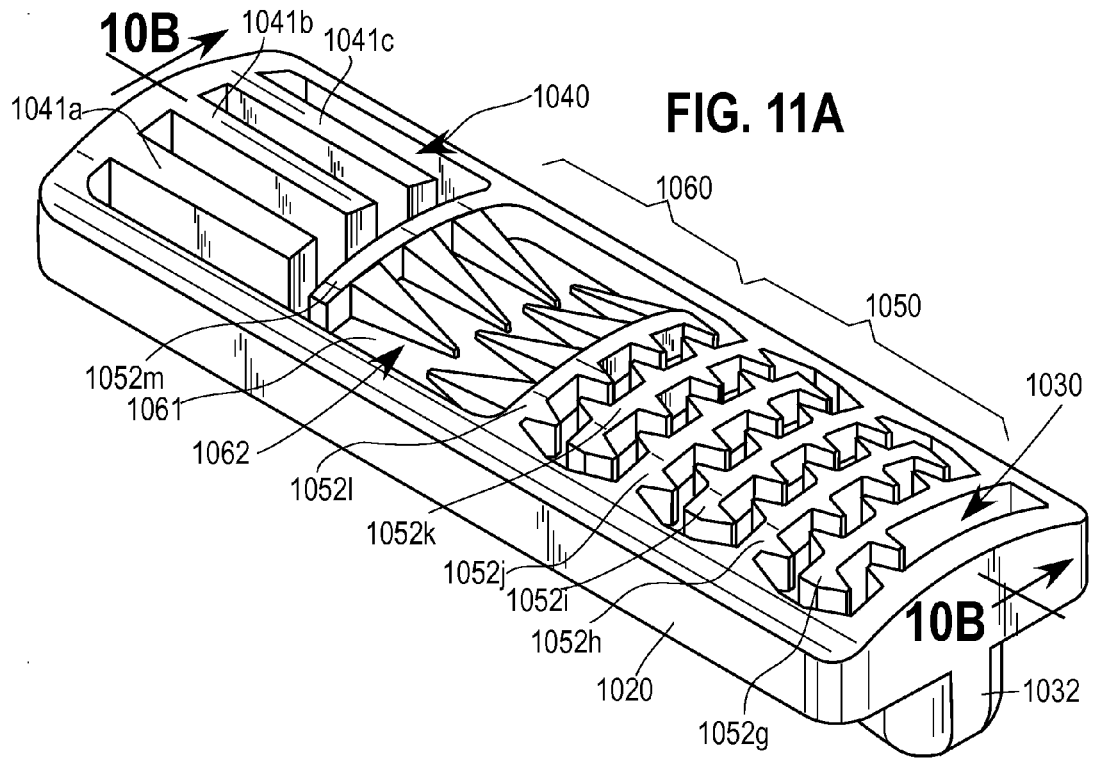
Figure 11B:
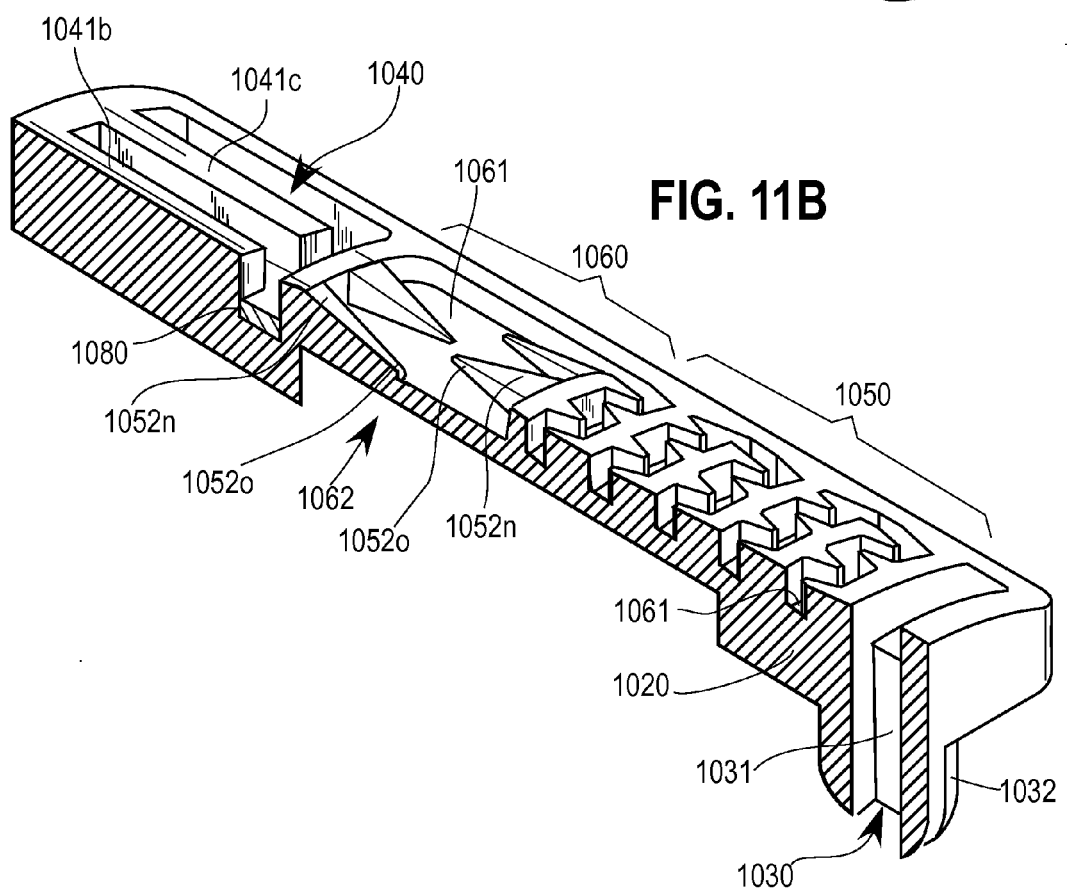

Turning now to FIGS. 9A-B, there is illustrated yet another emitter embodying features of the present invention wherein a unitary emitter body defines a series of rows of baffles transverse to the longitudinal axis of the emitter and extending into the pressure reduction flow path, and a plurality of outlet baths with at least a portion of outlet baths being moveable between first and second positions, the second position being more constrictive for fluid flow than the first position. In keeping with the above, portions of this embodiment that are similar to those discussed above will use the same last two-digit reference numerals as those discussed above, but using the prefix "8" simply to distinguish one embodiment from the others. Thus, in FIGS. 9A-B, the emitter body will be referred to as body 820.

In the form illustrated in FIGS. 9A-B, the unitary emitter body 820 is made of an elastomeric material and has a longitudinal axis. The body 820 further defines a pressure reduction flow path 850 and an inlet 830 to the pressure reduction flow path 850. The body 820 includes a series of rows of baffles 852g, 852h, 852i and 852j, which are positioned transverse to the longitudinal axis of the emitter 820 and extend into the pressure reduction flow passage 850 to form a tortuous passage that is further laid out in a serpentine manner. In addition, however, the emitter body 820 further defines a plurality of outlet baths. In the form illustrated, the body 820 defines a first outlet bath 842, a second outlet bath 843 and a third outlet bath 844. The pressure reduction flow passage 850 includes an outlet end that opens to the first outlet bath 842, and a first passage 845 extends between the first and second outlet baths 842, 843. In a preferred form, at least a portion of the first outlet bath or first passage have a first position and a second position, the second position being more constrictive to fluid flow than the first position.

More particularly, in the form shown, first passage 845 is defined by wall member 847 and moves between a first non-pressurized position wherein the passage remains in its normal state and the cross-section of the passage 845 is at its initial size, and a second pressurized position wherein the first passage is elevated or moved toward the inner conduit surface to which the emitter is mounted thereby decreasing the cross-section of the first passage 845 to form a more constrictive passageway and compensate for the fluid pressure increase experienced by the emitter 820. The first passage 845 is in the shape of a notch, however, it should be understood that various different size notches or grooves could be used as desired while still maintaining the pressure compensation capabilities discussed above. One advantage to smaller configurations, however, is that a small surface area is being used to accomplish the pressure compensation and, thus, the pressure compensation member can be controlled more easily and can be produced in a way that yields more consistent results emitter to emitter.

In alternate embodiments, it should be understood that the floor of the first outlet bath 842 may alternatively be made moveable rather than first passage 845. For example, the floor of first outlet bath 842 may be configured to move between a first non-pressurized position wherein the floor remains in its normal state and the cross-section of the bath opening formed by first bath 842 is at its initial size, and a second pressurized position wherein at least a portion of the floor is pushed or extended into the first bath 842 via increased fluid pressure within the conduit to which the emitter 820 is mounted thereby decreasing the cross-section of the bath opening formed by first bath 842 to compensate for this fluid pressure increase. In still other embodiments, both the first passage 845 and first outlet bath 842 may be moveable between such positions. However, as mentioned above, in a preferred form only the first passage 845 will be designed to move in such a way because the movement of such a small surface is easier to control and produce repeatable results from emitter to emitter.

Turning back to FIGS. 9A-B, the emitter 820 further defines a third outlet bath 844 and a second passage 846 extending between the second outlet bath 843 and the third outlet bath 844. The second passage 846 is defined by wall members 848a, 848b and differs in shape from that of first passage 845. In a preferred form, neither the second outlet bath 843 nor second passage 846 are setup to compensate for pressure and fluid flowing through the second outlet bath 843 is simply allowed to pass through to the third outlet bath 844. The conduit to which the emitter 820 is connected will define an outlet opening like drip line outlet opening 71 (mentioned with respect to FIG. 1 above) and this opening may be positioned above either the second or third outlet baths 843, 844. In alternate embodiments, it should be understood that if the desired flow rate may be accomplished through the first passage 845, the emitter 820 may be designed with only one additional outlet bath which may either result in combining the second and third outlet baths 843, 844 to provide only a second outlet bath, or result in the manufacturer being able to reduce the size of the emitter to terminate after the second outlet bath 843.

In yet other embodiments it should be understood that at least a portion of the second outlet bath 843 or second passage 846 may also be configured to move between a third position and a fourth position, the fourth position being more constrictive to fluid flow than the third position in order to further compensate for fluid pressure changes if desired. For example, in the form illustrated, the floor of the second bath 843 could be made moveable between a third non-pressurized position wherein the floor remains in its normal state and the cross-section of the bath opening formed by second bath 843 remains at an initial size, and a fourth pressurized position wherein at least a portion of the floor is pushed or extended into the second bath 843 via increased fluid pressure within the conduit to which the emitter 820 is mounted thereby decreasing the cross-section of the bath opening formed by second bath 844 to compensate for this fluid pressure increase. Alternatively, the second passage 846 between the second and third outlet baths 843, 844, respectively, could be configured to move so that the cross-section of the passage opening reduces in size when moved from a third position to a fourth position. In still other forms, both the second outlet bath 843 and second passage 846 could be configured to move in response to increases in fluid pressure to compensate for same.

In yet other embodiments and as mentioned with respect to the first passage 845 above, the second passage 846 may be provided in a variety of different shapes and sizes. It is preferred, however, to maintain a smaller size and shape for this passage (if setup to compensate for pressure) so that the passage's operation is easier to control and to reproduce on a repeatable results from emitter to emitter. Alternatively and as mentioned above, no second passage 846 may be provided as the first outlet bath 842 may be configured to outlet fluid directly into the second and final outlet bath.

Turning back to FIGS. 9A-B, the third outlet bath 844 is connected to the second outlet bath 843 via second passage 846 and further includes projections or nubs 841 for preventing the third outlet bath 844 from collapsing in response to fluid pressure increases. As with the embodiment of FIGS. 8A-G, the rows of baffles 825g-j of emitter 820 of FIGS. 9A-B are preferably formed with teeth extending from wall members with the teeth being staggered with respect to one another so that the teeth at least partially align with the gaps created between opposing baffle teeth members to form the tortuous pressure reducing flow passage 850 therebetween. Lastly, the emitter 820 preferably includes guide recess 821 for aligning and inserting the emitter 820 into conduit and for creating a recessed inlet 831 that is protected from larger obstructions traveling through the conduit in a manner similar to that discussed above in prior embodiments.

As mentioned above, in alternate embodiments other portions of the first, second and third outlet baths 842, 843 and 844 (including first and second passages 845 and 846) may be configured to move to compensate for fluid pressure changes. In addition, it should be understood that other features of earlier embodiments may be incorporated into the embodiment illustrated in FIGS. 9A-B and vice versa. More particularly, any of the above-mentioned features with respect to the various embodiments discussed herein may be combined or mixed and matched with one another to come-up with alternate embodiments intended to be covered herein.

An alternate embodiment of an emitter in accordance with aspects of the present invention is illustrated in FIGS. 10A-E. In keeping with the above practice, items in this embodiment that are similar to those previously discussed will be referred to using the same two-digit reference numeral but adding the prefix "9" to distinguish one embodiment from others. Thus, the emitter illustrated in FIGS. 10A-E will be referred to generally by reference numeral 910.

In the embodiment illustrated, emitter 910 has a single piece or unitary body construction and defines an inlet 930, inlet channel 931, pressure reducing flow channel 950, pressure compensating member or channel 960 and outlet 940. The pressure compensating member 960 and outlet 940 essentially form first and second baths 942, 943 divided by first and second wall members 947a, 947b with passage 945 passing therebetween, and a third or final bath 944 separated from the second bath 943 via passage 946. The emitter 910 includes an inlet protrusion or projection, such as elongated inlet sleeve 932, which extends the inlet opening 930 more towards the center or middle of the lumen of the tube 970 into which the emitter 910 is mounted (see FIG. 10E). This allows the inlet 930 to draw fluid from the center region rather than at a circumferential periphery of the inner lumen of the tube 970 to which the emitter is mounted. Since larger grit or other particulates or particles found in the fluid traveling through the drip line tube 970 tend to stay near the inner wall of the tube (near the circumferential periphery), having the sleeve 932 project the inlet 930 further into or toward the center of the inner lumen of the tube 970 helps reduce the potential that grit or other particulates will enter into and/or clog emitter 910 or prevent it from performing as desired (and particularly the larger pieces which are more likely to cause a problem with the operation of the emitter 910).

In the form illustrated, the inlet protrusion 932 forms a sleeve extending out from the emitter body 910 toward the center of the inner lumen of tube 970. The sleeve 932 has a rounded or beveled distal end and defines an inlet channel opening 931 that is generally rectangular in cross-section and connects in fluid communication the outermost inlet opening located at the distal end of the inlet sleeve 932 to the tortuous flow passage 950 and, in particular, the pressure reducing flow section of the flow channel. The inlet sleeve 932 extends from the longitudinal center of one end of emitter body 920; however, it should be understood that in alternate forms the inlet sleeve 932 may extend from another location on the emitter body 920, such as from a corner or side of the emitter body (as will be discussed further with respect to the embodiments of FIGS. 12A-15B). It also should be understood that although the inlet sleeve 932 is illustrated as a generally oval or rounded rectangular sleeve in FIGS. 10A-E, the inlet sleeve 932 may be provided in a variety of different shapes and sizes (including without limitation length and cross-section). One advantage to the rounded edges of the inlet sleeve 932, however, is that it reduces the number of flat surfaces located on the emitter 910 which are typically prone to collecting grit and other particulates (e.g., grit build-up).

In the form illustrated, the emitter body 920 has a height ranging between one hundred thousandths of an inch (0.100") and one hundred fifty thousandths of an inch (0.150") (see dimension C in FIG. 10E), a width ranging between two hundred fifty thousandths of an inch (0.250") and four hundred thousandths of an inch (0.400"), and a length ranging between eight hundredths of an inch (0.800") and one and five hundred thousandths of an inch (1.500"). The emitter body 920 will be inserted into conventional drip tubing sizes, which vary not only in outer diameter ("OD") sizes (e.g., ¼", ½", ¾", 1", 1.5", etc.), but also vary in inner diameter ("ID") sizes due to differences in tube wall thicknesses. Thus, in a preferred form, the height of the inlet sleeve 932 (see dimension B in FIG. 10E) will be such that the opening of inlet 930 is positioned between twenty and fifty percent (20-50%) of the ID of the tubing 970. The following chart provides some exemplary height ranges for the extended inlet sleeve 932 at some of the more conventional ID tube sizes:

| | | Height Range | |
|---|---|---|---|
| ID | | 20% of ID | 50% of ID |
| 0.512" (13 mm) | | 0.102" | 0.256" |
| 0.630" (16 mm) | | 0.125" | 0.315" |
| 0.709" (18 mm) | | 0.142" | 0.354" |
| 0.787" (20 mm) | | 0.157" | 0.394" |

Although the chart indicates a height ranging between one hundred and two thousandths of an inch (0.102") and three hundred ninety-four thousandths of an inch (0.394"), it should be understood that tubing of varying sizes can be used, and thus, the actual height of inlet sleeve 932 may be above or below this range. In a preferred form, inlet sleeve 932 will be configured to be one half to one times (½× to 1×) the height of the emitter body 920 (see dimension C in FIG. 10E). Thus, using the height range specified above, this would give a sleeve height (see dimension B in FIG. 10E) of between fifty thousandths of an inch (0.050") and two hundred and twenty five thousandths of an inch (0.225"). If it is desirable to keep the size of the emitter 910 down to a minimum, sticking closer to a sleeve 932 that is one half times (½×) the size of the height of the emitter body 920 will be preferred.

The emitter 910 illustrated in FIGS. 10A-E further includes a different flow passage configuration and, specifically, a different pattern or layout to the pressure reduction portion of the flow passage and a different layout or orientation to the pressure compensation portion of the flow passage. More particularly, in the form illustrated, the pressure reduction portion of the flow path is a much more condensed serpentine pattern due to the smaller size of emitter 910 (e.g., emitter 910 is approximately one third (⅓$^{rd}$) the size of the embodiments discussed previously), and the pressure compensation portion 960 includes a different orientation but yet still includes two opposing wall members 947a, 947b that tapper toward one another to form angled teeth or a notch that can be moved between low fluid pressure positions wherein maximum gaps are provided between upper surfaces of the wall members 947a, 947b and the surrounding inner surface of the tube 970 within which the emitter is mounted and high fluid pressure positions wherein the gaps between the upper surfaces of wall members 947a, 947b and the inner surface of tube 970 are at their minimum (possibly even having no gap). The movement of the wall members 947a, 947b is achieved via movement of the floor of the emitter proximate the wall members 947a, 947b. Thus, when fluid pressure increases within the inner lumen of tube 970, the floor of the emitter 910 and associated wall members 947a, 947b are moved toward the inner surface of the tube 970 thereby causing the cross sectional area of the flow passage through the emitter to be reduced at passage 945 to create a pressure drop from bath 942 to bath 943 to account for the increase in fluid pressure. This regulation causes the emitter 910 to drip fluid at a generally constant flow rate.

In the form illustrated in FIGS. 10A-E, a recess is formed in the backside (i.e., bottom or rear) of the emitter 910 below the pressure compensation portion 960 in order to thin the floor 961 to make it more responsive to increases in pressure for the fluid traveling through the inner lumen of tube 970. This recess gives the floor 961 a trampoline type effect or action and allows wall members 947a, 947b to be moved more easily between their low fluid pressure and high fluid pressure positions, similar to the moveable wall members discussed above with respect to prior embodiments. The recess extends beyond the moveable wall portion (i.e., the moveable notch or teeth portion or flipper teeth portion) of the flow path and into at least a part of the fixed tooth portion of the flow path. This configuration could be used in order to allow the floor 961 of that part of the fixed teeth portion to move in response to increases and decreases in fluid pressure in tube or line 970 to further help the emitter 910 compensate for such changes in the system. Thus, this portion of the fixed height section of the flow path may provide both pressure reduction and pressure compensation if desired. In alternate forms, however, the thinning of the floor of the fixed teeth portion will be designed not to move in such a manner despite the presence of such a recess in which case the fixed portion will only pressure reduction. It should be understood that in alternate embodiments of the invention recesses of different sizes and shapes may be used to create trampoline areas of different size and shape to achieve the desired pressure compensation effect (including without limitation those discussed in the embodiments that follow).

In a preferred form, the emitter 910 is made of any material capable of allowing for the upper surfaces of wall members 947a, 947b to be moved up toward the inner surface of tube 970 in order to reduce the cross-section of the flow channel and compensate for increased fluid pressure within tube 970. For example, the emitter 910 may be made of TPO having a Durometer reading ranging between 25 and 100 (preferably being between 50 and 75) and allowing the pressure compensation portion 960 to move between five thousandths of an inch (0.005") and thirty thousandths of an inch (0.030") and preferably between eight thousandths of an inch (0.008") and twenty-two thousandths of an inch (0.022").

As mentioned above, the emitter illustrated in FIGS. 10A-E is approximately one third ($1/3^{rd}$) the size of the emitters illustrated in FIGS. 1A-9B. This size still allows the emitter to operate within desired pressure compensation parameters, but saves a significant amount in material costs. It alternate forms, the emitter of FIGS. 10A-E may be configured so that it is slightly larger and approximately half ($1/2$) the size of the emitters illustrated in FIGS. 1A-9B. For example, this may be done in order to increase the size of the trampoline area or pressure compensation area 960 of the emitter 910 in order to improve the pressure compensation performance of the emitter.

In the form illustrated in FIGS. 10A-E, the trampoline area or pressure compensation area of the emitter makes-up one third ($1/3^{rd}$) to one half ($1/2$) of the overall emitter. In alternate forms, the pressure compensation portion of the emitter may make-up more or less of the overall emitter. For example, in a preferred form, the outlet bath would make-up one third ($1/3^{rd}$) of the emitter and the pressure compensation portion would make-up the remaining two-thirds ($2/3$rds) of the emitter (meaning there is no pressure reducing portion for grit to get stuck in or clog). Alternatively, a pressure reduction portion could be added and, if desired, the recess could be extended under the entire pressure reduction portion or fixed teeth portion of the flow passage so that the entire flow path or passage provides pressure compensation. If an emitter with only a pressure compensation portion and outlet bath cannot be used (i.e., one without a pressure reduction portion), in a preferred form, the pressure reduction portion will be one to one and a half times (1× to 1.5×) the size or area of the pressure compensation portion in order to provide a desired pressure drop to the fluid passing through the emitter 910. In other forms, the pressure reduction portion 950 may be incorporated into the inlet sleeve 932 and the remaining portion of the flow passage extending between the inlet sleeve 932 and the outlet bath 940 may be configured to be pressure compensating only.

In the specific embodiment illustrated in FIGS. 10A-E, the pressure compensation portion of the flow passage has a width ranging between two hundred fifty thousandths of an inch (0.250") and three hundred seventy-five thousandths of an inch (0.375") and a length ranging between one hundred twenty-five thousandths of an inch (0.125") and three hundred seventy-five thousandths of an inch (0.375"). The height (or depth) of the pressure compensation flow path ranges between twenty thousandths of an inch (0.020") and thirty thousandths of an inch (0.030"), with the overall height of the emitter again ranging between one hundred thousandths of an inch (0.100") and one hundred fifty thousandths of an inch (0.150").

The emitter 910 also includes a root growth inhibiting member, such as copper insert 980, which is positioned proximate to the outlet bath 940 to reduce the risk of roots growing into the outlet 940 of the emitter 910. In the form illustrated, the copper insert 980 corresponds in shape to the shape of outlet bath 940 and is, preferably, connected to the floor of the outlet bath 940 so that it cannot shift and block flow of fluid through the emitter 910 and out of the outlet 940. In one form, the copper insert 980 is formed as a plate that is fixed to the bottom of outlet bath 940 via an adhesive. It should be understood, however, that in alternate embodiments, the copper insert 980 may take a variety of different shapes and sizes and may be connected or affixed to the emitter in a variety of different ways. For example, with respect to size and shape, in alternate forms, the copper insert 980 may be shaped to fit in only a portion of the outlet bath 940 (e.g., filling only a single finger of the outlet bath 940 rather than all four fingers illustrated) or in passage 946. In a preferred form, the outlet 940 of the emitter 910 will take up no more than one third ($1/3^{rd}$) of the emitter's total size, thus, the copper insert 980 will preferably have a size that is less than one third ($1/3^{rd}$) the overall emitter size.

With respect to securing the copper insert 980 to emitter 910, in alternate forms the insert 980 may be secured to the emitter 910 via alternate forms of fastening (heat stake, rivet, screw, pin, mating or interlocking structures (e.g., tongue and groove configuration, ball and/or detent, mortise and tenon, etc.), friction or press fitting, etc.). For example, the side wall of the outlet bath 940 may be designed with a lip or projection that the copper insert gets pushed past during installation in order to secure the copper insert 980 in position or prevent the insert 980 from interfering with the flow of fluid through the emitter 910 while generally maintaining the insert 980 in a desired location or position. In such a form, the lip may be located in a single spot on a side wall of the outlet bath 940. Alternatively, the lip may comprise multiple lips extending out from one or more side walls of the outlet bath 940. In still other forms, the lip may comprise a continuous lip extending around the entire outlet bath 940 or all side walls of the outlet bath 940.

In the form illustrated in FIGS. 10A-E, the emitter 910 may be provided in a plurality of different flow rates (e.g., 1 GPH, 2 GPH, 4 GPH, etc.). The emitter 910 may be altered in a variety of different ways to control flow rate of the emitter. For example and without limitation, the gap between moveable wall members may be adjusted to achieve different flow rates, the cross-sectional area of the flow passage of the emitter may be altered, and the number of fixed or moveable teeth can be adjusted to achieve different flow rates. In one form, the gap between the moveable wall members 947a, 947b (illustrated as passage 945) may be widened or narrowed in order to change the cross-sectional area of the flow passage to provide emitters of differing flow rates. For example, the gap between wall members 947a, 947b can be widened to allow more fluid to flow through the emitter to provide an emitter with a higher GPH flow rate. Conversely, the gap between wall members 947a, 947b can be narrowed in order to let less fluid flow through the emitter to provide an emitter with a lower GPH flow rate.

In another form, the cross-sectional area of other portions of the flow passage may be changed to provide emitters with different flow rates. For example, the floor or depth of the flow passage (either in the pressure reduction portion or the pressure compensation portion, or both) may be lowered to create a passage with a larger cross-sectional area that allows more fluid to flow through the emitter, thereby providing an emitter with a higher flow rate. Conversely, the floor of the flow passage may be raised to reduce the cross-sectional area of the flow passage so that less fluid can flow through the emitter, thereby reducing the flow rate of the emitter.

In still other forms, the number of teeth can be adjusted for the flow passage to provide emitters with different flow rates. For example, in one form, the number of fixed teeth (i.e., fixed-height teeth or non-moving teeth) may be increased to achieve a more tortuous path for additional pressure reduction and, thus, lower flow rate. Conversely, the number of fixed teeth can be reduced to achieve a less tortuous path for less pressure reduction and, thus, a higher flow rate. Alternatively, the number of moveable teeth (e.g., wall members 947a, 947b) may be increased or decreased to achieve more or less constrictions to produce greater or less pressure compensation, respectively, for achieving different flow rates.

In still other forms, the height of the moveable teeth may be adjusted to provide emitters with different flow rates. For example, moveable teeth having greater height may be used to reduce the amount of pressure required in order to saturate the pressure compensation section of the flow passage. Conversely, moveable teeth having less height may be used to increase the amount of fluid pressure the emitter can account for before reaching its saturation point.

In FIGS. 11A-E, an alternate form of emitter is illustrated having moveable teeth that can be adjusted to provide emitters with different flow rates as discussed above. In keeping with the above practices, items associate with this emitter that are similar to those discussed above will use the same two digit reference numeral but having the prefix "10" added to distinguish one embodiment from the others. Thus, in FIGS. 11A-E, the emitter is referenced as emitter 1010 and includes a single piece or unitary emitter body 1020 defining an inlet 1030 and outlet 1040. Like the embodiment of FIGS. 10A-E, the emitter 1010 of FIGS. 11A-E includes an elongated inlet protrusion, such as sleeve 1032, which is centrally located on one end of the emitter body 1020 and allows the emitter 1010 to draw fluid from the tube within which it is installed from a region closer to the center of the inner lumen of the tube and away from where larger pieces of grit or particles collect along the inner wall of the tube. The inlet sleeve 1032 preferably includes rounded edges to reduce the number of flat surfaces located on the emitter where grit build-up can occur. The emitter 1010 also includes outlet walls 1041a, 1041b, 1041c, which support the outlet bath 1040 and prevent the floor of the outlet bath 1040 from collapsing toward the adjacent inner surface of the tube as fluid pressure increases within the supply line or tube. A root growth inhibiting member, such as copper insert 1080 is also present in the outlet bath 1040 to hinder roots from obstructing the operation of the emitter 1010.

Unlike the embodiment of FIGS. 10A-E, however, the embodiment of FIGS. 11A-E includes a plurality of moving teeth 1062 staggered apart from and opposing one another in the pressure compensation section 1060 of the emitter 1010. The emitter 1010 has a notch or recess formed on the backside forming the trampoline area of the emitter so that the floor 1061 of the flow path can move the moveable teeth 1062 between their low pressure position wherein the upper surfaces of the moveable teeth are spaced apart from the inner surface of the tube or drip line within which the emitter is installed and their high pressure position where the floor 1061 pushes the teeth up toward the inner surface of the tube until the upper surfaces of the moveable teeth 1062 engage the inner surface of the tube. The movement of the moveable teeth or flippers 1062 into their high pressure position reduces the cross-sectional area of the flow passage so that less fluid can travel through the emitter 1010 as a means for compensating for increased line pressure within the tube and to keep the flow rate of fluid through the emitter 1010 relatively constant.

The dimensions specified for the emitter of FIGS. 10A-E apply equally well for the emitter of FIGS. 11A-E, and it should be understood that the alternate embodiments discussed with respect to FIGS. 10A-E equally apply for the embodiment of FIGS. 11A-E, as well. For example, in alternate forms the height of inlet sleeve 1032 may be adjusted as needed to get the emitter to draw fluid more from the center region of the tube. In addition, the emitter could be configured with a pressure reduction flow passage only rather than both a pressure reduction portion and a pressure compensation portion. In still other forms, the pressure reduction portion could be incorporated into the inlet sleeve 1032 with the remainder of the flow passage between the sleeve 1032 and the outlet bath 1040 being pressure compensating.

Similarly, it should be understood that the alternate ways for providing emitters of varying flow rate equally apply to the embodiment of FIGS. 11A-E. For example, the depth of the flow passage or a portion of the flow passage could be adjusted to provide emitters of varying flow rates (e.g., 1 GPH, 2 GPH, 4 GPH, etc.). Alternatively, the height or number of the teeth members (either the fixed or the moveable) can be adjusted to provide emitters of varying flow rates. In still other forms, the gap or spacing between the teeth members may be adjusted to provide emitters of varying flow rates.

Figure 12A:
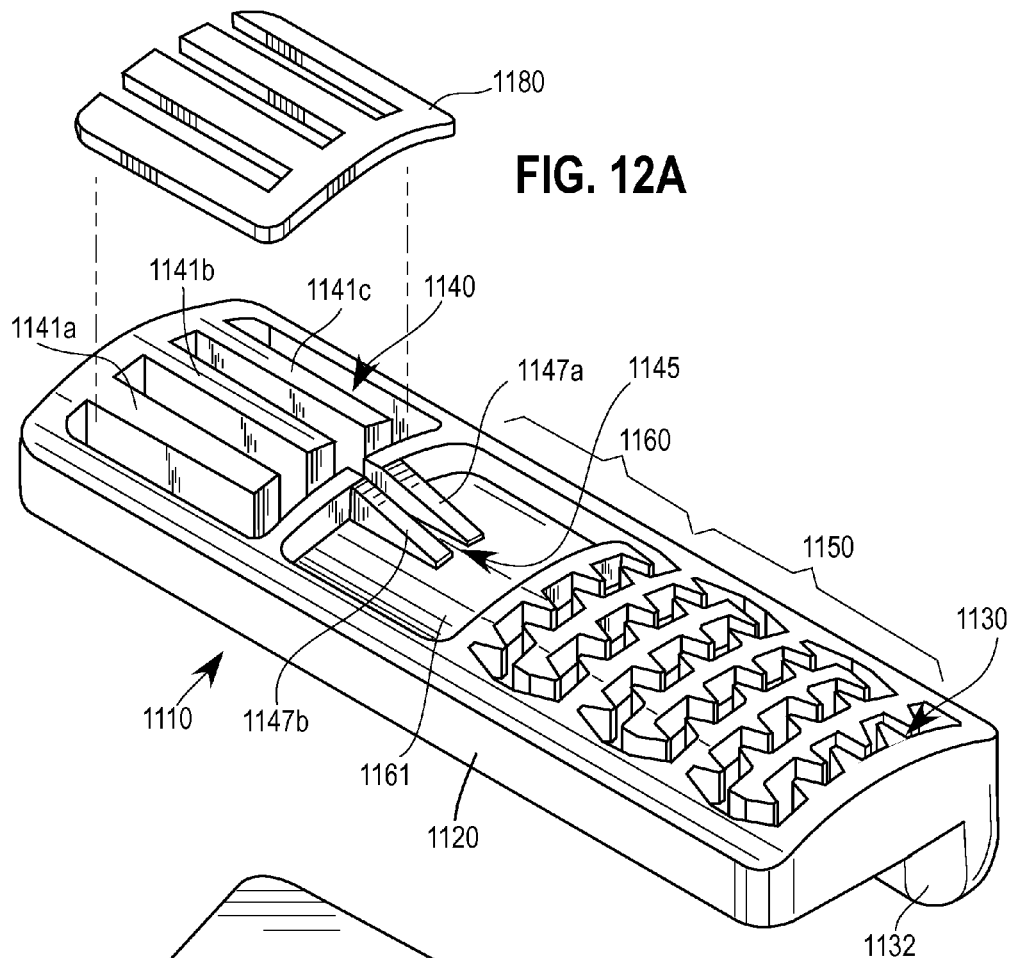
FIGS. 12A-B are top and bottom perspective views, respectively, of an alternate emitter embodying features of the present invention wherein a unitary elastomeric body defines an inlet, pressure reduction and compensation section and outlet bath having an alternate pressure compensation design.
Figure 12B:
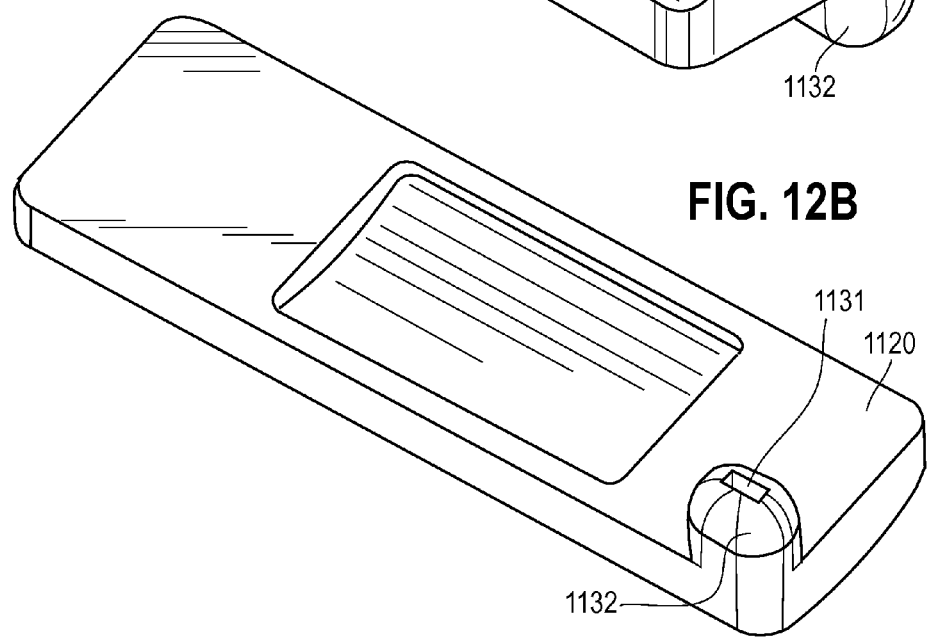

Another emitter embodiment in accordance with the invention is disclosed in FIGS. 12A-B. In keeping with the above practice, items with respect to this emitter that are similar to those discussed in the embodiments above will use the same two-digit reference numeral but add the prefix "11" to distinguish one embodiment from another. Thus, in FIGS. 12A-B, the emitter is referenced by reference numeral 1110 and comprises a unitary body 1120 that defines an inlet opening 1130, flow passage and outlet bath 1140. Like the embodiments of FIGS. 10A-11E, the emitter 1110 of FIGS. 12A-B includes an elongated inlet 1032, outlet bath walls 1141a, 1141b and 1141c, and a root growth inhibiting member, such as copper insert 1180 (shown exploded from the emitter body for purposes of illustrating its presence). Unlike the embodiments of FIGS. 10A-11E, however, the emitter 1110 of FIGS. 12A-B has an elongated inlet sleeve 1032 that is positioned at a corner of the emitter body 1120 rather than centrally located on the end of the emitter. This configuration allows the length of the pressure reduction portion 1250 of the tortuous flow passage to be maximized as it starts from the corner of the emitter body 1220, rather than in the middle of the body 1220, as is done in the emitter of FIGS. 10A-11E.

Emitter 1110 of FIGS. 12A-B further includes a different configuration or layout to the pressure compensation portion 160 of the emitter 1110. Specifically, the emitter uses first and second moveable wall members 1147a, 1147b, respectively, to compensate for increase in fluid line pressure. When in the low pressure position (illustrated), the walls 1147a, 1147b and floor 1161 remain in their static state and allow fluid to flow over the top surfaces of walls 1147a, 1147b. However, when fluid line pressure builds, the floor or trampoline area 1161 of pressure compensating portion 1160 moves upward toward the inner surface of the tube to which the emitter is mounted until the upper surfaces of walls 1147a, 1147b seal against the inner surface of the tube (or approach this point), which reduces the cross-sectional area of the passage 1145 through which the fluid passes and thereby compensates for the increase in fluid line pressure.

As previously mentioned, the alternative embodiments covered above apply equally to the embodiment of FIGS. 12A-B. For example, although the copper insert 1180 is adhered to the floor of the emitter outlet bath 1140, it should be understood that in alternative embodiments the insert 1180 could be connected to the emitter in a variety of different ways (e.g., heat stake, rivet, screw, pin, mating or interlocking structures (e.g., tongue and groove configuration, ball and/or detent, mortise and tenon, etc.), friction or press fitting, etc.). Similarly, the dimensions of the emitter 1110 or any of its parts could be altered as discussed above in order to cater to a particular application.

Yet another form of emitter in accordance with the invention is illustrated in FIGS. 13A-B. In keeping with the above, items that are similar to those discussed above will be numbered using the same later two digit reference numeral but adding a prefix "12" to distinguish one embodiment from the others. In the form illustrated, the emitter 1210 includes a single piece body 1220 defining an inlet opening 1232, flow path and outlet 1240. The emitter further includes an inlet protrusion, such as sleeve 1232, which extends from a corner of the emitter body to maximize the length of the tortuous flow passage 1250. A pressure compensation configuration 1260 similar to that described with respect to FIGS. 12A-B is also disclosed in which moveable walls 1247*a*, 1248*b* are allowed to move from a low pressure position to a high pressure position in response to increased line pressure to help compensate for the increase in pressure.

Unlike the prior embodiments of FIGS. 10A-12B, however, emitter 1210 of FIGS. 13A-B includes a filter in the distal end of the inlet sleeve 1232 to block relatively large particles (e.g., grit, particulates, etc.). Specifically, the distal end of sleeve 1232 includes a plurality of slots, such as filter channels 1232*a*, 1232*b*, 1232*c*, 1232*d*, 1232*e* and 1232*f* that are used to help block larger particles of debris or grit from entering into the inlet channel 1231 of emitter 1210. The network of channels 1232*a-f* further reduces the likelihood that a piece of debris or build-up of debris could block all fluid from flowing through the emitter 1210. Rather, such large objects would likely be blocked by the outermost surfaces of the inlet sleeve 1232, while fluid is allowed to work its way through the channels 1232*a-f* and continue to flow through emitter 1210.

The emitter 1210 of FIGS. 13A-B further includes projections or nubs, such as posts 1241, in the outlet bath 1240 instead of walls (like those shown in FIGS. 10A-12B). The posts 1241 prevent the floor of the outlet bath 1240 from collapsing in toward the inner surface of the tube in which the emitter is mounted when line pressure increases in the tube so that the emitter continues to allow fluid to flow through the emitter as desired. In view of this configuration, the shape of the root growth inhibiting member (e.g., copper insert 1280) is also changed to mate with the posts 1241. Specifically, the insert 1280 defines a plurality of mating openings that correspond to the location of posts 1241 so that the insert 1280 can be positioned within the outlet bath 1240 of the emitter 1210. In a preferred form, the posts 1241 and openings in insert 1280 are configured to allow the insert 1280 to rest flush against the floor of the outlet bath 1240 so that the insert 1280 can be adhered to the floor of the outlet bath 1240. This may require the insert 1280 to have a slight bend that tracks the curvature of the floor of the outlet bath 1240 (if any). However, in alternate embodiments, the posts 1241 and openings in insert 1280 could be configured to engage one another in a friction fit so that no adhesive is necessary. This configuration also could allow the plate to be held at a different position with respect to the posts 1241 instead of adjacent to the floor of outlet bath 1240 (although such a position is possible with this configuration as well). For example, it may be deemed desirable to position the plate 1280 closer to the outlet opening in the tubing to which the emitter body 1220 is mounted. In such a case, the size of the openings in the insert 1280 could be made so that the insert 1280 rests near the top of the posts 1240.

As mentioned above, the various alternative embodiments discussed with each embodiment are equally applicable to other embodiments, including without limitation the embodiment of FIGS. 13A-B. For example, in alternate forms, the insert 1280 does not have to fill the entire outlet bath 1240, but rather, could be a narrower plate that covers a smaller portion of the outlet bath 1240. In one form, the insert 1280 may take the form of a narrow plate that only has openings for one post 1241 or one row of posts. In another form, the insert 1280 may be configured with a different shape if desired (e.g., a triangular shape, various polygonal shapes, round or curved shapes, symmetrical shapes, asymmetrical shapes, non-planar shapes, etc.). For example, in one form the insert 1280 may be configured to have a non-planar shape wherein the insert 1280 has a chimney portion that extends up from a planar portion to create a bulge in the tube once the emitter is mounted into the tubing which can then be used to locate and cut open the outlet in the tube to complete manufacturing process and provide a finished emitter and/or drip line. With this configuration the chimney of the copper insert 1280 would extend up into the tube outlet opening like a sleeve to further deter roots from growing toward or near this portion of the emitter and/or tubing. In still other forms, the insert 1280 may start out as one shape but be altered during the manufacturing process. For example, the insert 1280 may start out as a planar plate, but when the outlet opening is punched through the tube wall proximate the outlet bath 1240, the plate also may be punched down into the floor of the outlet bath 1240 leaving a dent in the insert 1280. This may help friction fit the insert 1280 to the emitter 1210 and/or may punch a portion of the insert 1280 partially into the floor of the emitter bath 1240 (but not through) in order to fasten the insert 1280 to the emitter 1210.

Another difference between the embodiment of FIGS. 13A-B and the prior embodiments of FIGS. 10A-12B is that the recess on the backside of the emitter that defines the trampoline area of the pressure compensation portion 1260 is smaller in size and shape and restricted to the pressure compensation portion 1260, rather than extending further under the tortuous passage of the pressure reduction portion 1250. This smaller trampoline area of pressure compensation portion 1260 is designed to make the emitter 1210 less responsive to supply line pressure increases. Specifically, the smaller area of the recess or trampoline area of the pressure compensation portion 1260 reduces the amount of movement floor 1261 will have and/or requires greater pressure to move wall members 1247*a*, 1247*b* to seal against the inner surface of the tube.

Figure 14A:
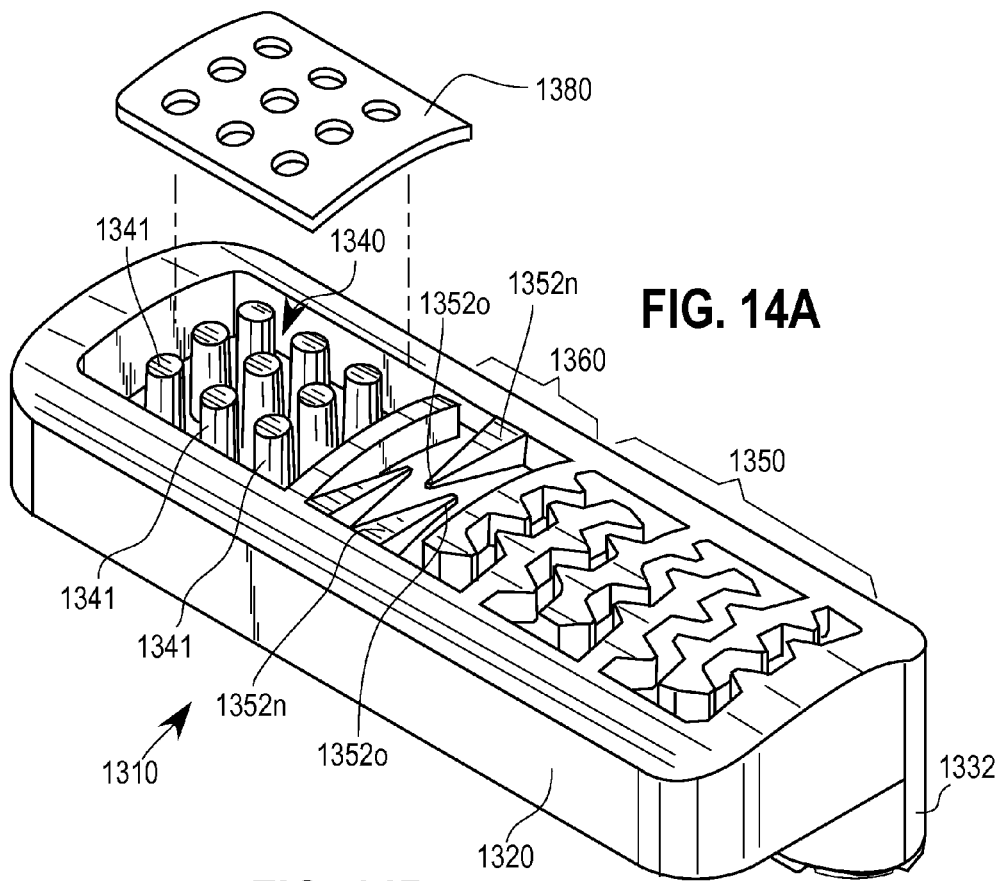
FIGS. 14A-B are top and bottom perspective views, respectively, of an emitter embodying features of the present invention wherein a unitary elastomeric body is illustrated with an inlet and another flow path and outlet.
Figure 14B:
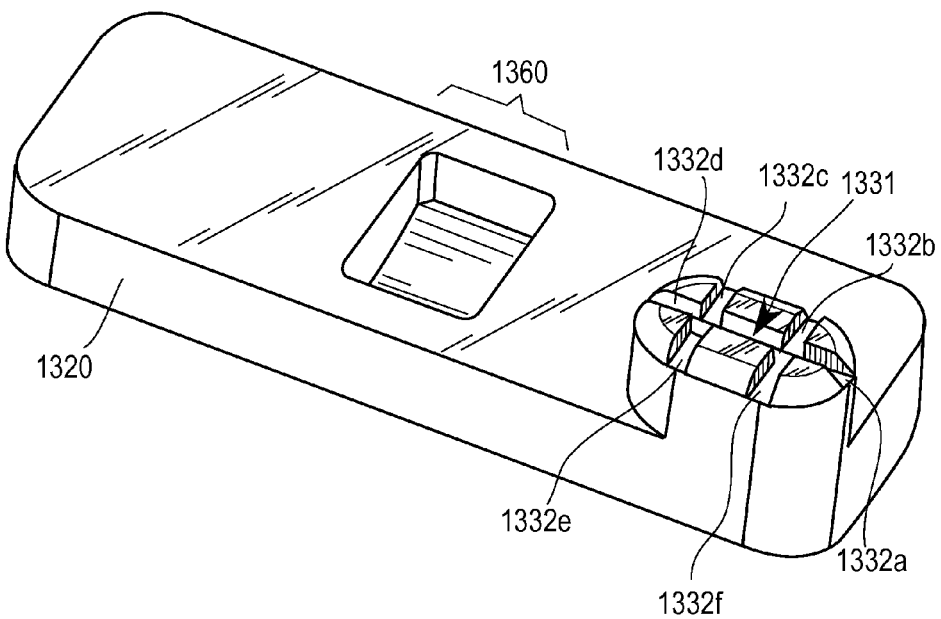

Another exemplary emitter is illustrated in FIGS. 14A-B. In keeping with the above, items that are similar to those discussed above with respect to prior embodiments will be marked designated with the same latter two-digit reference numeral but include the prefix "13" to distinguish one embodiment from another. Thus, in FIGS. 14A-B, the emitter is designated as emitter 1310 and includes a body 1320 that defines and inlet 1330, an outlet 1340 and a tortuous passage connecting the inlet 1330 and outlet 1340. Like the embodiment of FIGS. 13A-B, emitter 1310 of FIGS. 14A-B has an off-center inlet 1330 that extends down from the corner of the emitter body 1320 thereby allowing the length of the pressure reduction flow passage 1350 to be maximized. The emitter 1310 also includes an inlet projection, such as sleeve 1332, with an integral filter in the form of filter channels 1332*a*, 1332*b*, 1332*c*, 1332*d*, 13332*e* and 1332*f*, which allows the emitter to draw fluid from closer to the center or center region of the inner lumen of the tube in which the emitter is mounted and filter out relatively larger grit particles from entering the emitter 1310. The emitter further includes a smaller pressure compensation portion 1360 and a root growth inhibitor member in the form of copper insert 1380 which is positioned on outlet projections or nubs 1341.

Unlike the embodiment of FIGS. 13A-B, however, the emitter 1310 of FIGS. 14A-B includes a plurality of moveable teeth or flippers 1352 that move between a low fluid pressure position wherein the upper surfaces of the flippers are spaced apart from the inner surface of the tube in which the emitter 1310 is mounted and a high fluid pressure position wherein the upper surfaces of the flippers are moved toward the inner surface of the tube to reduce the cross-sectional area of the flow passage 1360 in response to increased fluid pressure in order to make the emitter 1310 pressure compensating. In the form illustrated, the flippers are generally triangular in shape and taper from a taller end 1352n to a shorter distal end 1352o. As best illustrated in FIG. 14B, the smaller size of the trampoline area 1360 for the emitter 1310 means that a greater amount of fluid pressure will be required in order to move the flippers between their low and high fluid pressure positions. In an alternate form, the trampoline area 1360 may be expanded like that shown in FIGS. 10A-12B, in order to make the pressure compensating trampoline area easier to move and, thus, more responsive to increases and decreases in fluid pressure. More particularly, the size of the trampoline area on one side of the emitter (e.g., see trampoline 1360 on FIG. 14B) may be made larger than the pressure compensating portion on the other side of the emitter (e.g., see moveable teeth of flippers 1360 on FIG. 14A) in order to make the emitter more responsive to fluid pressure increases or decreases. This increase in trampoline area 1360 may further be designed to convert a portion of the pressure reduction flow channel 1350 into part of the pressure compensating member 1360 (e.g., by allowing the floor of the pressure reduction flow channel to move in response to fluid pressure increases and decreases), but does not have to if it is desired to keep the pressure reduction flow channel 1350 separate and apart from the pressure compensation portion 1360.

As mentioned above, it should be understood that features of any of the above-mentioned embodiments may be incorporated into the emitter 1310 of FIGS. 14A-B if desired. For example, outlet bath walls could be used in lieu of or in addition to post members 1341. Similarly, alternate flow channel patterns and orientations may be used. The size of the emitter 1310 also may be adjusted within the range specified above.

Another emitter embodiment is illustrated in FIGS. 15A-B. In keeping with the above practice, features of this embodiment that are similar to those discussed above will use the same latter two-digit reference numeral but include the prefix "14" in order to distinguish one embodiment from the others. Thus, the emitter will be referenced using reference numeral 1410 for convenience.

In the form illustrated, emitter 1410 has a larger shape more akin to the embodiments of FIGS. 1A-9B. Unlike those prior embodiments, however, emitter 1410 includes a smaller inlet channel or raceway 1431 that is positioned in one end or half of the emitter rather than circumnavigating the entire periphery of the emitter. In addition, the emitter 1410 includes a root growth inhibitor member, such as copper insert 1480, and defines a smaller pressure compensation or trampoline area 1460. In the form illustrated, the copper insert 1480 forms a plate with openings corresponding to the post members 1441 of outlet bath 1440 so that the plate 1480 can be disposed in the outlet bath 1440 proximate the emitter outlet opening of the tube in which the emitter 1410 is mounted or affixed.

The pressure compensating portion 1460 of emitter 1410 includes a plurality of moveable teeth or flippers that are orientated such that they continue the serpentine pattern of the pressure reduction flow passage 1450. The teeth move between a low fluid pressure position (shown) wherein the upper surfaces of the teeth are spaced apart from the inner surface of the tube within which the emitter 1410 is mounted and a high fluid pressure position wherein the upper surfaces of the teeth are moved toward, if not into engagement with, the inner surface of the tube within which the emitter is mounted in order to reduce the cross-sectional area of the flow passage to compensate for increases in fluid pressure.

Figure 16A:
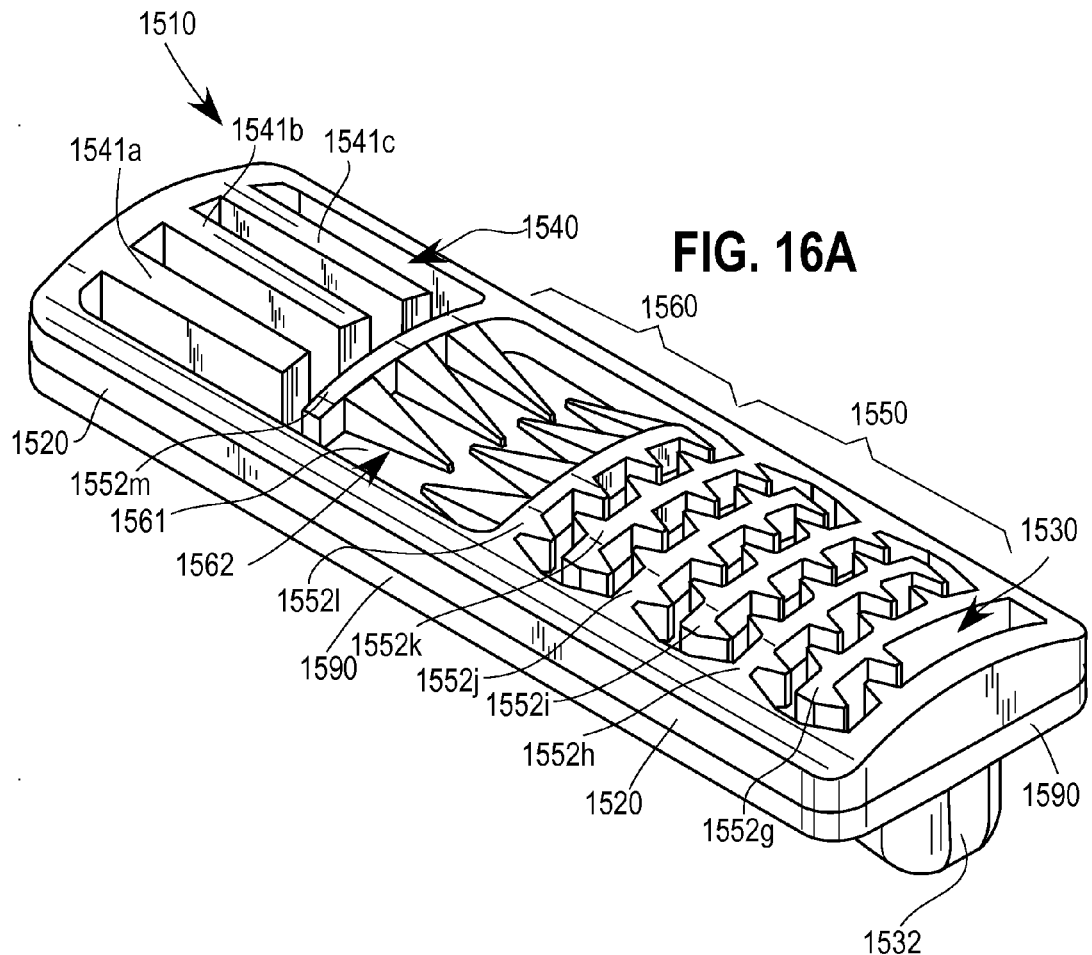
FIGS. 16A-B are perspective and cross-sectional views, respectively, of an emitter embodying features of the present invention wherein a unitary elastomeric body is illustrated equipped with a carrier for assisting in the installation of the emitter into tubing, with the cross-section of FIG. 16B being taken along line 16B-16B in FIG. 16A.
Figure 16B:
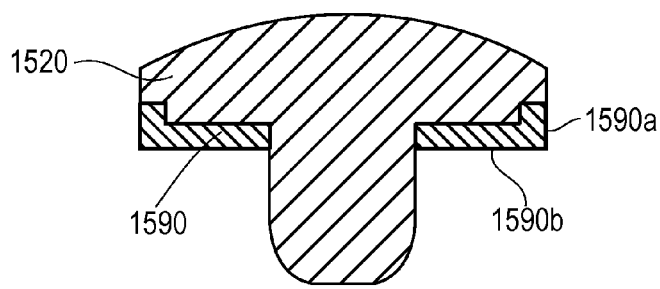

Another exemplary embodiment in accordance with the invention disclosed herein is illustrated in FIGS. 16A-B. In keeping with above practice, items of this embodiment that are similar to those discussed above will use the same latter two-digit reference numeral but include the prefix "15" to distinguish one embodiment from others. Thus, the emitter of FIGS. 16A-B will be referred to generally as emitter 1510. In the form illustrated, the emitter 1510 includes a unitary emitter body 1520 defining an inlet 1530, outlet 1540 and tortuous flow passage connecting the inlet 1530 and outlet 1540. In addition, the emitter 1510 further includes a carrier 1590 connected to at least a portion of the emitter body 1520 to assist with the insertion of the emitter 1510 into tubing or line to form a finished drip line. For example, the elastomeric material of emitter body 1520 can increase the amount of friction that exists between the emitter body 1520 and the insertion equipment used to install the emitter body 1520 into tubing. Such an increase in friction can lead to the binding-up of the insertion equipment and can ultimately cause the process to be stopped while the insertion equipment and emitters are cleared of obstructions and/or reorganized for proper insertion. To prevent this, the carrier 1590 may be used to smoothly guide the emitter body 1520 through the insertion tool and into tubing to form a finished emitter and drip line product.

In the form illustrated in FIGS. 16A-B, the carrier forms a skirt member that covers at least a portion of the lower and side surfaces of the emitter body 1520 as these are the surfaces used by the insertion tool to place the emitter into tubing. In the form illustrated, the carrier 1590 forms a generally rectangular skirt member that has vertical and horizontal wall portions 1590a, 1590b (respectively) and defines a large rectangular opening in the middle of the carrier to provide fluid access to the bottom surface of emitter body 1520. The vertical wall member allows the carrier 1590 to form a recess or cup for nesting at least a portion of the emitter body 1520 in and helps prevent lateral movement of the emitter body 1520 along the x and y axes in the carrier 1590. In a preferred form, the carrier 1590 is connected or fastened to the emitter body 1520 to further assist in preventing longitudinal movement of the emitter body 1520 along the z axis in the carrier 1590.

In the form illustrated, the carrier 1590 is made of a polyethylene and the emitter body 1520 is made of a thermoplastic or thermosetting elastomeric (e.g., TPO) and the carrier 1590 is connected or fastened to the emitter body 1520 via an adhesive. It should be understood, however, that in alternate embodiments the carrier 1590 and emitter body 1520 may be connected in a variety of different ways including without limitation, heat staking, thermal bonding, friction fit, mating structures (such as ball and detent, tongue and groove, mortise and tenon, etc.), set screws, etc. or using the shape of either of the structures themselves (e.g., as will be discussed further with respect to FIGS. 17A-B below). In a preferred form, the elastomeric emitter 1520 and carrier 1590 will be formed in a two-step molding process with either the body 1520 or carrier 1590 being formed in a first step and the other of the body 1520 or carrier 1590 being formed in a second step while still remaining in the same mold. For example, the carrier 1590 could be overmolded onto the body 1520 or, conversely, the body 1520 could be overmolded onto the carrier 1590. Overmolding one over the other in a single mold will help reduce the manufacturing time it takes to create the emitter unit and, thus, speed-up the manufacturing process for producing the final drip line product.

Emitter 1510 is similar to emitter 1010 of FIG. 11A-E, however, the inlet sleeve 1732 does not extend all the way to the forward edge of emitter body 1520 so that it will not interfere with the bracket or carrier 1590 extending around the periphery of the emitter body 1520. It should also be understood that in alternate embodiments a carrier may be used with any of the above-mentioned emitter embodiments. In addition, although the carrier of FIGS. 16A-B is in the form of a rectangular bracket with an open middle area so that the carrier 1590 only covers the outer periphery of the lower surface of the emitter body 1520, it should be understood that in alternate embodiments more or less of the emitter body 1520 may be covered by the carrier. For example, in one form, the carrier 1590 may form a solid rectangular structure covering the entire lower surface of the emitter body 1520 rather than having a large open middle area. However, in a preferred form the carrier 1590 will define an opening that is at least as big as the pressure compensating portion of the emitter body 1520 (e.g., the trampoline area or recess in the bottom of body 1520) in order to provide fluid communication between the fluid in the drip line or tube within in which the emitter is mounted and the pressure compensation portion 1560 of the emitter 1520. In another form, the carrier 1590 may define a plurality of openings rather than one middle opening in order to further cut down on material costs so long as a sufficient amount of material is provided for the carrier 1590 so that it allows the emitter body 1520 to be smoothly moved through the insertion tool and into tubing. These plurality of openings may be located in the horizontal or bottom surface of the carrier 1590 and/or in the vertical or side surfaces of the carrier 1590 and may be made in a variety of different sizes and shapes (e.g., angled rectangular slots, rounded slots, circular openings, triangular openings, symmetrical designs, asymmetrical designs, etc.).

Similarly, although the carrier 1590 of FIGS. 16A-B illustrate a design that only covers a portion of the sides or side walls of the emitter body 1520, it should be understood that in alternate embodiments the carrier may be designed to cover more or less of the side walls of the emitter body 1520 (both vertically and horizontally). For example, in one form, the carrier 1590 may be designed with a skirt member having a vertical side wall that covers the entire side of the emitter body 1520. In such a form, the emitter body 1520 would likely not be designed with a notch or shoulder recess for receiving the carrier 1590 (like the notch or shoulder recess illustrated in FIGS. 16A-B), but rather would preferably have a planar side wall that the carrier 1590 simply covers. Again, the side wall of carrier 1590 could be designed with one or more openings to reduce or save on material costs associated with the carrier 1590 (as will be discussed further below with respect to FIGS. 17A-B). In other forms, the vertical side wall of carrier 1590 may be designed to cover only that portion of the side wall of emitter body 1520 necessary to ensure smooth movement of the emitter body 1520 through the insertion tool and into tubing. For example, in some forms the vertical side wall may not extend all the way around the side of emitter body 1520, but rather may only cover a portion of the side wall of emitter body 1520.

In another form, the carrier 1590 may be designed with no vertical wall extending about the side of the emitter body 1520. For example, if the inserter or insertion tool used to install the emitter body 1520 into tubing only contacts the bottom surface of the structure it is inserting, the carrier 1590 could be designed to only cover the bottom surface of the emitter body 1520 as that is all that is needed to ensure smooth movement of the emitter body 1520 through the insertion tool and into the tubing. As mentioned above, in such a form, the carrier body 1520 could cover as much or as little of the bottom surface of the emitter body 1520 as desired and could define one or more openings in the bottom surface in order to save material costs and to provide fluid contact to the bottom surface of the emitter body 1520 at least where the pressure compensation portion of the emitter is located (e.g., the trampoline area or recess on the bottom side of the emitter body). In the form illustrated, the carrier 1590 remains connected to the emitter body 1520 after the emitter is connected to the inner surface of the tubing and remains connected thereafter. It should be understood that in alternate embodiments, however, the carrier 1590 may be designed to disengage from the emitter body 1520 once the emitter body 1520 is connected to the inner surface of the tube if such a configuration is desired. For example, the carrier 1590 could be returned to the insertion tool to load another emitter body 1520 or could simply drop off into the tubing and blown out of the tubing before shipping.

Figure 17A:
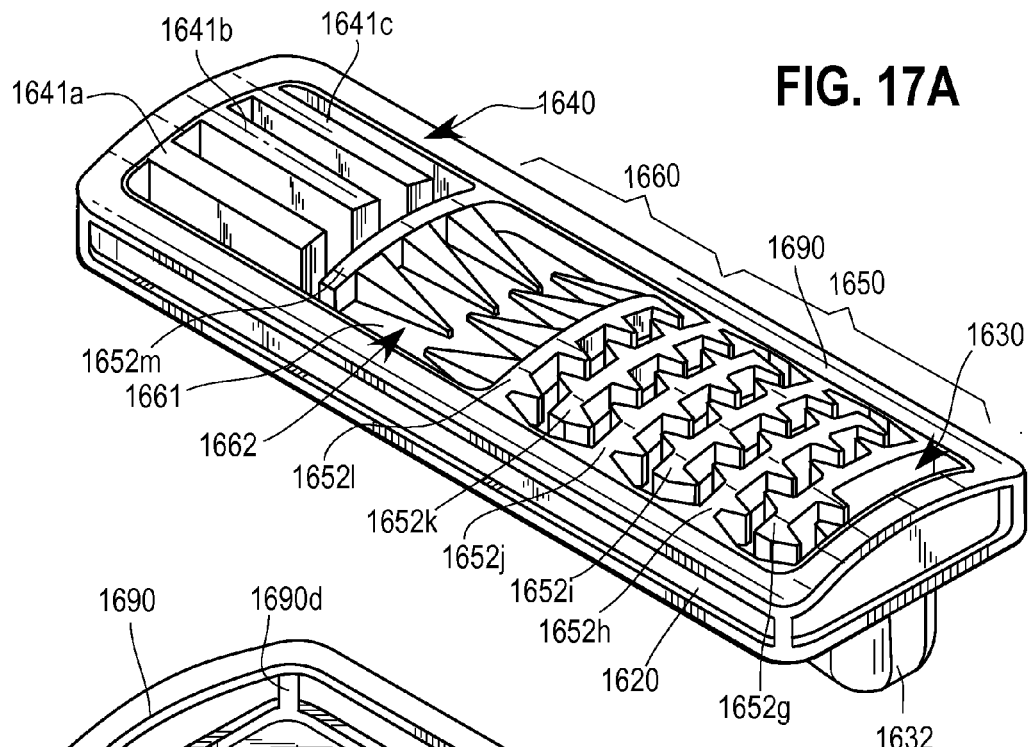
FIGS. 17A-B are perspective and exploded views, respectively, of an emitter embodying features of the present invention wherein the unitary elastomeric body is illustrated connected to a carrier or bracket for assisting in the installation of the emitter into tubing.
Figure 17B:
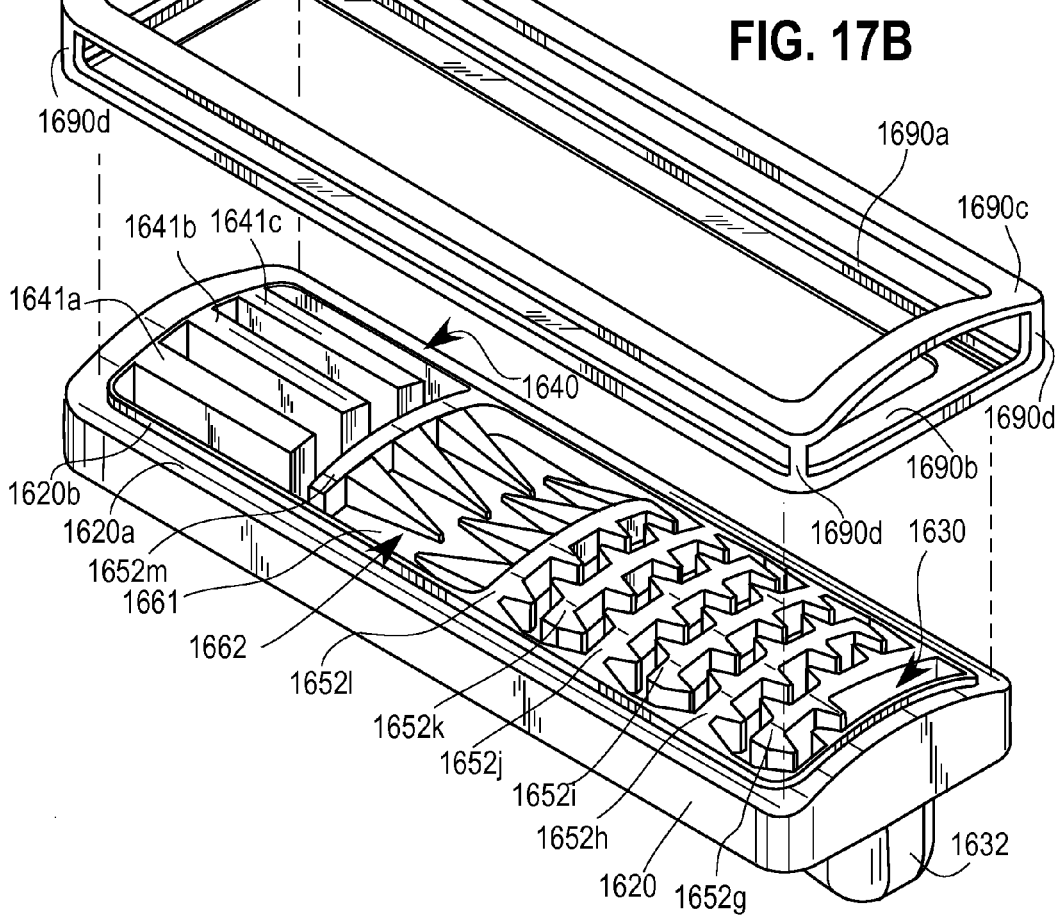

Another emitter in accordance with the invention is disclosed in FIGS. 17A-B. In keeping with the above-practice, features of this embodiment that are similar to those previously mentioned will be referenced using the same latter two-digit reference numeral but adding the prefix "16" to distinguish one embodiment from others. Thus, in FIGS. 17A-B the emitter will be referenced as emitter 1610. In the form illustrated, the emitter 1610 looks similar to the embodiment of FIGS. 16A-B and 10A-E and includes a body 1620 that defines an inlet opening 1630 and outlet bath 1640 with a tortuous fluid passage therebetween. Unlike prior embodiments, however, the emitter 1610 includes a carrier or bracket 1690 that captures portions of both the bottom and top of the emitter body 1620. More particularly, the bottom portion of carrier 1690 includes horizontal and vertical wall members 1690a, 1690b, respectively, similar to those illustrated in FIGS. 16A-B. In addition, the carrier 1690 defines a large rectangular inner opening like the carrier 1590 of FIGS. 16A-B. Unlike prior embodiments, however, the carrier 1690 further includes an upper bracket portion 1690c that extends above an upper portion of the emitter body 1620.

In the form illustrated, the body 1620 forms a recess 1620a and lip 1620b that corresponds in shape to the upper bracket 1690c so that when the carrier 1690 is installed on the emitter body 1620 the upper surfaces of lip 1620b and upper bracket 1690c are flush with one another. This configuration allows the upper surfaces of the upper bracket 1690c and emitter body parts (e.g., lip 1620b, outlet walls 1641a, 1641b, 1641c, and walls 1652g-m, etc.) to make contact with the inner surface of the tube when the emitter is installed therein so that fluid will properly flow through the inlet, along the pressure reduction portion 1650 and the pressure compensation portion 1660 of the tortuous fluid passage and into outlet bath 1640. The upper bracket 1690c is spaced apart from the lower bracket portion made-up of vertical and horizontal wall members 1690a, 1690b via risers or spacers, such as posts or stanchions 1690*d*, located at the corners of the carrier 1690 and emitter body 1620. Thus, the carrier 1690 defines a plurality of openings which saves on material costs and reduces the weight of the overall emitter 1610. As with the embodiment in FIGS. 16A-B, the inlet sleeve 1632 is recessed in from the edge of the emitter body 1620 or inset toward the center of the emitter body 1620 and away from the edge in order to allow the carrier 1690 to connect around the periphery of the emitter body 1620 (e.g., in order to allow bottom wall member 1690*b* to engage the bottom surface of emitter body 1620 about the periphery of the body 1620.

In the form illustrated in FIGS. 17A-B, the carrier 1690 captures the emitter body 1620 between the upper and lower bracket portions 1690*c* and 1690*a,b*, respectively, and the stanchions 1690*d*, and prevents the emitter body from moving laterally along the x and y axes and longitudinally along the z axis. This configuration secures the carrier 1690 to body 1620 without the need for further fastening such as by adhesive, bonding, etc., however, additional fasteners can be used if desired. In addition, the upper surface of upper bracket 1690*c* further provides a material and surface that can assist in the connection of the emitter to tubing. With the configuration of FIGS. 17A-B, cross linking between the emitter and the tugging could be enhanced by using the upper surface of upper bracket 1690*c* to ensure proper bonding between the emitter and the tubing.

As with the embodiment of FIGS. 16A-B, emitter body 1620 and carrier 1690 of FIGS. 17A-B are preferably made of an elastomeric material and a plastic polymer, respectively. In the form shown, the elastomeric body 1620 is made of TPO and the carrier 1690 is made of polyethylene. The tubing into which the emitter is inserted is also made of a plastic polymer, such as polyethylene. In a preferred form, the component is manufactured using a two-step molding process and a single mold wherein either the emitter body 1620 is made and then overmolded with the carrier 1690 or vice versa without the need to remove the structure from the mold before beginning the overmolding process. The component is then inserted into tubing and thermally bonded thereto during the extrusion of the tubing with the carrier 1690 providing for smooth passage of the emitter body 1620 through the insertion tool and into the tubing.

It should be understood that although two carrier embodiments have been illustrated in FIGS. 16A-17B, the carrier may be provided in a variety of different shapes and sizes. It also should be understood that various aspects of any of the above-mentioned embodiments may be combined with one another in order to provide a finished emitter and/or drip line or tubing. For example, the carrier of FIGS. 17A-B may be configured for use with the embodiment of FIGS. 1A-J. Alternatively, a portion of the carrier of FIGS. 17A-B may be used with one of the prior embodiments. In keeping with the latter, FIGS. 18A-B show another emitter in accordance with the invention, wherein a portion of the bracket of FIGS. 17A-B is used to assist in bonding an emitter similar to that depicted in FIGS. 11A-E to tubing. As with above embodiments, features of the emitter of FIGS. 18A-B that are similar to those discussed above will use the same latter two-digit reference numeral but include the prefix "17" to distinguish this embodiment from others. Thus, the emitter will be referred to as emitter 1710, which includes an inlet 1730, outlet 1740 and tortuous flow passage extending therebetween including a pressure reduction passage 1750 and pressure compensating passage 1760.

In FIGS. 18A-B, the emitter body 1720 defines a recess formed by horizontal wall 1720*a* and vertical wall or lip 1720*b* which are configured to receive bracket 1790. The depth and width of recess 1720*a* and lip 1720*b* are such that bracket 1790 is positioned so that its side wall is flush with the side of emitter body 1720 and its upper surface is flush with the upper surfaces of lip 1720*b*. The depth and width of the recess formed by surface 1720*a* and lip 1720*b* will preferably allow for easy overmolding of the bracket 1790 over emitter body 1720 in a two-step molding process using the same mold. It should be understood, however, that the emitter could also be formed using two separately molded pieces that are later connected to one another. With such a configuration, the lip 1720*b* forms a shoulder that aligns and orientates the bracket 1790 into its position on emitter body 1720. In the form illustrated, the bracket 1790 could be positioned in two orientations with one being illustrated in FIGS. 18A-B and the other consisting of the bracket pivoted one hundred and eighty degrees (180°). In alternate forms the bracket 1790 and body 1720 could be configured to only allow assembly in one orientation, such as by adding mating structures that need to be aligned or by using shapes that only correspond with one another in one orientation. As mentioned above, however, in a preferred form the bracket 1790 is simply molded over the emitter body 1720 using a two-step molding process and a single mold and, thus, orientation of the bracket 1790 is irrelevant as it is not assembled as a separately molded, two piece component.

With this configuration, the upper surface of bracket 1790 will be flush with or maintain the same radius of curvature as the upper surfaces of the remaining emitter body parts (e.g., uppers surfaces of outlet walls 1741*a-c*, flow passage walls 1752*g-m*, etc.) so that the emitter body 1720 and bracket 1790 will mount cleanly to the inner surface of the tubing within which the emitter is mounted and that fluid will properly flow through the inlet 1730, flow passage and outlet 1740. The bracket 1790 may further be made of a material that bonds well with the tubing to enhance cross-linking or bonding problems between the emitter and tubing.

In addition to the above embodiments, it should be understood that various methods of manufacturing or assembling irrigation drip lines, methods of compensating for pressure in a supply line (e.g., increases or decreases in supply line fluid pressure), methods of manufacturing an emitter and methods of reducing fluid flow pressure are also disclosed herein. For example, a method of assembling an irrigation drip line is disclosed which comprises providing a drip emitter according to any of the above mentioned embodiments where at least one of the inner and outer baffle walls include a tapered baffle wall section, extruding a drip line tube and inserting the provided drip emitter into the drip line tube as it is extruded such that upper surfaces of the emitter other than the tapered baffle wall section are bonded with an inner surface of the extruded drip line tube to form a sealed engagement so that a pressure reduction flow channel is formed between the inlet and outlet area of the emitter. In a preferred form, the upper surfaces of the non-tapered baffle walls are bonded to the inner surface of the extruded drip line tube to form this sealed engagement so that an elongated tortuous passage is formed between the inlet and outlet of the emitter.

In addition to this method, there are disclosed several methods of compensating for pressure in irrigation drip emitters. For example, a method of compensating for pressure in an irrigation drip emitter is disclosed comprising providing a drip emitter according to any of the above-mentioned embodiments wherein the baffle walls have upper surfaces with a first radius of curvature and the inner baffle wall has a first portion of constant height and a second portion of tapering height that is variably moveable between a first low pressure position wherein the upper surface of the second portion is not generally level with the upper surface of the first portion and fluid can flow over the upper surface of the second portion at low fluid pressures and a second high pressure position wherein the upper surface of the second portion is level with the upper surface of the first portion such that fluid is prevented from flowing over the upper surface of the second portion and the cross-section of the flow channel is reduced and the extent of the flow channel is effectively lengthened, and moving the second portion of the inner baffle wall between the first low pressure position wherein the upper surface of the second portion is not level with the upper surface of the first portion and fluid can flow over the upper surface of the second portion at low fluid pressures and the second high pressure position wherein the upper surface of the second portion is level with the upper surface of the first portion so that fluid is prevented from flowing over the upper surface of the second portion to reduce the cross-section of the flow channel and effectively lengthen the extent of the flow channel the fluid has to pass through at high fluid pressure in order to compensate for an increase in fluid supply pressure, and moving variably the second portion of the inner baffle wall toward and/or to the second high pressure position to compensate for an increase in fluid pressure and toward and/or to the first low pressure position to compensate for a decrease in fluid supply pressure.

Alternatively, a method of compensating for pressure in an irrigation drip emitter is disclosed which comprises providing a drip emitter according to any of the above-mentioned embodiments wherein the baffle walls have upper surfaces with a first radius of curvature and the inner baffle wall terminates in a first structure and the outer baffle wall includes a second structure that generally corresponds in shape and/or meshes with the first structure and is positioned proximate the first structure, with the first and second structures tapering in height toward one another and being variably moveable between a first low pressure position wherein the upper surfaces of the tapered structures are not level with the upper surfaces of the baffle walls and fluid can flow over the tapered structures at low fluid pressure and a second high pressure position wherein the upper surfaces of the tapered structures are level with the upper surfaces of the baffle walls and fluid is prevented from flowing over the tapered structures to reduce the cross-section of the flow channel proximate the first and second structures and effectively lengthen the extent or amount of the flow channel the fluid has to pass through at high fluid pressure, and moving variably the first and second structures toward and/or to the second high pressure position to compensate for an increase in fluid supply pressure and toward and/or to the first low pressure position to compensate for a decrease in fluid supply pressure.

Alternatively, another method of compensating for pressure in an irrigation drip emitter is disclosed comprising providing an irrigation drip emitter according to any of the embodiments disclosed herein, wherein the baffle walls have upper surfaces with a first radius of curvature and the inlet includes a plurality of inlet openings or passages extending from a surface of the body exposed to the pressurized supply fluid to the pressure reducing flow channel, each inlet passage extending through a boss with a terminal end extending progressively further into the pressure reducing flow channel, each of the terminal ends moveable variably between an open position wherein the upper surface of the terminal end of the boss is not at the same general level as the baffle walls (or with the upper surfaces of the terminal end and baffle walls not being at a common radius of curvature) so that fluid can continue to flow through the boss and into the flow channel and a closed position wherein the terminal end of the boss is generally level with the upper surfaces of the baffle walls and has a generally common radius of curvature as the first radius of curvature of the baffle walls so that fluid is prevented from flowing through the boss or inlet sleeve and into the flow channel, and moving variably the inlet openings or terminal ends of the bosses toward and/or to the second high pressure closed positions to compensate for a increase in fluid supply pressure and toward and/or to the first low pressure open positions to compensate for a decrease in fluid supply pressure.

In the above examples, it should be clear that movement of the moveable walls or structures to compensate for fluid pressure increases and decreases can either be complete movements from a first limit of travel to a second limit of travel (i.e., from a furthest most open position to a furthest most closed position and vice versa), or alternatively, may simply be movements toward one or more of those limits of travel without those limits actually having been reached (i.e., movement toward a furthest most open position to a furthest most closed position and vice versa). In addition, the material chosen for the emitter body (e.g., 20, 120, 220 above), may be selected such that such movement happens at a desired pace. For example, if a quick opening and closing is desired, a material that is more flexible or has a lower Durometer value may be selected. Whereas, if a slower or more gradual opening and closing (or transitioning from one or the other) is desired, a material that is less flexible or that has a higher Durometer value may be selected.

There also are disclosed herein various methods for processing grit through an emitter or clearing emitters and/or drip lines of obstructions. For example, one method for processing grit comprises providing an emitter of the type discussed above, adjusting the fluid pressure that the emitter is subjected to in a supply line to alter the size or shape of the flow channel to expel any obstructions clogging the emitter (e.g., obstructions clogging an inlet, flow channel, outlet, etc.). In one form this is done by decreasing the fluid pressure to maximize the cross-sectional area of the flow channel and/or create a central flow channel through which any obstructions such as grit or other particulates may be flushed. In another form this is done by increasing the fluid pressure to cause the baffle walls of the flow channel to deflect, bend or tip so that obstructions can pass through the flow channel or be carried out of the emitter via the high pressure fluid passing therethrough.

Other methods disclosed herein include methods for manufacturing an emitter comprising providing an emitter body made-up of a single material or unitary body construction defining an emitter inlet, at least part of the tortuous flow passage and an outlet bath and inserting a root inhibiting member in or proximate to the outlet bath of the emitter to inhibit roots from obstructing the emitter or operation thereof once the unitary body member is connected to tubing to form the finished emitter. In another form, a method of manufacturing an emitter comprises providing an emitter body made-up of a single material or unitary body construction defining the emitter inlet, at least part of the tortuous flow passage and an outlet bath and elongating the inlet opening to draw fluid from closer to the center of the inner lumen of the tube in an effort to draw fluid with less grit to inhibit grit from obstructing the emitter or operation thereof once the unitary body member is connected to tubing to form the finished emitter product. Another method disclosed relates to the manufacturing of an emitter comprising providing an unitary embitter body defining an emitter inlet, at least a portion of the tortuous flow passage and an outlet bath and both inserting a root inhibiting member in or proximate to the outlet bath and elongating the inlet opening to draw fluid from closer to the middle or center region of the inner lumen. Yet another method disclosed relates to a method of controlling a pressure compensation portion of an emitter by defining a trampoline area that allows the pressure compensation portion to move as desired. For example, such a method may include increasing the size of the trampoline area of the pressure compensation member on one side of the emitter to an area larger than the overall size of the pressure compensation member area located on the opposite side of the emitter (e.g., the area containing the moveable teeth or flippers) to make the emitter more responsive to fluid pressure increases and decreases. Conversely, the size of the trampoline area may be reduced in order to make the emitter less responsive to fluid pressure increases and decreases.

Another method comprises a method of manufacturing and/or inserting an emitter into tubing which includes providing an emitter body having an inlet, outlet and tortuous flow passage connecting the inlet and outlet in fluid communication with one another, providing a carrier with in which the emitter body is disposed or to which the emitter body is connected, and connecting the emitter body to the carrier so that the emitter body can more easily be transported through an insertion tool and into drip tubing. In a preferred form the connection between emitter body and carrier is permanent such that the carrier remains with the emitter body after the emitter is installed into tubing. However, in alternate forms, the method may further include separating the carrier from the emitter body once the emitter body is installed into the tubing.

In addition, a method for reducing problems associated with cross-linking and bonding between an emitter and tubing have also been disclosed herein. For example, such a method may include providing an emitter body having an inlet, outlet and fluid passage connected between the inlet and outlet, and connecting a bracket to the emitter body made of a material that easily bonds with tubing as the tubing is being extruded to ensure a good connection between the emitter body and tubing that is free of cross-linking or bonding defects.

In view of the above, it should be appreciated that a method of manufacturing an open face flat in-line emitter has been disclosed herein including one or more of the following additional features: a root growth inhibitor member, an inlet projection and/or a carrier for assisting with installation of the emitter into tubing and/or bonding of the emitter to tubing.

Thus it is apparent that there has been provided, in accordance with the invention, an elastomeric emitter and methods relating to same that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An irrigation drip emitter for insertion in to a conduit carrying pressurized fluid comprising:
   a unitary body made of an elastomer defining an inlet, outlet and a flow channel therebetween connecting the inlet and outlet, wherein the emitter inlet includes a protrusion that extends from an exterior surface and a distal end of the emitter toward a central portion of the conduit so that fluid entering the emitter comes from a position closer to the central portion of the conduit than from a periphery of the conduit in order to avoid particles that may be located near the periphery of the conduit, and wherein the outlet is defined by side walls formed by the unitary body;
   the unitary body having a length and width and the flow channel extending over a majority of the length of the unitary body and defining a pressure reduction flow passage and a pressure compensating flow passage having a first cross-sectional area at low fluid pressure and a second cross-sectional area smaller than the first cross-sectional area at high fluid pressure to restrict flow through the channel, wherein the pressure reduction flow passage and pressure compensating flow passage are configured in an open face arrangement with each opening from a unitary body side opposite the exterior surface having the emitter inlet protrusion; and
   a root growth inhibiting member positioned within the side walls of the outlet to deter roots from obstructing the flow of fluid through the emitter.

2. The irrigation drip emitter of claim 1 wherein the outlet has a floor and projections for preventing the floor of the outlet from collapsing in response to high fluid pressure and the root growth inhibiting member comprises a copper insert that corresponds in shape to the outlet so that the copper insert may be disposed within the outlet of the emitter.

3. The irrigation drip emitter of claim 2 wherein the outlet projections comprise a plurality of posts or walls of a first shape and the copper insert defines openings of a second shape that correspond to the first shape so that the copper insert may be disposed within the outlet of the emitter.

4. The irrigation drip emitter of claim 2 wherein the outlet has an interior geometry defined by side walls of the outlet and the projections for preventing the floor of the outlet from collapsing, and the copper insert has an exterior geometry that complements the interior geometry of the outlet so that the copper insert may be disposed within the outlet.

5. The irrigation drip emitter of claim 1 wherein the emitter inlet protrusion forms a sleeve having a rounded exterior surface that extends from a longitudinal center of one end of the emitter, with the emitter having an overall length and the sleeve extending from a portion less than a majority of the emitter length.

6. The irrigation drip emitter of claim 1 wherein the emitter body has a first side which is positioned against an inner surface of the conduit and a second side opposite the first side that is generally planar and the inlet protrusion is a sleeve extending from the generally planar second side and extends toward the central portion of the conduit beyond adjacent portions of the generally planar second side of the emitter body.

7. The irrigation drip emitter of claim 6 wherein the inlet sleeve includes a filter for blocking obstructions from entering into the flow channel of the emitter.

8. An irrigation drip emitter for insertion in to a conduit carrying pressurized fluid comprising:
   a unitary body made of an elastomer defining an inlet, outlet and a flow channel therebetween connecting the inlet and outlet, wherein the emitter inlet includes a protrusion that extends from an exterior surface and a distal end of the emitter toward a central portion of the conduit so that fluid entering the emitter comes from a position closer to the central portion of the conduit than from a periphery of the conduit in order to avoid particles that may be located near the periphery of the conduit;

the unitary body having a length and width and the flow channel extending over a majority of the length of the unitary body and defining a pressure reduction flow passage and a pressure compensating flow passage having a first cross-sectional area at low fluid pressure and a second cross-sectional area smaller than the first cross-sectional area at high fluid pressure to restrict flow through the channel; and a root growth inhibiting member positioned in or proximate the outlet to deter roots from obstructing the flow of fluid through the emitter;

wherein the emitter body has a first side which is positioned against an inner surface of the conduit and a second side opposite the first side that is generally planar and the inlet protrusion is a sleeve extending from the generally planar second side and extends toward the central portion of the conduit beyond adjacent portions of the generally planar second side of the emitter body; and wherein the inlet sleeve includes a filter for blocking obstructions from entering into the flow channel of the emitter, the filter comprising a plurality of channels located in an exterior surface at a distal end of the sleeve that create a raised surface for blocking larger obstructions on the raised surface while allowing fluid to flow through the channels and sleeve and into the flow channel unobstructed.

9. The irrigation drip emitter of claim 1 wherein the emitter body has a first exterior side which is positioned against an inner surface of the conduit and a second exterior side opposite the first side that is positioned near a central portion of the conduit, the pressure compensating flow passage being located on the first exterior side of the emitter body and making up a first portion of the emitter body, and the pressure compensating flow passage further including a recessed portion located on the second exterior side of the emitter and making up a second portion of the emitter body that is larger than the first portion to make the pressure compensating flow passage more responsive to changes in fluid pressure, the recessed portion located on the second exterior side of the emitter having a defined perimeter at all times regardless of fluid pressure.

10. The irrigation drip emitter of claim 1 wherein the unitary body defines an open face, flat, in-line emitter and includes a carrier connected to the unitary body for assisting with installation of the unitary body into tubing using emitter insertion tooling, wherein the carrier is made of a polyethylene and is positioned on the unitary body in locations where the unitary body would otherwise come in contact with the insertion tooling in order to minimize contact between the unitary body and the insertion tooling to allow the unitary body to be smoothly guided through the insertion tooling and into the tubing to form a finished emitter and drip line product.

11. The irrigation drip emitter of claim 10 wherein the unitary body has bottom and side surfaces and the carrier covers at least a portion of the bottom and side surfaces of the unitary body and defines an opening aligned with at least a portion of the pressure compensating flow passage to allow for fluid communication between fluid carried in the tubing and the at least a portion of the pressure compensating flow passage to allow the drip emitter to compensate for increases and decreases in fluid pressure within the tube.

12. The irrigation drip emitter of claim 10 wherein the carrier includes a portion disposed in a recess defined by an upper surface of the unitary body in order to assist with connecting the unitary body to an inner surface of the tubing without cross-linking or bonding problems.

13. An irrigation drip emitter for insertion in to a conduit carrying pressurized fluid comprising:

a unitary body defining an inlet, outlet and a flow channel therebetween connecting the inlet and outlet;

the flow channel defining a pressure reduction flow passage and a pressure compensating flow passage having a first cross-sectional area at low fluid pressure and a second cross-sectional area smaller than the first cross-sectional area at high fluid pressure to restrict flow through the channel, wherein the flow channel is formed in an open face arrangement and opens from a first exterior side of the unitary body; and the emitter inlet includes a protrusion that extends from a second exterior side of the unitary body located opposite the first exterior side of the unitary body and from a distal end of the emitter toward a central portion of the conduit so that fluid entering the emitter comes from a position closer to the central portion of the conduit than from a periphery of the conduit in order to avoid particles entering the emitter that may be located near the periphery of the conduit.

14. The irrigation drip emitter of claim 13 wherein the emitter body has a first exterior side which is positioned against an inner surface of the conduit and the inlet protrusion is a sleeve extending from a second exterior side opposite the first side of the emitter body, the protrusion extending beyond a remainder of the exterior surface of the second exterior side.

15. The irrigation drip emitter of claim 14 wherein the inlet sleeve extends from a longitudinal center of one end of the emitter and includes a filter for blocking obstructions from entering into the flow channel of the emitter.

16. An irrigation drip emitter for insertion in to a conduit carrying pressurized fluid comprising:

a unitary body defining an inlet, outlet and a flow channel therebetween connecting the inlet and outlet;

the flow channel defining a pressure reduction flow passage and a pressure compensating flow passage having a first cross-sectional area at low fluid pressure and a second cross-sectional area smaller than the first cross-sectional area at high fluid pressure to restrict flow through the channel; and the emitter inlet includes a protrusion that extends from an exterior surface and a distal end of the emitter toward a central portion of the conduit so that fluid entering the emitter comes from a position closer to the central portion of the conduit than from a periphery of the conduit in order to avoid particles entering the emitter that may be located near the periphery of the conduit;

wherein the emitter body has a first exterior side which is positioned against an inner surface of the conduit and the inlet protrusion is a sleeve extending from a second exterior side opposite the first side of the emitter body, the protrusion extending beyond a remainder of the exterior surface of the second exterior side;

wherein the inlet sleeve extends from a longitudinal center of one end of the emitter and includes a filter for blocking obstructions from entering into the flow channel of the emitter, the filter comprising a plurality of channels located in an exterior surface and a distal end of the sleeve that create a raised surface for blocking larger obstructions on the raised surface while allowing fluid to flow through the channels and sleeve and into the flow channel unobstructed.

17. The irrigation drip emitter of claim 13 wherein the inlet has side walls that define an inner bath with an interior geometry and the emitter further comprising a root growth inhibiting member positioned in the interior bath of the outlet to deter roots from obstructing the flow of fluid through the emitter, the root growth inhibiting member having an exterior geometry that corresponds in shape with and complements the interior geometry of the inner bath of the outlet.

18. The irrigation drip emitter of claim 17 wherein the inlet protrusion has a height ranging between fifty thousandths of an inch (0.050") and one hundred fifty thousandths of an inch (0.150") and the remainder of the unitary body has a height ranging between one hundred thousandths of an inch (0.100") to one hundred fifty thousandths of an inch (0.150").

19. The irrigation drip emitter of claim 13 wherein the conduit has an inner diameter and the inlet protrusion is of a length sufficient to extend a distal end of the protrusion into the conduit between twenty and fifty percent of the inner diameter of the conduit so that fluid entering the emitter comes from a position closer to the central portion of the conduit than from a periphery of the conduit in order to avoid obstructions from entering the emitter that may be located near the periphery of the conduit.

20. The irrigation drip emitter of claim 13 wherein the unitary body has a first height and the inlet protrusion has a second height that is between one half and one times the first height of the unitary body.

21. The irrigation drip emitter of claim 13 wherein the unitary body defines an open face, flat, in-line emitter and includes a carrier connected to the unitary body for assisting with installation of the unitary body into tubing using emitter insertion tooling, wherein the carrier is made of a polyethylene and is positioned on the unitary body in locations where the unitary body would otherwise come in contact with the insertion tooling in order to minimize contact between the unitary body and the insertion tooling to allow the unitary body to be smoothly guided through the insertion tooling and into the tubing to form a finished emitter and drip line product.

22. The irrigation drip emitter of claim 21 wherein the unitary body has bottom and side surfaces and the carrier covers at least a portion of the bottom and side surfaces of the unitary body and defines an opening aligned with at least a portion of the pressure compensating flow passage to allow for fluid communication between fluid carried in the tubing and the at least a portion of the pressure compensating flow passage to allow the drip emitter to compensate for increases and decreases in fluid pressure within the tube.

23. The irrigation drip emitter of claim 21 wherein the carrier includes a portion disposed in a recess defined by an upper surface of the unitary body in order to assist with connecting the unitary body to an inner surface of the tubing without cross-linking or bonding problems.

24. An irrigation drip emitter for insertion into a conduit carrying pressurized fluid comprising:
a unitary body defining an inlet, outlet and a flow channel therebetween connecting the inlet and outlet in fluid communication, the inlet including a protrusion that extends from an exterior surface and a distal end of the emitter toward a central portion of the conduit so that fluid entering the emitter comes from a position closer to the central portion of the conduit than from a periphery of the conduit in order to avoid particles that may be located near the periphery of the conduit;
the flow channel defining a pressure reduction flow passage and a pressure compensating flow passage having a first cross-sectional area at low fluid pressure and a second cross-sectional area smaller than the first cross-sectional area at high fluid pressure to restrict flow through the channel, wherein the pressure reduction flow passage and pressure compensating flow passage are configured in an open face arrangement with each opening from a unitary body side opposite the exterior surface having the emitter inlet protrusion; and
a carrier connected to the unitary body for assisting with installation of the unitary body into a conduit carrying pressurized fluid using emitter insertion tooling, wherein the carrier is positioned on the unitary body in locations where the unitary body would otherwise come in contact with the insertion tooling in order to minimize contact between the unitary body and the insertion tooling to allow the unitary body to be guided smoothly through the insertion tooling and into the conduit to form a finished emitter and drip line product.

25. The irrigation drip emitter of claim 24 wherein the unitary body has bottom and side surfaces and the carrier covers only a portion of the bottom and side surfaces of the unitary body and defines an opening aligned with the inlet protrusion and at least a portion of the pressure compensating flow passage to allow for fluid communication between the pressurized fluid within the conduit and the at least a portion of the pressure compensating flow passage to allow the drip emitter to compensate for increases and decreases in fluid pressure within the conduit.

26. The irrigation drip emitter of claim 25 wherein the carrier is made of a polyethylene and includes a portion disposed in a recess defined by an upper surface of the unitary body in order to assist with connecting the unitary body to an inner surface of the conduit without cross-linking or bonding problems.

27. An irrigation drip emitter for insertion in to a conduit carrying pressurized fluid comprising:
a unitary body defining an inlet, outlet and a flow channel therebetween connecting the inlet and outlet, the outlet having an interior geometry defined by side walls extending about the outlet forming an interior bath and the outlet and flow channel being configured in an open face arrangement;
the flow channel defining a pressure reduction flow passage and a pressure compensating flow passage having a first cross-sectional area at low fluid pressure and a second cross-sectional area smaller than the first cross-sectional area at high fluid pressure to restrict flow through the channel; and
a root growth inhibiting member positioned within the outlet side walls to deter roots from obstructing the flow of fluid through the emitter, the root growth inhibiting member having an exterior geometry that corresponds in shape with and complements the interior geometry of the outlet to allow the root growth inhibiting member to fill the interior geometry of the outlet.

28. The irrigation drip emitter of claim 27 wherein the outlet has a floor and includes projections for preventing the floor of the outlet from collapsing in response to high fluid pressure and together the side walls and projections of the outlet define the interior geometry that the exterior geometry of the root growth inhibiting member corresponds in shape with and compliments.

* * * * *